United States Patent
Stedronsky et al.

(10) Patent No.: US 12,524,026 B2
(45) Date of Patent: Jan. 13, 2026

(54) PRECISION CONTROL AND CHARACTERIZATION OF DISPENSED SUBSTANCES

(71) Applicant: Altopa, Inc., Vashon, WA (US)

(72) Inventors: Erwin Stedronsky, Reno, NV (US); Lonnie Brent Poole, Vashon, WA (US); Nicole Wicker, Raleigh, NC (US); Jesse Melton, Durham, NC (US)

(73) Assignee: Altopa, Inc., Vashon, WA (US)

( * ) Notice: Subject to any disclaimer, the term of this patent is extended or adjusted under 35 U.S.C. 154(b) by 474 days.

(21) Appl. No.: 17/911,309

(22) PCT Filed: Mar. 12, 2021

(86) PCT No.: PCT/US2021/022166
§ 371 (c)(1),
(2) Date: Sep. 13, 2022

(87) PCT Pub. No.: WO2021/183926
PCT Pub. Date: Sep. 16, 2021

(65) Prior Publication Data
US 2023/0046651 A1    Feb. 16, 2023

Related U.S. Application Data

(60) Provisional application No. 62/989,335, filed on Mar. 13, 2020.

(51) Int. Cl.
*G05D 11/13* (2006.01)
*A47J 43/07* (2006.01)
*A47J 47/01* (2006.01)

(52) U.S. Cl.
CPC ............ *G05D 11/132* (2013.01); *A47J 43/07* (2013.01); *A47J 47/01* (2013.01)

(58) Field of Classification Search
CPC ......... G05D 11/132; A47J 43/07; A47J 47/01; A47J 36/321; B67D 1/0888; B67D 1/12
See application file for complete search history.

(56) References Cited

U.S. PATENT DOCUMENTS

| | | | |
|---|---|---|---|
| 9,360,875 B2 * | 6/2016 | Bonner | B05B 12/10 |
| 2010/0050737 A1 * | 3/2010 | Wolters | G01N 30/8665 73/23.35 |

(Continued)

FOREIGN PATENT DOCUMENTS

WO    WO2017/180660    * 10/2017    ............. G06F 19/00

*Primary Examiner* — Eric J Yoon
(74) *Attorney, Agent, or Firm* — POLSINELLI PC

(57) ABSTRACT

Method for dispensing a recipe includes measuring characterization data for components of a recipe. A signal representing an instruction to dispense the recipe is received at a processor operably coupled to a dispenser. In response to receiving the signal representing the instruction to dispense, an instruction set is generated based on the recipe and the characterization data. The instruction set is executed, to cause a series of delivery events of the components. Prior to each individual delivery event comprising the instruction set, a deviation, from their predetermined setpoints, is detected in a temperature and/or a pressure of the microfluidic dispenser. In response to detecting the deviation in temperature and/or pressure, the processor automatically causes an adjustment to one or more instructions from the instruction set based on the detected variation such that the amount of each component delivered more closely conforms to the amount specified in the recipe.

4 Claims, 35 Drawing Sheets

(56) References Cited

U.S. PATENT DOCUMENTS

| | | | |
|---|---|---|---|
| 2012/0115553 A1* | 5/2012 | Mahe | H04B 7/0825 |
| | | | 455/575.7 |
| 2012/0172437 A1* | 7/2012 | Kraus | C07C 407/00 |
| | | | 422/119 |
| 2016/0249766 A1* | 9/2016 | Studor | A47J 31/525 |
| | | | 426/231 |
| 2020/0223682 A1* | 7/2020 | Lane | G16H 20/60 |
| 2021/0088541 A1* | 3/2021 | Apker | C12Q 1/6869 |

* cited by examiner

| Report ID | Client ID | Total THC (mg/g) | Total CBD (mg/g) |
|---|---|---|---|
| LS-190812-1 | #00 | ND | 549 |
| LS-190812-2 | #06 | ND | 454 |
| LS-190812-3 | #01a | ND | 60 |
| LS-190812-4 | #01b | ND | 49.1 |
| LS-190812-5 | #02a | ND | 158 |
| LS-190812-6 | #02b | ND | 160 |
| LS-190812-7 | #03 | ND | 280 |
| LS-190812-8 | #04 | ND | 387 |
| LS-190812-9 | #05 | ND | 435 |
| LS-190812-10 | #07 | ND | 450 |
| LS-190812-11 | #08 | ND | 481 |
| LS-190812-12 | #14 | ND | 142 |
| LS-190812-13 | #15 | ND | 80.2 |

PRECISION CONTROL AND CHARACTERIZATION OF DISPENSED SUBSTANCES

CROSS-REFERENCE TO RELATED APPLICATIONS

This application is the U.S. national phase entry under 35 U.S.C. § 371 of International Application No. PCT/US2021/022166, filed Mar. 12, 2021, entitled PRECISION CONTROL AND CHARACTERIZATION OF DISPENSED SUBSTANCES, which in turn claims priority to and benefit of U.S. Provisional Application No. 62/989,335, filed Mar. 13, 2020, the contents of which are incorporated herein by reference in their entirety for all purposes.

BACKGROUND

Electric home appliances have automated repetitive tasks previously done manually. For example, electric kitchen mixers can replace stirring, whisking, and beating. Stand mixers, using a dough hook, can be used to knead bread. Electric kitchen mixers with a variety of speeds allow users to have more control over the mixing/blending process and the development of the mixtures.

SUMMARY

In some embodiments, a method for dispensing a desired recipe includes measuring characterization data for the components. A signal representing an instruction to dispense the recipe is received at a processor operably coupled to a microfluidic dispenser. In response to receiving the signal representing the instruction to dispense the recipe, an instruction set is generated based on the recipe and the characterization data. The instruction set is executed, to cause a series of delivery events of the individual components comprising the recipe at a microfluidic dispenser. Prior to each individual delivery event comprising the instruction set, a deviation in a temperature and/or a pressure of the microfluidic dispenser is detected. In response to detecting the deviation in temperature and/or pressure, the processor automatically causes an adjustment to one or more instructions from the instruction set based on the detected such that the amount of each component delivered conforms more closely to the amount specified in the recipe.

It should be appreciated that all combinations of the concepts discussed herein and detailed below (provided such concepts are not mutually inconsistent) are contemplated as being part of the inventive subject matter disclosed herein. In particular, all combinations of subject matter appearing in this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

FIG. 17 is a chart summarizing analytical results, obtained via high pressure liquid chromatography (HPLC), showing CBD content for the PIL50/MCT dispenses.

DETAILED DESCRIPTION

Figure 1:
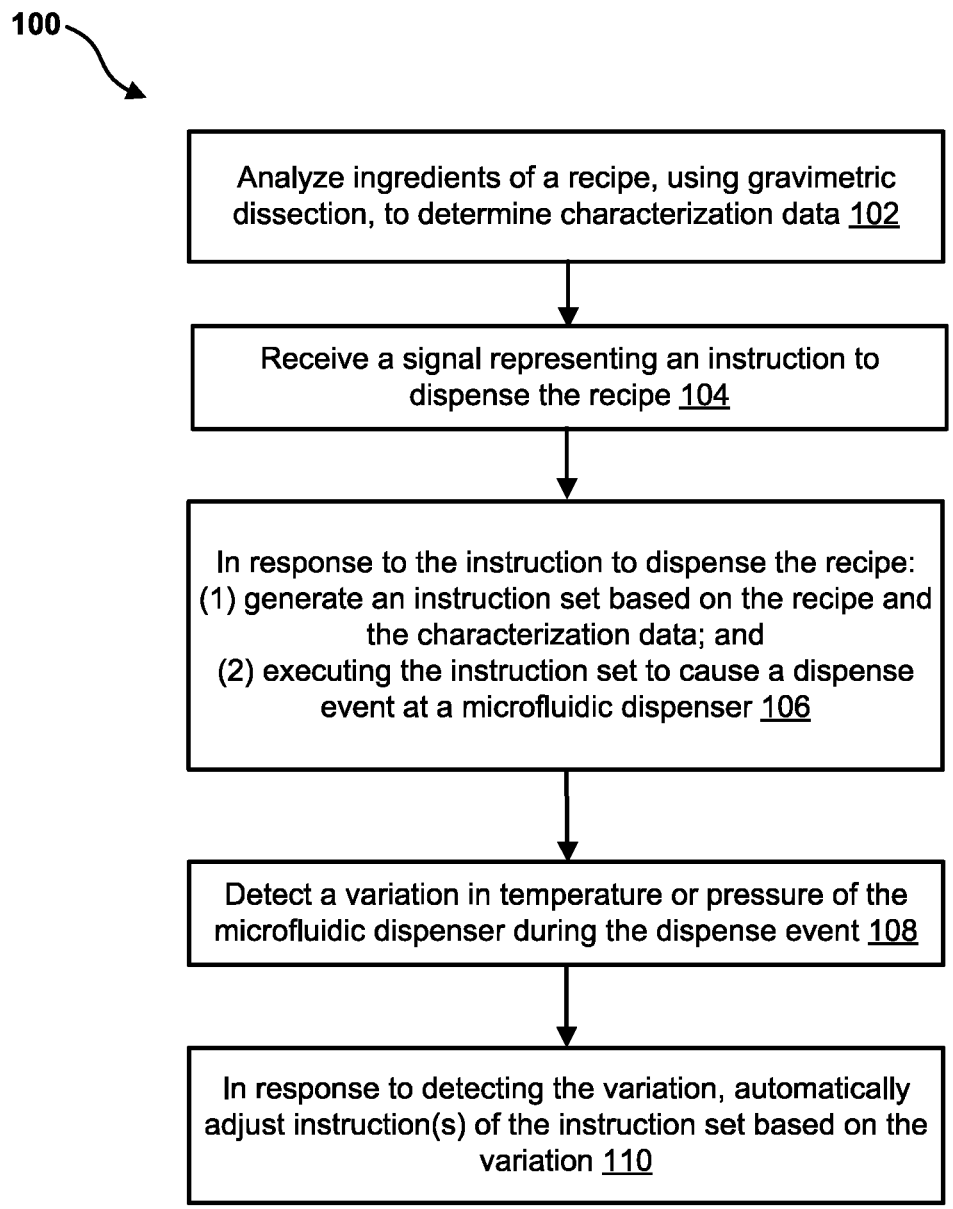
FIG. 1 shows a method for dispensing a desired formulation from a microfluidic dispenser, according to some embodiments.

Microfluidic dispensers set forth herein are capable of precisely controlling dispenses of fluids (or "liquids") and fluid mixtures with higher precision and batch-to-batch reproducibility and consistency than known fluid dispensers. System and methods of the present disclosure can achieve improved precision fluid dispensing using one or more of: instantaneous temperature measurements, time-pressure dosing, maintaining a narrow dead-band with regard to temperature and/or pressure, automatic/dynamic or manual fluid viscosity adjustment, dynamic temperature and/or pressure feedback and related instruction set modification during dispense events, delivery and dispensing of fluids based on mass, a priori characterization of fluid flow rate, identifying minimum dispensed amounts associated with each ingredient for each channel for each chassis, in-cartridge dilution of terpenes prior to dispensing, and determining valid positions and invalid positions for each fluid/ingredient within a docking block of the microfluidic dispenser.

Fluids, or "formulations," that can be dispensed according to embodiments set forth herein include, but are not limited to, any combination of the following: tinctures, vaporization (e.g., vape cartridge) fluids, nasal sprays, capsules, cosmetics such as foundation, sunscreen, foundation with sunscreen, fragrance, perfume, hair colorant, lotion, serum, and gel. Formulations set forth herein can include any combination of the following non-limiting list of ingredients: oils, cannabinoids, nicotine, terpenes, terpenoids, flavonoids, cannaflavins, esters, nootropics, botanical extracts, endocannabinoid agonists, aromatics, ketamine, 3,4-Methylenedioxymethamphetamine (MDMA), lysergic acid diethylamide (LSD), dimethyltryptamine (DMT), ololiuqui (Morning Glory), psilocybin, mescaline, diluents, antioxidants, and preservatives.

In some embodiments, a microfluidic dispenser includes one or more cartridges, each of which contains a single fluid or a mixture of multiple fluids and/or solid ingredients suspended in the fluid. The solid ingredients can include, for example, one or more microencapsulated materials. An encapsulated material can include a solid or liquid internal component/material ("payloads") surrounded by one or multiple encapsulant materials. In some embodiments, one or more encapsulated materials are simultaneously included within a cartridge. A multilayered encapsulated material can include multiple payloads that are separated from one another by multiple encapsulant layers, for example to cause a time-release delivery of the components thereof once ingested by a patient/user. The payloads of the multiple payloads can be different from, or the same as, one another. Similarly, the encapsulant layers of the multiple encapsulant layers can be different from, or the same as, one another. The cartridge(s) can include fluid that has been pre-filtered, for example using a filter such as a 0.45 micron Teflon filter. The cartridges can be of a uniform size, or can vary in size, for example based on their contents For example, a cartridge containing terpene may be smaller (e.g., by half or more) than a cartridge containing a cannabinoid such as CBD.

Each cartridge can include an EEPROM chip mechanically attached thereto (e.g., mounted within a recess of each cartridge) that stores data about the cartridge contents and can be accessed by the microfluidic dispenser, the dispenser compute device, and/or one or more remote compute devices (e.g., via a wired or wireless networked communications system, such as the internet, a wide area network (WAN), or a local area network (LAN)).

The microfluidic dispenser is configured to at least partially receive, or otherwise mechanically connect with, and thus be in fluid communication with, each of the one or multiple cartridges such that the fluid in the cartridge(s) can flow (e.g., under control of a processor executing an instruction set) from the cartridge(s), through delivery paths within the microfluidic dispenser, to one or more dispenser nozzles of the microfluidic dispenser. The delivery paths can include microfluidic channels defined within a mixing chip (also referred to herein as a "microfluidic plate," "mixing plate," or a "restrictor plate"). Microfluidic channels can be produced/fabricated via machining, e.g., of a machinable material such as aluminum, stainless steel, copper, brass, bronze, gold, nickel, mild steel, Inconel, or Hasteloy, or via a molding process, e.g., of a moldable material such as a thermoplastic. Example fluid conductances of the microfluidic channel (height×width×length×tortuosity) are selected such that ingredients with viscosities in the range of 0.2-100 mPa·sec at the operating temperature of the restrictor plate have flow rates of 1-500 milligrams per second when the pressure differential across the channel is in the range of 1-30 psig. The microfluidic channels can include a central channel and plurality of delivery channels in fluid communication with the central channel (also referred to herein as a "collection channel"), with each delivery channel from the plurality of delivery channels being associated with (and configured to receive fluid from, when mated thereto) an associated cartridge.

Components of the microfluidic dispenser apart from the mixing chip and the cartridges can be made of, for example, one or more of the following non-exhaustive list of materials: stainless steel, brass, high temp engineering plastics (such as Ultem, polyetheretherketone (PEEK), polyetherimide (PEI), Torlon, Teflon, polyimide, polypropylene, polysulfone, polytetrafluoroethylene (PTFE), polyphenylene sulfide, polyvinylidene fluoride, polyamide-imide, fluorinated ethylene-propylene, Noryl, polychlorotrifluoroethylene, or Vespel).

In some embodiments, a microfluidic dispenser includes a chassis and a docking block. The chassis can include a restrictor plate and electronics for controlling one or more pumps, displays, processors, sensors, etc. The docking block can be configured to mechanically receive (or "dock") at least a portion of each of a plurality of cartridges, e.g., in sockets thereof. Each socket within the docking block can be configured to receive a single cartridge. In some implementations, each socket of the docking block is the same size and/or shape, such that a given/particular type of cartridge can be received within any of the sockets of the docking block, interchangeably. The combination of the chassis and the docking block can be referred to as a "super-configuration" (or a docking block that has been "primed"), and an arrangement of multiple cartridges installed in the docking block can be referred to as a docking block "configuration."

In some embodiments, the operation of the microfluidic dispenser during a dispense event, implemented via an instruction set and for a recipe having three ingredients, begins with a flush (e.g., with an inert diluent, such as MCT) of the central collection channel, to ensure a lack of any residues from prior dispense events. The flushed MCT is scrapped, and additional MCT is introduced into the central collection channel to pre-fill the microfluidic channels. A predetermined quantity (based on the recipe) of a first ingredient is delivered, from the cartridge containing the first ingredient, toward the central collection channel via the associated delivery channel. Next, a predetermined volume of MCT (e.g., approximately equal to the volume of the central collection channel) is introduced into the microfluidic channels. Next, a predetermined quantity (based on the recipe) of a second ingredient is delivered, from the cartridge containing the second ingredient, toward the central collection channel via the associated delivery channel.

Another predetermined volume of MCT (e.g., approximately equal to the volume of the central collection channel) is then introduced into the microfluidic channels. A predetermined quantity (based on the recipe) of a third ingredient is delivered, from the cartridge containing the third ingredient, toward the central collection channel via the associated delivery channel. At this stage, the recipe has been fully executed. To complete the dispense event, a final predetermined volume of MCT (e.g., approximately equal to six times the volume of the central collection channel) is then introduced into the central collection channel to ensure a complete displacement of all residues of the ingredients into the receiver.

In some embodiments, a method for dispensing a desired formulation includes receiving a signal representing a desired formulation including a plurality of ingredients. In response to receiving the signal representing the desired formulation, generating a set or sequence of control instructions (an "instruction set" or a "command file") based on characterization data associated with each ingredient from the plurality of ingredients. The control instructions can specify one or more of: a temperature setpoint for one or more fluid pathways (e.g., microfluidic channels) within the microfluidic dispenser, a maximum temperature threshold for the one or more fluid pathways, a minimum temperature threshold for the one or more fluid pathways, a solenoid open duration for at least one solenoid from a plurality of solenoids, a delivery sequence specifying an ordered plurality of cartridges and/or fluid pathways for dispensing, a pressure setpoint associated with at least one pump from a plurality of pumps, etc. The set of control instructions can be sent to the microfluidic dispenser to cause control of the microfluidic dispenser to cause dispensing of the desired recipe via execution of a multiple delivery events.

In some embodiments, during operation, the microfluidic dispenser causes delivery of fluid(s) (also referred to herein as "ingredients") from each of the one or more cartridges (or a subset thereof, depending on the recipe) to a central channel of the mixing chip from which the fluid(s) are dispensed into a receiver via the dispenser nozzle. The delivery of the fluid(s) can be triggered and/or controlled by one or more instructions of an instruction set that are executed on the microfluidic dispenser. The instruction set can be associated with one or more selected recipes (each of which produces an associated formulation), and can include instructions to cause control of one or more of: onboard electronics, heaters, temperature sensors, valves, and pumps, to accomplish the dispensing of a desired formulation (which may include a single ingredient or multiple ingredients). Execution of the instruction set (also referred to herein as a "dispense event") can be caused and/or modified by at least one of: a signal received at the microfluidic dispenser from a control compute device in communication therewith (e.g., wireless or wired network communication), a signal received at the microfluidic dispenser from a remote compute device in communication therewith (e.g., wireless or wired network communication), or a signal generated in response to a user input made via a graphical user interface of the microfluidic dispenser (e.g., a touchscreen and/or button press(es)).

During execution of the instruction set, one or more properties of the dispense event can be actively (e.g., intermittently, according to predefined schedule, or continuously) monitored to generate dispense event data that is sent, as feedback, to a software application for use in modifying the instruction set dynamically (i.e., during the dispense event, optionally iteratively) and/or for future use. Modifying the instruction set dynamically, or "dynamic blend changing," can be based on sensor data collected at the microfluidic dispenser (e.g., temperature(s), pressure(s)), and in response the delivery durations can be dynamically adjusted such that the amount of each component delivered more closely conforms to the amount specified in the recipe. As an example, if a temperature detected near a dispense channel is higher than the predetermined temperature, the dispense duration of an ingredient can be automatically adjusted (e.g., reduced) to compensate. In some implementations, if a detected deviation of temperature or pressure exceeds predetermined thresholds, the dispense event can be terminated.

Fluid dispensing performed using microfluidic dispensers, systems and methods set forth herein can be referred to as performing "time-pressure dosing" since fluids are caused to flow, via pressurization, from reservoirs, through constrictions (restrictor channels) in the restrictor plate of the microfluidic dispenser, and into the central collection channel during dispense events. The MCT restrictor channel enters the central collection channel at its proximal end. The central collection channel connects to the dispense port at the distal end. Ingredient restrictor channels enter the central collection channel at various intermediate positions along its length. The volume of the central collection channel from entry point of an ingredient restrictor channel to the distal end is referred to as the contained volume for that ingredient. Single deliveries of ingredients to the central collection channel are preferably, but not obligatorily, designed so as to not overflow the contained volume for that ingredient entry position. Thus, each ingredient involved in a dispense will have a "preferred position" within a docking block of the microfluidic dispenser.

FIG. 1 shows a method for dispensing a desired formulation from a microfluidic dispenser, according to some embodiments. As shown in FIG. 1, the method 100 includes analyzing, at 102, ingredients of a recipe, e.g., using gravimetric detection (defined below), to determine characterization data for the ingredients. At 104, a signal representing an instruction to dispense the recipe is received at a processor operably coupled to a microfluidic dispenser. In response to receiving the signal representing the instruction to dispense the recipe, at 106, an instruction set (or "dynamic blend logic") is generated based on the recipe and the characterization data, and the instruction set is executed, to cause a dispense event at a microfluidic dispenser. In some embodiments, the instruction set specifies delivery and/or dispense parameters in units of mass (e.g., grams). During the dispense event, at 108, a variation in a temperature or a pressure of the microfluidic dispenser is detected. In response to detecting the variation in temperature or pressure at 108, the processor automatically causes an adjustment (at 110) to one or more instructions from the instruction set based on the detected variation. The method 100 can be performed by a processor that resides within, is local to, or is in wired or wireless network communication with, the microfluidic dispenser. In some embodiments, the processor is also configured to automatically detect a conflict, during execution of the instruction set, and trigger a conflict resolution procedure. Although shown and described herein as "microfluidic" dispensers, other dispensers that do not include microfluidics can be used, as an alternative to or in addition to, one or more microfluidic dispensers. Examples of dispensers that are not microfluidic dispensers include, but are not limited to, barrel dispensers, cartridge dispensers, valve tank dispensers, tube pump dispensers, robotic dispensers, syringe dispensers, etc.

Figure 2:
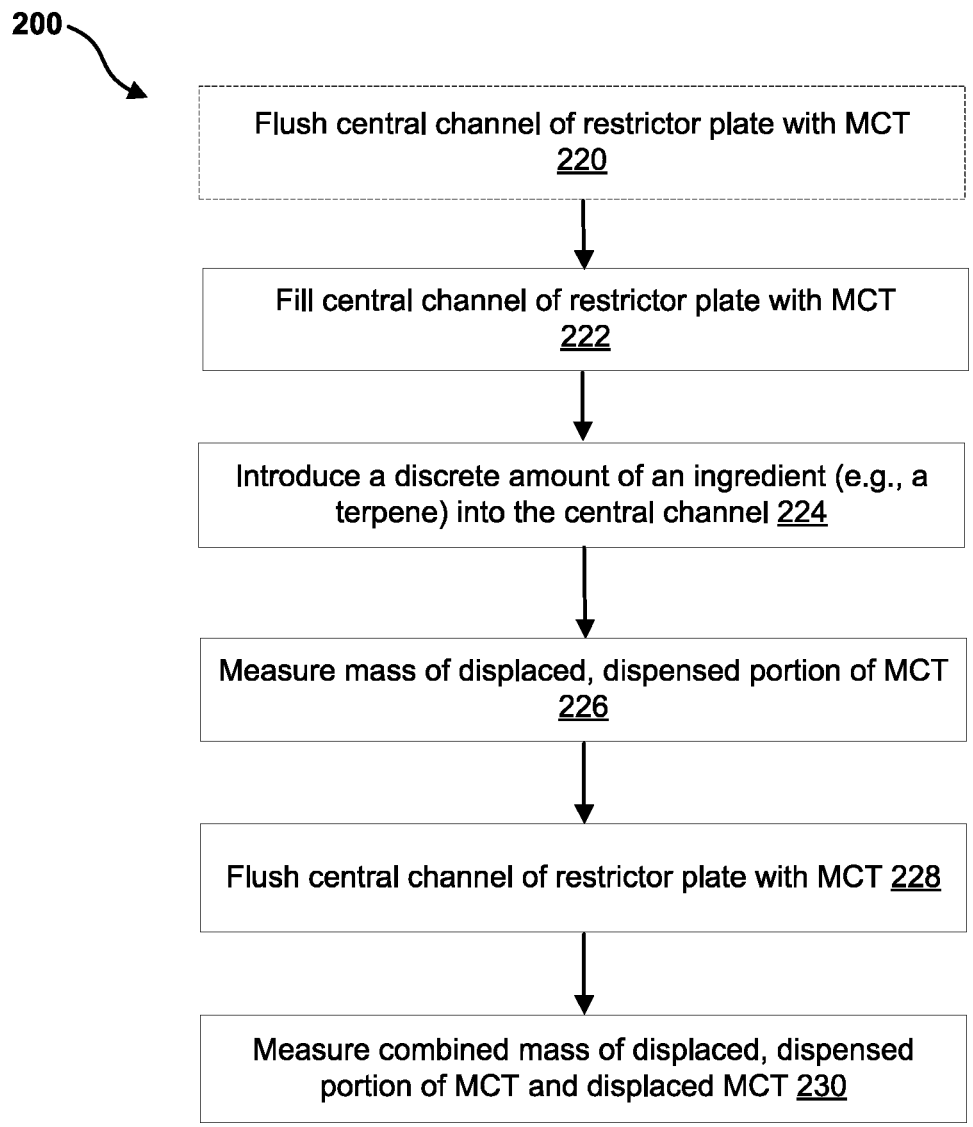
FIG. 2 shows a method for calibrating a microfluidic dispenser, according to some embodiments.

FIG. 2 shows a method for calibrating a microfluidic dispenser (i.e., calibration testing), according to some embodiments. As shown in FIG. 2, the method 200 optionally begins with flushing a central collection channel of the restrictor plate, at 220, with an inert diluent such as medium chain triglyceride ("MCT") (e.g., to flush away residue that may be present within the central channel from a previous dispense event). The central collection channel can have a volume from its proximal to its distal end of, for example, about 50-500 uL. The fluid dispensed during the flush is discarded. At 222, the central channel of the restrictor plate is filled with MCT, and a discrete amount of an ingredient (having a volume less than its contained volume in the central channel), for example a terpene such as beta-Caryophyllene, is introduced into the central channel at 224, causing a portion of the MCT in the central channel to be displaced via the dispenser nozzle into a receiver. At 226, a mass of the displaced MCT is measured, and the corresponding mass of the discrete amount of the ingredient delivered to the central collection channel is calculated. The calculated mass of the ingredient delivered to the central collection channel is proportional to the measured mass of the MCT displaced to the receiver. The proportionality constant is the ratio of the density of the ingredient to the density of MCT as determined at the operating temperature of the restrictor plate. The central channel of the restrictor plate is again flushed with MCT, at 228, and the contents of the central channel are dispensed into the same receiver that received the portion of the MCT at 224. The duration of the MCT flush at 228 can be, for example, about 10 seconds (e.g., 10.5 seconds). The combined mass of the dispensed, displaced portion of MCT (from 224) and the flushed contents of the central channel (including the discrete amount of the ingredient) is determined at 230, and the actual mass of the discrete amount of the ingredient is determined based on the combined mass of the dispensed, displaced portion of MCT and the flushed contents of the central channel (including the discrete amount of the ingredient). As an example, the combination of the dispensed, displaced portion of MCT and the flushed contents of the central channel can include about 1.15 grams of MCT and about 200 mg of the ingredient (e.g., a terpene). In some implementations, if the actual mass is within about 20% of the expected mass, the microfluidic dispenser is deemed calibrated for that ingredient, or calibrated for that ingredient in combination with the delivery channel to which that ingredient was fluidly coupled during the calibration procedure. Steps 220 through 230 can be performed iteratively, to verify results for a particular ingredient. Steps 220 through 230 can also be performed multiple times, for each of multiple different ingredients, or for each of multiple different ingredients in combination with each of multiple different delivery channels within the mixing chip. Although the embodiment of FIG. 2 is described as measuring mass at each of steps 226 and 230, in other embodiments, instead of or in addition to mass, another parameter (e.g., volume or weight) can be measured and used to calibrate the microfluidic dispenser. In some implementations, once a calibration has been performed, that calibration can be relied upon as long as the cartridges are not changed, or as long as the cartridges are refilled from a common batch of an ingredient. Calibration can be performed per ingredient batch, and per channel (for that batch).

In some embodiments, solenoid open durations are determined, based on the mass measurements, for each ingredient from a plurality of ingredients and for each microfluidic channel of a restrictor plate, for a given configuration of cartridges within a docking block. One or multiple instantaneous temperature measurements are taken within the microfluidic dispenser prior to a dispense event (e.g., a calibration event), to determine a temperature ("T") of the microfluidic dispenser. The actual mass ($M_{actual}$) delivered of each ingredient is measured, for a given dispense duration, at the temperature T, for example as described above. Separately, a mass delivered at a temperature of 60° C. (M60) is calculated for the ingredient, for the given dispense duration. An idealized flow rate equation is then determined, based on M60, and the actual solenoid open duration. These flowrate equations are often first order polynomials, where the slope is the flowrate and the intercept is the minimum dispensed mass. When it is desired to deliver a specific mass of an ingredient for a dispense, the idealized flow rate equation is mathematically inverted, the idealized solenoid open duration is calculated as the dependent variable, the amount the temperature of the restrictor plate deviates from 60° C. is measured, and a correction factor based on this temperature deviation is applied to the idealized solenoid open duration.

Figure 3:
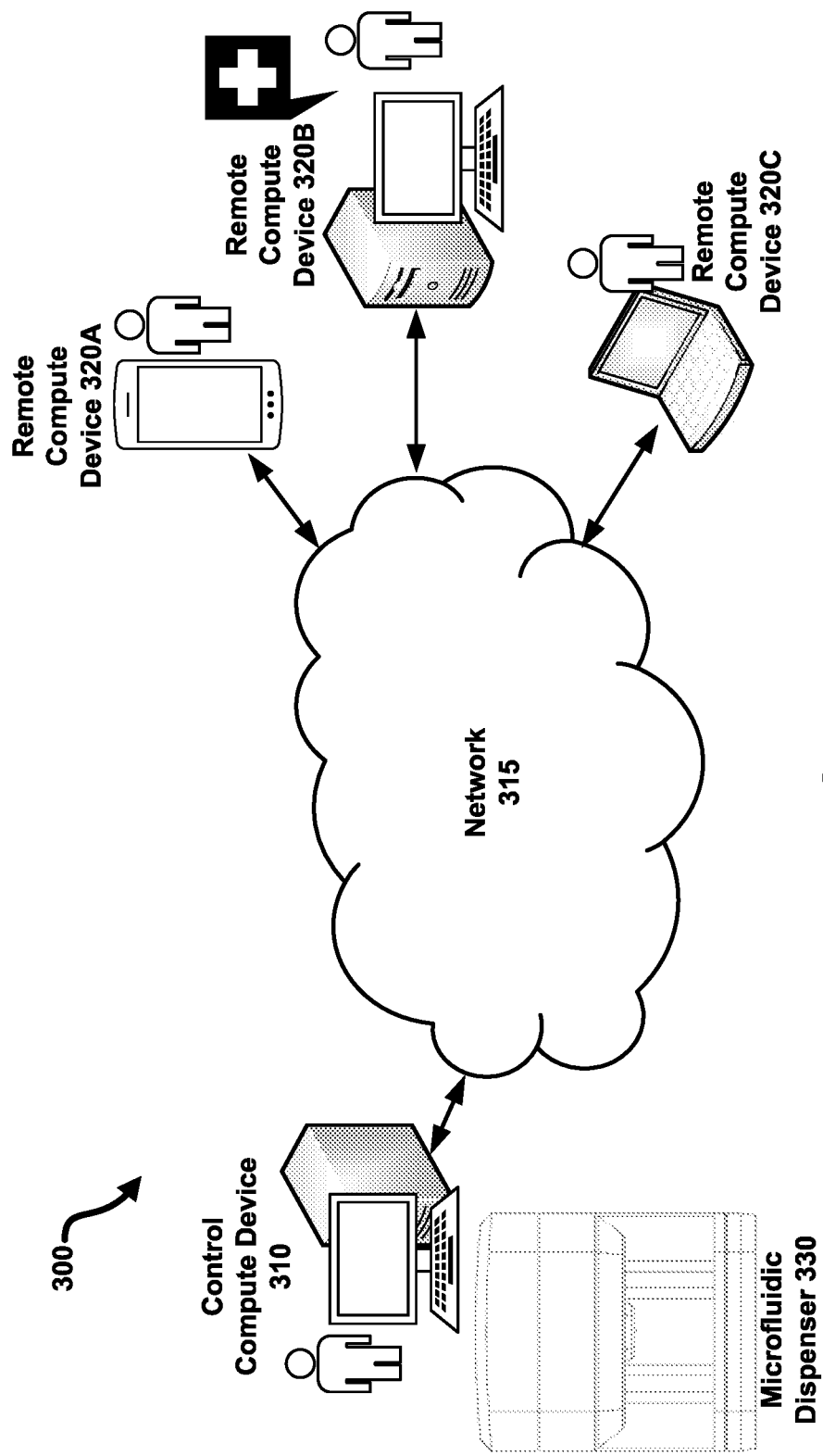
FIG. 3 is a diagram of a networked system including a microfluidic dispenser, according to some embodiments.

FIG. 3 is a diagram of a networked system including a microfluidic dispenser, according to some embodiments. As shown in FIG. 3, the system 300 includes a control compute device 310 including a processor, a non-transitory memory storing processor-executable instructions, and a transceiver. The control compute device 310 can be operably coupled to, and configured to control, the microfluidic dispenser 330, for example using an instruction set and/or by implementing one or methods as set forth herein. The control compute device 310 can also include a terminal (e.g., a display configured to render a graphical user interface (GUI)) with which an operator or other user can interact. The control compute device 310 can communicate with one or multiple remote compute devices (e.g., remote compute devices 320A-320C), for example via a wireless or wired communications network 315. In some implementations, the remote compute device 320A is a compute device (e.g., a mobile device such as a smartphone, a desktop computer, a tablet, or a laptop computer) of a user, such as a smartphone running a mobile software application that communicates with a software application of the control compute device 310 (e.g., by sending requests for formulations to be dispensed, formulation usage data, requests for formulation information, etc.). The software application of the control compute device can be referred to as a dispenser software application. Alternatively or in addition, the remote compute device 320B can be a compute device of a healthcare practitioner, the compute device running a provider-type software application that communicates with a software application of the control compute device 310 (e.g., by sending orders for formulations to be dispensed, formulation usage data, requests for formulation information, etc.). Alternatively or in addition, the remote compute device 320C can be a compute device of a dispensary or other retailer, the compute device running a retailer-type software application that communicates with a software application of the control compute device 310 (e.g., by sending orders for formulations to be dispensed, formulation usage data, requests for formulation information, etc.). In some implementations, the dispenser software application is configured to generate and/or modify recommendations, for example based on historical data compiled for previous/historical dispense events (e.g., user feedback, user preferences, etc.) and/or based on known potential interactions of formulations or ingredients with other substances that the intended user takes.

Figure 4:
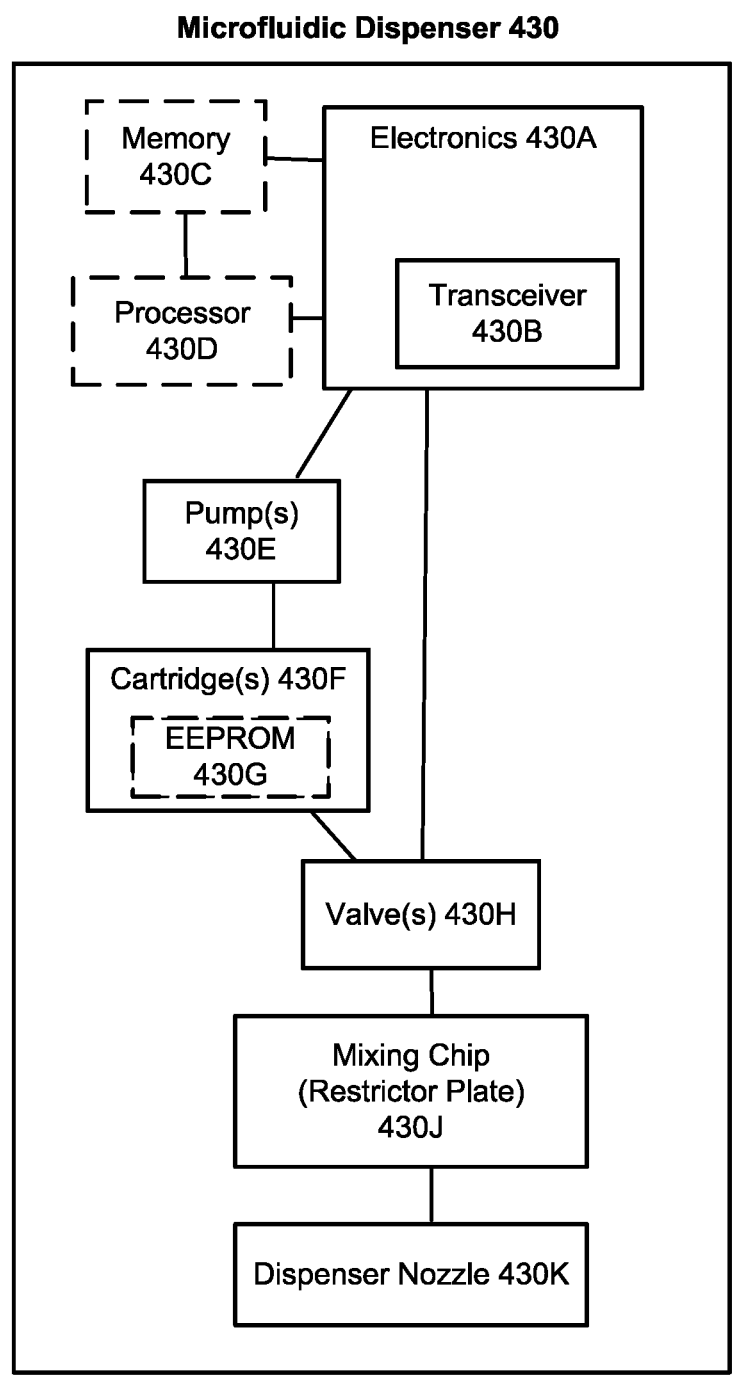
FIG. 4 is a block diagram showing internal components of a microfluidic dispenser, according to some embodiments.

FIG. 4 is a block diagram showing internal components of a microfluidic dispenser, according to some embodiments. As shown in FIG. 4, the microfluidic dispenser 430 includes electronics 430A including a transceiver 430B, one or more pumps 430E, one or more cartridges 430F (if installed), one or more valves 430H, a mixing chip (also referred to herein as a "restrictor plate") 430J, and a dispenser nozzle 430K. The electronics optionally also include a pressure regulator and/or a digital pressure controller. The cartridge(s) 430F can include integrated EEPROM 430G. The microfluidic dispenser 430 also optionally includes a memory 430C operably coupled to, and accessible by, a processor 430D that can optionally control the electronics 430A. The electronics 430A are electrically coupled to the pump(s) 430E (e.g., to control powering the pump(s) 430E on and off) and the valve(s) 430H (e.g., to cause the valve(s) 430H to open and close, e.g., in accordance with an instruction set).

In some embodiments, the pump(s) 430E of the microfluidic dispenser 430 include one or more positive displacement pumps, for example, micro gear pumps. In some such embodiments, fluid metering occurs as part of the pumping process, where the pump itself acts as a dosing element, as opposed to the time-pressure dosing. The microgear pump(s) can have a pumping speed in microliter per second (uL/sec) range, and be scaled up to the Liters per second (L/sec) range. The dispense rate can depend on, and thus can be controlled (e.g., automatically and/or electronically) by, the revolutions per minute (RPM) of the gears of the micro gear pump. Since fluid is transported from one side of the micro gear pump to the other side of the micro gear pump via very small volumes/regions defined between each tooth of a first gear of the micro gear pump and the depression of a second gear thereof with which the first gear mates, very high precision fluid volumes can be dispensed using micro gear pumps. In some implementations, the microfluidic dispenser system is configured to compensate for a mechanical backlash that occurs upon startup of the micro gear pump(s), to mitigate or eliminate nonlinearity in dispense properties during a startup period. For example, an initial, predetermined dispensed amount can be discarded/scrapped, to ensure consistency from dispense event to dispense event. microfluidic channelmicrofluidic channel In some embodiments, pump(s) 430E of the microfluidic dispenser 430 include one or more piezoelectric inkjet pumps, and during a dispense event, the receiver (e.g. a bottle) can be moved from one pump outlet or dispenser nozzle to the next pump outlet or dispenser nozzle, among an arrangement of pump outlets or dispenser nozzles. Piezoelectric inkjet pumps can dispense liquid volumes on the order of nanoliters or femtoliters.

In some embodiments, pump(s) 430E of the microfluidic dispenser 430 include any combination of the following types of pumps: centrifugal pumps (e.g., for medium-viscosity applications), piezoelectric inkjet pumps, syringe pumps, gear pumps (e.g., micro gear pumps), drop spin liquid pumps, chemical metering pumps (e.g., diaphragm or peristaltic), drum pumps (e.g., oil drum pumps), and positive displacement pumps.

In some embodiments, the microfluidic dispenser dispenses fluids, in accordance with recipes, in amounts to fill a bottle or other relatively small (e.g., 0.1 mL, 0.2 mL, 0.25 mL, 0.3 mL, 0.4 mL, 0.5 mL, 0.6 mL, 0.7 mL, 0.8 mL, 0.9 mL, 1 mL, 2 mL, 3 mL, 4 mL, 5 mL, 6 mL, 7 mL, 8 mL, 9 mL, 10 mL, 20 mL, 30 mL, 40 mL, 50 mL, 75 mL, 100 mL, or any size between 0.1 mL and 100 mL, or between 0.25 mL and 1 mL, or between 10 mL and 50 mL, or between 0.1 mL and 1 mL, or between 0.1 mL and 10 mL, or between 10 mL and 100 mL, or between 10 mL and 50 mL, or between 20 mL and 75 mL, or between 20 mL and 100 mL, or between 30 mL and 100 mL, or between 40 mL and 100 mL, or between 50 mL and 100 mL, or between 0.1 mL and 0.2 mL, or between 0.2 mL and 0.3 mL, or between 0.3 mL and 0.4 mL, or between 0.4 mL and 0.5 mL, or between 0.5 mL and 0.6 mL, or between 0.6 mL and 0.7 mL, or between 0.7 mL and 0.8 mL, or between 0.8 mL and 0.9 mL, or between 0.9 mL and 1 mL) containment vessel (also referred to herein as a "receiver"). In other embodiments, the microfluidic dispenser dispenses fluids, in accordance with recipes, in amounts to fill a larger containment vessel (e.g., one liter or larger), and the dispensed liquid is subsequently transferred from the filled containment vessel to smaller bottles.

Although described herein as a "microfluidic" dispenser, within microfluidic channels defined within a mixing chip (or "restrictor plate"), in other embodiments, a dispenser includes a system of tubing and/or macrochannels (e.g., having a channel width of ~1 mm or greater), instead of microfluidic channels, for delivering fluids from the cartridges to the dispenser nozzle, and includes one or more syringe pumps to assist with fluid delivery and dispensing. In still another embodiment, e.g., for an industrial application, fluid(s) can be transferred via one or more pipettes that withdraw fluid directly from a reservoir and automatically transfer the fluid into a plurality of receivers, for example robotically. The generation of instruction sets for dispensing fluids via embodiments using macroscale fluidics can be performed using one or more turbulent flow models.

As used herein, the term "delivery" refers to the movement of one or more ingredients from one or more ingredient-containing cartridges or other container into a fluid channel (e.g., a microfluidic channel) of the microfluidic dispenser for routing, for example, to a central fluid channel thereof. The term "dispense" refers to the movement of one or more ingredients (e.g., as a blend) through an end orifice (e.g., dispensing nozzle) of the microfluidic dispenser.

As used herein, the phrase "dynamic blend logic" refers to a complex set of instructions (or "recipe"), stored in memory and executable by a processor of the microfluidic dispenser, the complex set of instructions including different dispense instructions for each batch of each ingredient, each ingredient and/or each microfluidic channel of the microfluidic dispenser, the dispense instructions generated based on a set of characterization processes and/or calibration processes.

As used herein, the phrase "dispense event" (or "dispensing event") can refer to any one of: (1) the dispensing, from the microfluidic dispenser, of a single ingredient; (2) the dispensing, from the microfluidic dispenser, of multiple ingredients sequentially into a collection receptacle (e.g., according to an instruction set); (3) the dispensing, from the microfluidic dispenser, of multiple ingredients concurrently into a collection receptacle (e.g., according to an instruction set); or (4) dispensing multiple ingredients from the microfluidic dispenser in such a manner that a mixture is formed in the collection receptacle.

In some embodiments, dispensing from the microfluidic dispenser occurs via a single dispenser nozzle that is in fluid communication with a central channel of the microfluidic dispenser. In other embodiments, the microfluidic dispenser does not include a central channel, and the dispensing from the microfluidic dispenser occurs via each of a plurality of dispenser nozzles, each in fluid communication with an associated cartridge location.

Precision Control of Dispense Events of the Microfluidic Dispenser

Viscosity and Temperature Measurements

In some embodiments, the viscosities of to-be-dispensed ingredients are measured, with a high degree of precision and at multiple temperatures over a desired operating range, prior to a dispense event. The viscosity data can be stored (e.g., in a memory that is local to, or accessible by a processor of, the microfluidic dispenser.

In some embodiments, during operation of the microfluidic dispenser, instantaneous temperature measurements are made of the mixing chip/restrictor plate (installed in the microfluidic dispenser) to determine an operating temperature, and the viscosities of one or more to-be-dispensed fluids at that operating temperature are calculated or retrieved (e.g., via a lookup in memory). A dispense duration is then calculated based on the operating temperature and the identities of the one or more to-be-dispensed fluids (and/or based on the determined viscosities). Determining dispense duration (s) in such a manner results in consistent, precise dispensing, while taking into account temperature variations of the restrictor plate.

In some embodiments, the temperature of the restrictor plate is thermostatically controlled. Multiple arrangements of hardware may be employed by one skilled in the art of thermostatic control of temperature to achieve the temperature control desired for operation of this device.

In some embodiments, the microfluidic dispenser system is configured to detect and monitor (via software, firmware and/or hardware) variations in temperature (for example ±0.1 C°) and/or pressure (for example ±0.01 psig) occurring within the microfluidic dispenser, and to automatically adjust one or more instructions of the instruction set based on the detected variations in temperature and/or pressure, in response to detecting those variations.

In some embodiments, the microfluidic dispenser system includes multiple heaters and is configured to measure the instantaneous temperature of one or multiple positions/locations within the microfluidic dispenser. Based on the measured instantaneous temperatures and information regarding how the viscosity of one or more of the ingredients of a recipe changes over temp, the microfluidic dispenser system adjusts the solenoid valve "open" time to compensate for temperature deviations from their predetermined setpoints.

Gravimetric Dissection

In some embodiments, a method for precision control and characterization of dispensed substances includes a screening step (or phase) during which gravimetric dissection is performed. As used herein, the phrase "Gravimetric Dissection" refers to the collection of characterization data associated with each ingredient from one or more ingredients associated with a desired formulation or recipe. The formulation or recipe can be for a fluid to be dispensed from a microfluidic dispenser, as set forth herein. The characterization data can include one or more of: mass of the ingredient(s), viscosity of the ingredient(s) at each of a plurality of temperatures, density of the ingredient(s) at each of a plurality of temperatures, known flow rates of the ingredient(s) at each of a plurality of temperatures and/or pressures (e.g., for a given solenoid aperture size), physical behavior of the ingredient(s) at each of a plurality of temperatures and/or pressures, mechanical behavior of the ingredient(s) at each of a plurality of temperatures and/or pressures, and chemical behavior of the ingredient(s) at each of a plurality of temperatures and/or pressures.

During gravimetric dissection, one or more properties of one or more ingredients can be characterized using one or more characterization instruments. Properties characterized during the screening step can include mass, viscosity, density, flow rate, UV/VIS absorbance, chemical purity, $^1$H or $^{14}$C NMR spectra, or optical rotation, etc. One skilled in the art chemical characterizations will be able to select instruments for measuring these properties. In some embodiments, the screening step (or phase) includes characterizing the one or more properties of one or more ingredients at each of multiple temperatures in a temperature range that brackets the intended operating temperature of the device. Flow rate ("Q") can be a function of pressure and temperature, e.g., measured in milligrams per second (mg./second).

In some embodiments, during a dispense event, the processor detects, at a nominal intervals (e.g., every ~10 milliseconds (ms)), a status (e.g., open or closed) of the solenoid valve. The nominal interval can be referred to as the polling latency and relates to the limiting precision of the delivery of a component to the collection channel.

Recipe and Instruction Set Modification

In some embodiments, the microfluidic dispenser system is configured to modify a recipe based on data associated with a prior dispense event. The data associated with the prior dispense event can include time to dispense during the prior dispense event, temperature during dispense (e.g., at a specified location) during the prior dispense event, identification of one or more microfluidic channels used during the prior dispense event, etc.

In some embodiments that use solenoid valves, each combination of ingredient, solenoid valve, restrictor channel, and device chassis has an associated property referred to as the "minimum dispensed mass". The open-close cycle of a solenoid valve has three stages: a start-up upset, a steady state flow, and a shut-down upset. The start-up upset and the shut-down upset are a consequence of the flexing of the diaphragm inside the valve cavity of the solenoid valve. The contribution of the start-up upset plus the shut-down upset to the total mass flow through the solenoid valve is this minimum dispensed mass. The calculation of an appropriate solenoid duration for a given ingredient at a given docking location (e.g., during the generation of an instruction set) can include the contribution of the minimum dispensed mass. In some embodiments, temperature measurements within the microfluidic dispenser are made using one or multiple sensors, thermocouples, resistance temperature detectors, etc. For example, multiple diode temperature sensors (e.g., two, four, six, eight, or more than five diode temperature sensors) can be used. Each diode temperature sensor can be disposed within the microfluidic dispenser such that it passes through an opening/channel in the docking block and makes physical contact with (or comes within close proximity to) the restrictor plate. In an example implementation, four diode temperature sensors are used, with one of the diode temperature sensors in each quadrant. Readings/measurements from the diode temperature sensors can be averaged, and the average temperature can be fed back to the control system for adjustment to one or more instructions and/or for storage as tracking data (E.g., during operation of the microfluidic dispenser during a dispense event). Alternatively or in addition, a numerical analysis technique (e.g., using multi-point Savitzky-Golay convolution integers, a numerical smoothing algorithm, etc.) can be applied to the readings/measurements from the diode temperature sensors for determining temperature(s) within the microfluidic dispenser. In some embodiments, gravimetric dissection and/or calibration is performed on each microfluidic channel of the mixer chip.

Ingredient Additives

In some embodiments, one or more additives are introduced to one or more ingredients, one or more of: prior to the use of the ingredient(s) in the microfluidic dispenser, during a dispensing event, or after a dispensing event. For example, the one or more additives can be added to a selected cartridge prior to installation of the selected cartridge in the microfluidic mixer. Alternatively or in addition, one or more additives can be dispensed from one or more dedicated cartridges containing the one or more additives during a dispense event. For example, in some embodiments, one or more inert diluents (or "diluting agents"), such as a medium chain triglyceride, MCT, or a short chain triglyceride, triacetin, are added to one or more ingredients (e.g., terpene) in the cartridge and/or in the mixing chip, to achieve finer control (i.e., high resolution) over the delivery events. By diluting an ingredient, the minimum amount of the ingredient that can be reliably and reproducibly delivered via the microfluidic dispenser can be reduced, facilitating high-precision dosing of the dispensed formulations. Dilution of ingredients can be particularly beneficial, for example, when preparing formulations for healthcare applications or vaporizer ("vape") cartridges.

In some embodiments, one or more additives having a therapeutic property (e.g., to alleviate pain, inflammation, anxiety, PTSD, insomnia, or depression), such as turmeric, curcumin, ketamine, nootropics, ayahuasca, MDMA, are added to the terpene(s) and/or cannabinoid(s), in the cartridge, and/or in the mixing chip during a dispense event, or directly in the container prior to or after the terpenes and cannabinoids are dispensed into the container.

Pre-Mixing of Ingredients in Cartridges

Terpenes have associated viscosity profiles, and the viscosities of many terpenes within the range of operational temperatures of the microfluidic dispenser are very low. Other materials, including cannabinoids such as CBD, have a higher viscosity and thus can be difficult to dispense because the solenoid durations must be so long. In some embodiments, one or more terpenes are combined (e.g., mixed, blended) with one or more cannabinoids (such as CBD) to increase the viscosity relative to the one or more terpenes alone. This mixing (or blending) can be performed, for example, within each of one or more cartridges prior to or after their installation into the docking block of the microfluidic dispenser. In other words, the cartridges can undergo a pre-mixing preparatory step, prior to their use in the microfluidic dispenser. During the pre-mixing step, one or more of: CBD, CBD-A, THC, THC-A, THC-B, CBN, CBG can be added to any combination of one or multiple terpenes, various triglycerides, essential oils, and/or therapeutic or medicinal herbs (e.g., Chinese herbs).

Healthcare Adviser/Provider Platform

In some embodiments, a microfluidic dispenser system includes a provider software application, for use by, and accessible by a healthcare adviser or healthcare provider (hereinafter "provider"), including a "portal" through which the provider can access information and data associated with one or more of: formulations that can be dispensed from the microfluidic dispenser, clinical trials, research studies, current patients, and other patients (e.g., patients associated with providers that are associated with or use the provider software application, patients for which data is publicly accessible (e.g., from third party data feeds, published research articles, etc.), patient questionnaires, etc.). In some embodiments, the provider software application generates reports and makes them available for retrieval or viewing (e.g., by the provider(s)) via the software application. The generation of such reports can be based on one or more of: real-time feedback from an individual provider's patients, historical feedback from an individual provider's patients, real-time feedback from patients within a community associated with the provider software application (e.g., subscribers or patients of providers that are subscribers), historical feedback from patients within the community, clinical trial data, published research studies, scientific papers, patient questionnaires/surveys, practitioner questionnaires/surveys, consumer questionnaires/surveys, etc. The generated reports can include one or more of: an indication of a symptom or ailment, patient data (e.g., gender, age, ingredient usage history, etc.), historical patient treatment data, an indication of one or more ingredients that are recommended to address the symptom or ailment, an indication of one or more ingredients that are not recommended to address the symptom or ailment, an indication of one or more formulations that are recommended to address the symptom or ailment, an indication of one or more formulations that are not recommended to address the symptom or ailment, known drug interactions with one or more recommended ingredients, known drug interactions with one or more recommended formulations, warning messages, dosage recommendations, historical titration schedules, recommended titration schedules, etc.

In some embodiments, the provider software application can be used to implement an automated titration procedure. For example, a practitioner may submit a recommendation for a formulation, via the portal, to a patient. The practitioner's submission of a recommendation can trigger a signal to be sent to the patient via the provider software application such that the patient is presented with an indication of the practitioner's recommendation (e.g., as an email, an alert message, or text and/or graphics displayed via a GUI of the provider software application, as rendered at a compute device of the patient (e.g., a mobile device, such as a smartphone, or a laptop). The practitioner's recommendation can include an indication of a recommended formulation, having an associated starting level/amount of an ingredient to be titrated, such as THC. The starting level can be, for example, zero milligrams (mg) or a "microdose" amount (e.g., 1 mg, 2 mg, 3 mg, 4 mg, 5 mg, or between 1 mg and 5 mg) of the ingredient to be titrated. In response to receiving the practitioner's recommendation, the patient can indicate, e.g., by interacting with the text and/or graphics displayed via the GUI, an acceptance of the recommendation. Alternatively or in addition, the patient may be prompted to expressly indicate, via the GUI, an acceptance of a titration schedule. In response to receiving a signal representing the patient's acceptance of the recommendation, the provider software application can cause the production/dispensing of the recommended formulation. Subsequently, the provider software application can automatically (e.g., after a predetermined time interval has elapsed and/or based on a predetermined incremental amount of the ingredient to be titrated) generate an updated formulation for the patient, where the updated formulation includes an upwardly-adjusted (increased) or downwardly-adjusted (decreased) amount of the ingredient to be titrated, thereby "titrating" that ingredient. Then, at a predetermined/scheduled time (and/or in response to a request received in the provider software application from the patient), the provider software application can cause another production/dispensing event using the updated formulation. The provider software application can iterate this updating/titration process multiple times, for example until a predetermined upper limit or lower limit level/amount of the ingredient to be titrated has been reached.

The portal can include a navigable user interface (rendered, for example, via a graphical user interface presented on a display screen of a compute device, such as remote compute device 320B of FIG. 3) through which the user can make purchases of formulations and/or browse formulation information. Formulation information can include recipes, recipe ingredients, ingredient identifiers, ingredient names, ingredient purities, ingredient potencies, provenance information associated with the ingredients (e.g., genetic data, source, age, potency, strain, and/or other information for plant-derived ingredients), recommended indications (e.g., fatigue, pain, depression, etc.), drug interaction warnings, recipe/formulation usage statistics, user feedback associated with the formulations, saleable quantities and associated pricing for the formulations. The portal can also facilitate the creation (and, optionally, the subsequent offering for sale) of new formulations. For example, the provider can interact with the portal to create a patient plan and specify ingredients as constituents of a new formulation recipe, which may be a modified version of an existing formulation. The provider can specify the ingredients, ingredient amounts, relative proportions of the ingredient with respect to one another, the preferred or mandated genetic, source, age, potency, strain, and/or other information for the ingredients (e.g., for plant-derived ingredients), etc. The provider can submit an order via the portal for an existing formulation and/or a new formulation. In response to the provider's order, received by the provider software application, the provider software application can cause transmission of a signal (e.g., via a wired or wireless communication network) to a control compute device (e.g., control compute device 310 of FIG. 3) to initiate order fulfillment or to add the order to a fulfillment queue.

Orders received at the control compute device can be prioritized (e.g., based on the date and/or time they were received) so that the microfluidic dispenser can produce/dispense the ordered formulations in order of priority. Once an order has been selected for processing, a dispenser software application can be triggered to execute an instruction set associated with a formulation of the selected order. Transfer of control from the provider software application to the dispenser software application can occur via a handshake exchange.

In some embodiments, an operator of the microfluidic dispenser logs into the dispenser software application, retrieves the order fulfillment queue, and selects (e.g., via by clicking on, within a graphical user interface) an order from the order fulfillment queue, to trigger the generation of one or more instruction sets (each associated with a recipe for a formulation) for that order. The generation of an instruction set can include sending a signal to cause detection of one or more cartridges installed within the microfluidic dispenser, optionally including detection of the location, universal identifier (UID), and/or EEPROM of the one or more cartridges. The generation of the instruction set can also include querying a database to identify chemical properties of the ingredients specified by the recipe. The generation of the instruction set can be based on the physical properties of the ingredient and the location of its cartridge. Once the instruction set has been created, the instruction set can be executed at the microfluidic dispenser to cause the formulation recipe to be dispensed.

In some embodiments, when a new cartridge is installed the microfluidic dispenser, it is detected (e.g., the installation of the cartridge triggers a cartridge detection event), and in response to the detection, the microfluidic dispenser primes the microfluidic channels of the mixer chip. The priming of the microfluidic channels can include, for example, (1) flushing the microfluidics channels with a new ingredient to clear the microfluidics channels by pushing the new ingredient into the central channel, and, subsequently (2) flushing the central channel with MCT or triacetin.

Consumer Product Customization Applications

In some embodiments, a microfluidic dispenser system includes a product customization software application, for use by consumer end users ("consumers"). Examples of consumer products customizable using the product customization software application include, but are not limited to, cosmetics (e.g., liquid foundation (optionally including sunscreen), lip stain, liquid eyeliner, liquid eyeshadow, etc.), sunscreens, moisturizers, body sprays, shampoos, conditioners, hair treatments, skin treatments, ointments, soaps/cleansers, astringents, toners, deodorants, nail polish/enamels, and fragrances/perfumes. The product customization software application can be configured to render (e.g., via a GUI of a compute device of the consumer) a consumer portal with which the consumer can interact (e.g., by pressing, tapping, or swiping on graphical objects, typing on/in text input fields, uploading photographs, etc.) as part of the customization process. As a first example, a consumer may take a self-portrait ("selfie") photograph of himself/herself using a camera of the consumer's mobile device and upload the photograph via the GUI of the product customization software application. Alternatively or in addition, data captured via a scan of the consumer's face or body, and/or data collected by a "smart mirror," can be provided to the product customization software application. In response to uploading the photograph, the product customization software application can generate one or more product recommendations, and transmit a signal to the compute device of the consumer, the signal including an indication of the one or more product recommendations. The one or more product recommendations can be generated using one or more artificial intelligence (AI) algorithms and/or one or more machine learning (ML) models, and can be based any combination of a wide variety of attributes of the photograph (and/or scan data) and/or parameters derived by the product customization software application based on the photograph (and/or scan data), including, but not limited to, any combination of: color value, color hue, color intensity, brightness, dimensions (e.g., width, height, radius, e.g., of a facial feature), moisture content, elasticity, texture, surface roughness, facial geometry, face shape, skin tone, wrinkle data, hormonal imbalance, skin disorder, sun damage, pH level, etc.).

In response to receiving the indication of the one or more product recommendations, the user may input (by interacting with the GUI) one or more product selections. In response to the consumer's product selection(s), the product customization software application can optionally generate or retrieve one or more associated formulations, and cause transmission of a signal (e.g., via a wired or wireless communication network) to a control compute device (e.g., control compute device 310 of FIG. 3) to initiate or queue one or more dispensing events for the one or more formulations, thereby performing order fulfillment, as discussed above. Ingredients suitable for customized consumer products can include any ingredients set forth herein, as well as any combination of the following: collagen (e.g., animal-free collagen), squalane (e.g., sugar cane-based squalane), keratin, and silk proteins.

Experimental Testing

Figure 5:
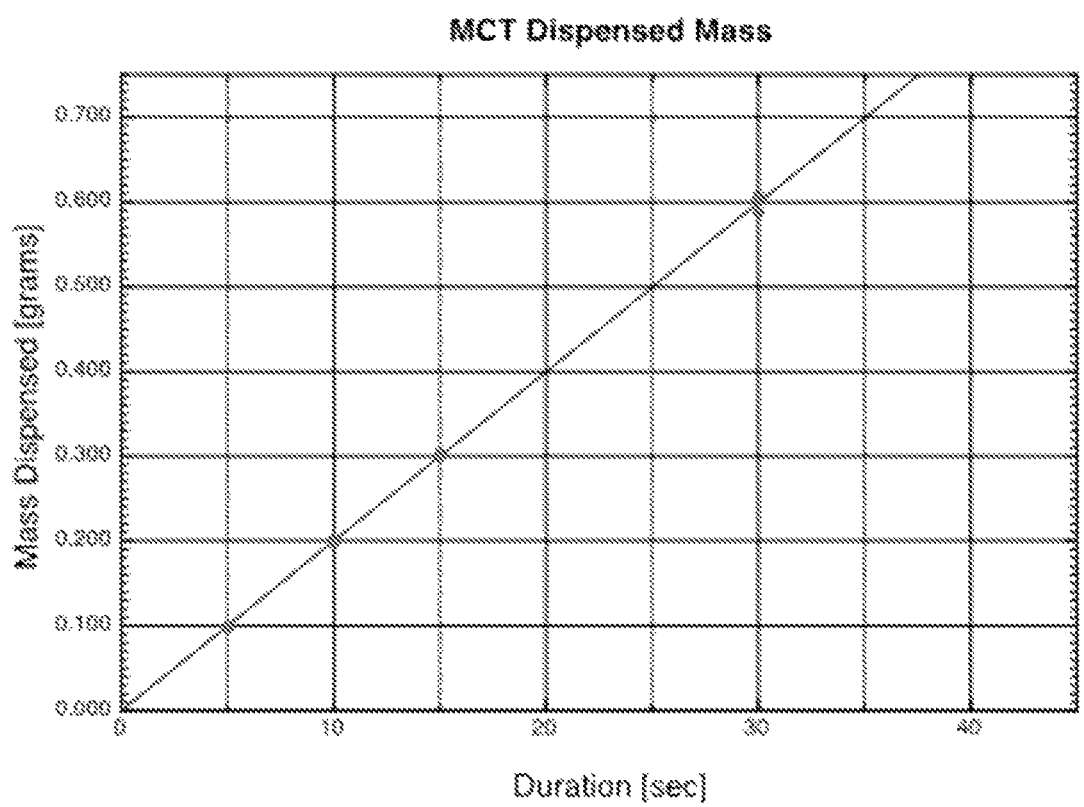
FIG. 5 is a plot of mass dispensed versus duration open for a solenoid valve on a medium chain triglyceride ("MCT") Channel, according to an embodiment.

A temperature-controlled test station was assembled to conduct leak rate tests at 60° C. on liquid-handling solenoid valves manufactured by The Lee Company, compatible with cartridges set forth herein. Leakage was determined gravimetrically. The Lee solenoid valve exhibited a favorable leak rate. A measurement of minimum dispensed volume was also performed using a Lee solenoid valve. A plot of mass dispensed versus duration valve open was constructed over the interval 5 seconds to 30 seconds, and a linear regression line was fitted to the data. Extrapolation of this line to 0 seconds open gave a minimum dispensed mass of 0.52 mg. The plot of these data is presented in FIG. 5.

Leak testing was conducted on a Lee solenoid valve, model LFVA1257107H. This valve is of a suitable form factor to be mounted on the microfluidic dispenser chassis. For the leak test, the valve was mounted onto a manifold. Liquid connections to the entrance and exit ports of the valve were made using Tygothane® tubing, a material known to be compatible with MCT and terpenes at the test temperature. Pressure was supplied to the system using a precision regulator, Omega Engineering, model PRG200. Pressure was measured using a calibrated precision gauge from SSI Technologies. Two sets of measurements were conducted. The first occurred at ambient temperature with no external temperature control. The second occurred at 60° C. under external temperature control. Process temperature was controlled by an Omega Engineering temperature controller, model CN4116, operating in its autotune Proportioning, Integrating, Differentiating (PID) mode. The temperature of the workpiece was sensed using a type-K thermocouple in direct contact with the outside surface of the valve body. Heat was supplied by a Master heat gun with a 475-watt element. The blower on the heat gun supplied air flow. The heating element was independently driven by the external temperature controller.

The heating system was powered on and the autotune function onboard the temperature controller was given 30 minutes to learn the dynamics of the heat balance in the system. After the measured process temperature stabilized at the 60° C. setpoint, the system was given an additional 60-minute soak to ensure temperature equilibration throughout the valve body. Leak tests using MCT and d-limonene were then conducted.

The exit port of the valve was connected to a 1.5 mL Eppendorf sample vial. The vial was weighed before and after the leak test using a U.S. Solid Laboratory Equipment, model USS-DBS8, analytical balance (±0.0001 g). The outcomes of the leak tests are reported in the Table 1 below.

TABLE 1

Outcome of Leak Tests

| Liquid | Temp [° C.] | Press [psi] | Duration [min] | Leakage [milligrams] | Leak Rate [microgram/min] |
|---|---|---|---|---|---|
| MCT | 23.3 | 29.43 | 61 | <0.1 mg (none detectable visually) | <1.6 µg/min |
| MCT | 23.3 | 9.00 | 1142 | <0.1 mg (none detectable visually) | <0.09 µg/min |
| MCT | 60 | 3.00 | 31.5 | <0.1 mg none detectable visually | <3.2 µg/min |
| d-Limonene | 60 | 3.00 | 32.0 | <0.1 mg (none detectable visually) | <3.1 µg/min |

CBD/MCT Calibration Dispenses

Elixinol CBD Isolate

A series of calibration dispenses were conducted using Elixinol-50 (ELX50), a CBD isolate, obtained from Elixinol LLC, Westminster, CO ELX50 was found to be miscible with MCT in all proportions. Phase separations in the collection channel inside the restrictor plate did not occur during the calibration dispenses of ELX50/MCT. ELX50 dispense calibrations demonstrated that there is a defined relationship between the number of seconds the ELX50 solenoid is open and the milligrams of CBD that are dispensed, as measured by a lab. The dispenses performed for these measurements were as follows:

The center/collection channel of a restrictor plate was pre-filled with MCT.

In each of a precision series of measurements and an accuracy series of measurements, the ELX50 solenoid was opened for a predetermined number of seconds. ELX50 was then flowed into the collection channel, displacing some of the MCT into a receiver vial.

A "push" of MCT, 120 mg, was provided to displace the ELX50 dispense from the collection channel into the receiver vial. The size of this MCT push was designed to be equal to the contained volume of the collection channel.

Three additional pushes of MCT were provided to "flush" the collection channel in preparation for the next dispense measurement. These pushes were not collected.

In a carryover series of measurements, these additional pushes of MCT were individually collected and analyzed.

Figure 6:
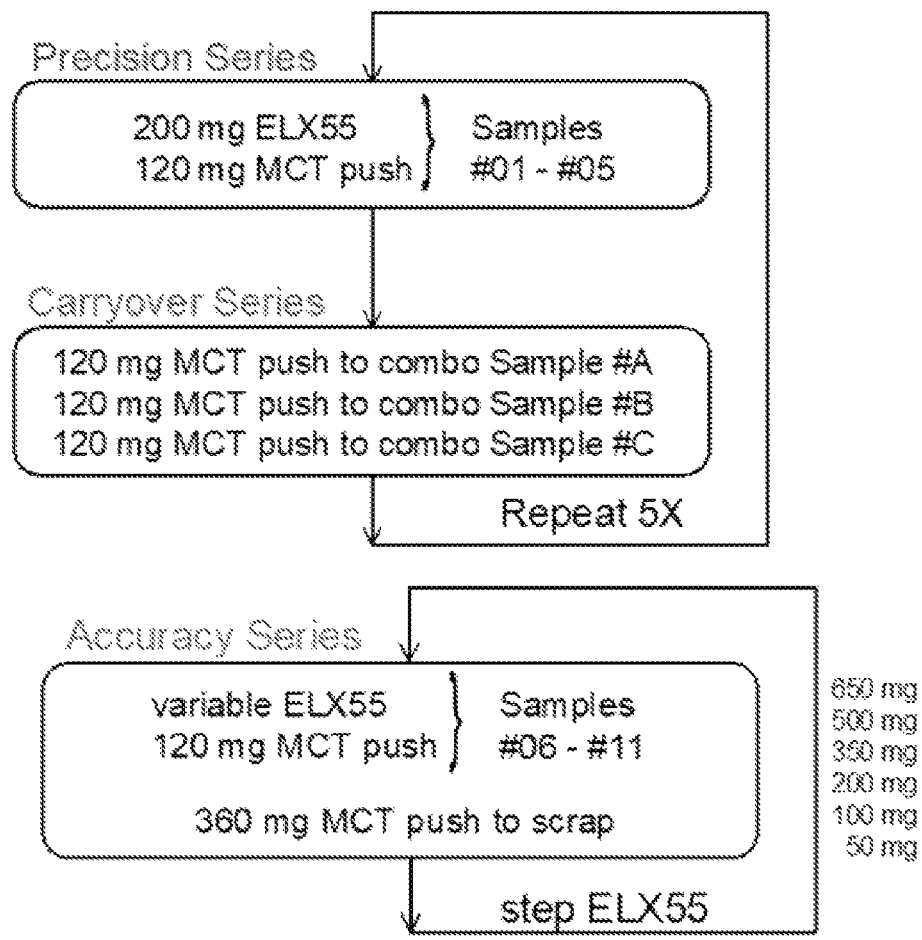
FIG. 6 is a flowchart showing how ELX55/MCT calibration dispenses were conducted.
Figure 7:
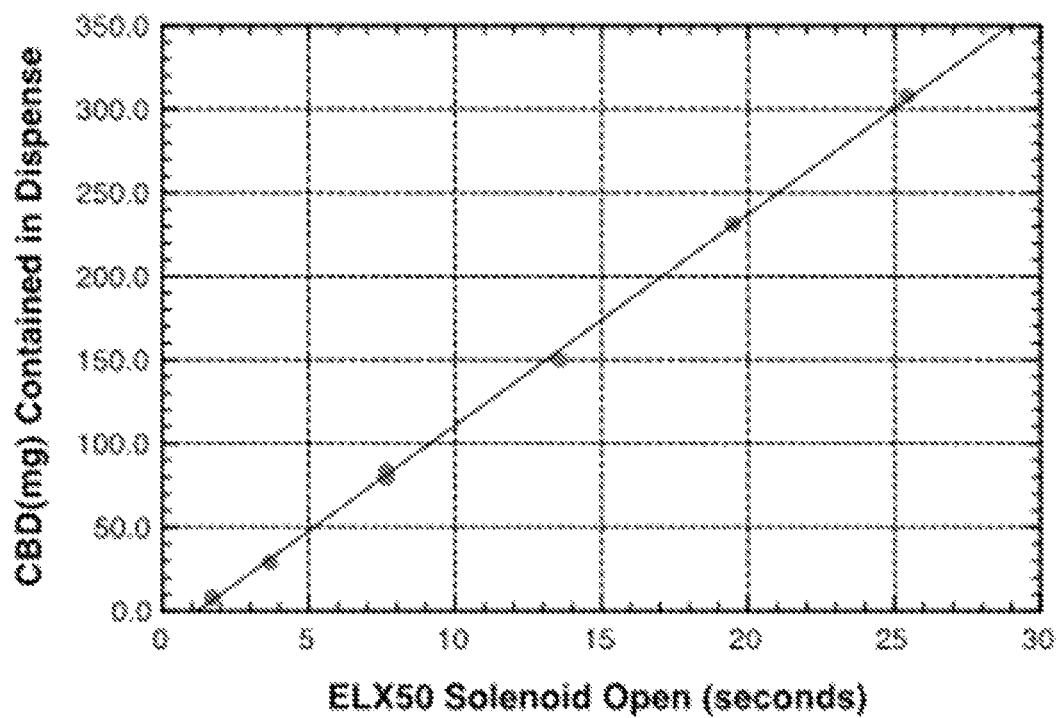
FIG. 7 is a plot of CBD contained in a dispense versus duration open for an ELX50 solenoid, according to an embodiment.

FIG. 6 is a flowchart showing how ELX55/MCT calibration dispenses were conducted. The mass of the sample dispensed into each receiver vial was measured. The percentage by weight and concentration of cannabidiol in each receiver vial were also measured. Multiplying mass by concentration provided the milligrams of cannabidiol contained in each receiver vial. These data are presented in Table 2 (below) and in FIG. 7, with FIG. 7 showing the amount of CBD contained in each dispense versus solenoid open duration.

TABLE 2

ELX50/MCT Calibration Dispenses.

| Sample # | ELX50 Solenoid Open [seconds] | Dispensed Mass [milligrams] | Cannabidiol [% wt/wt] | Cannabidiol Dispensed [milligrams] |
|---|---|---|---|---|
| ELX50 | | | 52.70% | |
| #01 | 7.63 | 374.6 | 33.10% | 84.3 |
| #02 | 7.63 | 386.4 | 30.20% | 80.5 |
| #03 | 7.63 | 387.7 | 30.60% | 81.9 |
| #04 | 7.63 | 388.6 | 30.00% | 80.6 |
| #05 | 7.63 | 389.5 | 29.80% | 80.3 |
| #06 | 1.70 | 192.2 | 11.10% | 8.0 |
| #07 | 3.68 | 264.6 | 20.20% | 29.2 |

TABLE 2-continued

ELX50/MCT Calibration Dispenses.

| Sample # | ELX50 Solenoid Open [seconds] | Dispensed Mass [milligrams] | Cannabidiol [% wt/wt] | Cannabidiol Dispensed [milligrams] |
|---|---|---|---|---|
| #08 | 7.63 | 380.3 | 30.50% | 79.4 |
| #09 | 13.56 | 532.4 | 36.50% | 150.5 |
| #10 | 19.50 | 688.5 | 40.70% | 231.4 |
| #11 | 25.43 | 844.4 | 42.50% | 307.9 |
| #12 | 1.70 | 189.1 | 11.70% | 8.1 |
| #A | 12.40 | 124.0 | 12.40% | 15.4 |
| #B | 5.30 | 127.3 | 5.30% | 6.7 |
| #C | 3.34 | 129.3 | 3.34% | 4.3 |

The correlation coefficient of the linear regression through the data points in FIG. 7 (see EQN 4, below) is 0.9997, which is nearly a perfect fit. The accuracy of these dispense measurements is extraordinarily high.

$$CBD[mg]=12.6210*[Seconds]-15.2705 \quad \text{EQN 4}$$

A precision series of dispenses, including a total of six dispenses, was conducted at the 7.63 second dispense point. These results are presented in Table 3, below.

TABLE 3

Standard Deviation and Coefficient of Variance of 7.63 Second Dispense

| Sample # | ELX50 Solenoid Open [seconds] | Dispensed Mass [milligrams] | Cannabidiol [% wt/wt] | Cannabidiol Dispensed [milligrams] |
|---|---|---|---|---|
| ELX50 | | | 52.70% | |
| #01 | 7.63 | 374.6 | 33.10% | 84.3 |
| #02 | 7.63 | 386.4 | 30.20% | 80.5 |
| #03 | 7.63 | 387.7 | 30.60% | 81.9 |
| #04 | 7.63 | 388.6 | 30.00% | 80.6 |
| #05 | 7.63 | 389.5 | 29.80% | 80.3 |
| #08 | 7.63 | 380.3 | 30.50% | 79.4 |
| Average | | | | 81.2 mg |
| Standard Deviation | | | | ±1.7 mg |
| Coefficient of Variance | | | | ±2.1% |

The coefficient of variance of ±2.1% in Table 3 shows that the microfluidic dispenser operates with a precision that is significantly higher than what is currently required, for example, according to state regulations for the precision of cannabinoid dispenses.

Restrictor Plate (Mixing Chip) Fabrication

Figure 8:
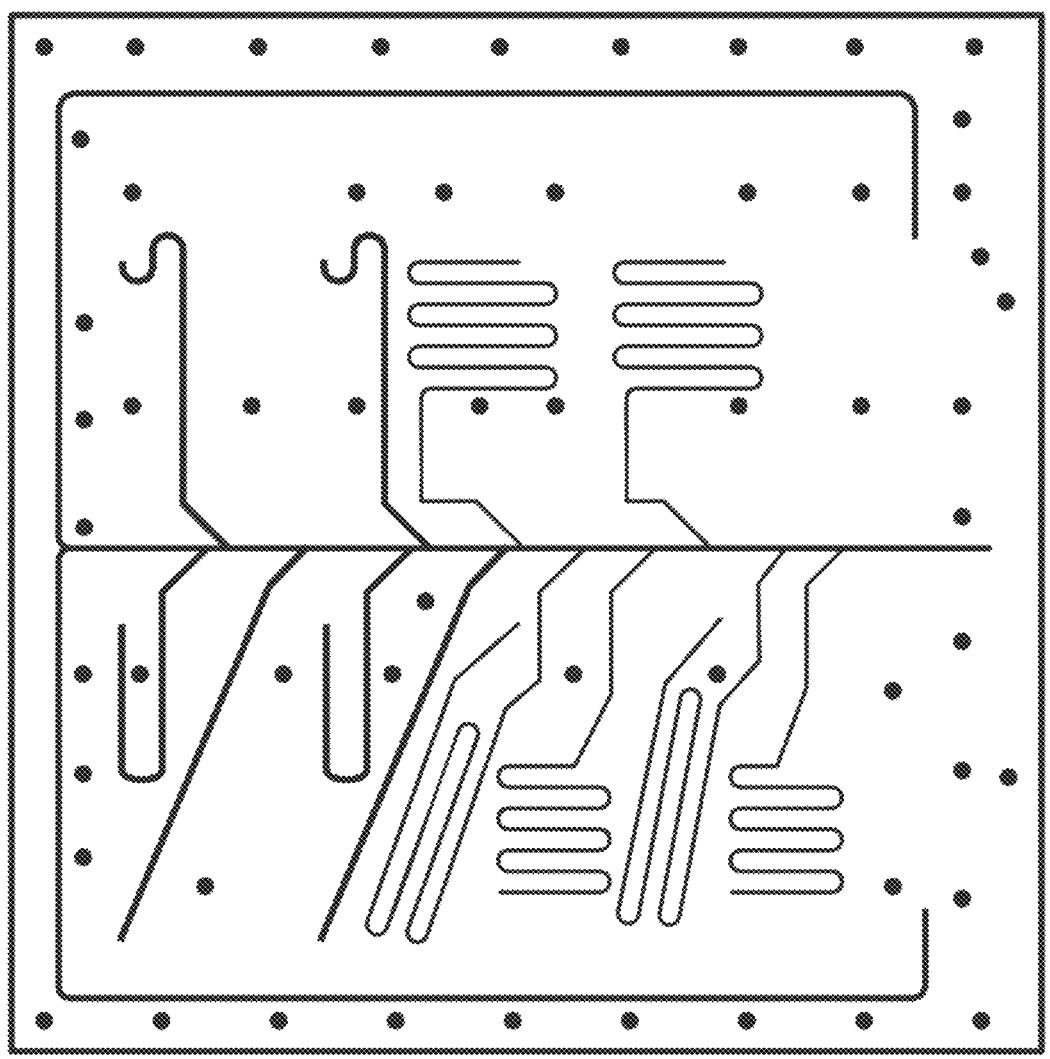
FIG. 8 shows a front view of a Polyethylene terephthalate (PET) restrictor plate, according to some embodiments.

As an alternative to aluminum restrictor plates, restrictor plates can instead be fabricated from one or more alternative materials. To test materials, two sets of restrictor plates were fabricated. The first set of restrictor plates was fabricated from polyethylene terephthalate (PET). PET is known to be compatible with terpenes such as limonene. PET cuts faster than aluminum on the CNC milling machine. The second set of restrictor plates was fabricated from stainless steel. FIG. 8 shows a frontal image of the PET restrictor plate after machining and deburring. Compared to the aluminum restrictor plate, the PET restrictor plate incorporates four modifications:

The width of the collection chamber (center channel) has been reduced so that the contained volume is 100 µL, e.g., to better facilitate dispenses of small volumes.

The ingredient delivery micro channels enter the collection chamber at a 45° angle, to facilitate laminar flow past the openings of the ingredient channels and reduce the possibility of back-mixing of the ingredient in its associated channel while a dispense is occurring in the collection chamber.

The lengths of the terpene microfluidic channels have been increased 3×, to increase controllability of the flowrates of the low viscosity terpenes. A 1.00 psi analog pressure regulator may be added to the microfluidic dispenser chassis. The combination of a 3× increase in the microfluidic channel of a restrictor plate and a reduction of driving pressure on the terpene channels to 1.00 psi may permit delivery of terpenes with a resolution of less than one milligram without dilution of the terpenes.

The locations of the solenoid valves were moved to be immediately adjacent to the cartridge reservoirs, as opposed to immediately adjacent to the collection chamber. When a solenoid valve closes, there is a one-stroke pumping action of liquid displaced from the valve chamber. This pulse of liquid propagates upstream and downstream from the valve. Positioning the solenoid valves immediately adjacent to the cartridge reservoirs can result in the path of least resistance for a pulse of liquid to be back into the ingredient cartridge reservoir, rather than forward into the collection chamber (e.g., reducing the minimum dispensed mass on all of the channels). For example, when the solenoid for the limonene channel was located immediately adjacent to the central collection channel, the minimum dispensed mass observed from a plot of the limonene calibration measurements was 16.60 mg. When the solenoid for the limonene channel was located immediately adjacent to the limonene reservoir, the minimum dispensed mass observed from a plot of the limonene calibration measurements was decreased to 0.73 mg. Thus, the preferred configuration of the elements that comprise the microfluidic circuit containing the solenoid valve is: component reservoir, solenoid valve, restrictor channel, collection channel, and dispense port. The solenoid valve is located in as close a proximity to the component reservoir as is mechanically possible. Such a configuration causes a reduction in the minimum dispensed mass that facilitates the dispensing of recipes that require only small amounts of certain components.

A stainless steel restrictor plate and a manifold plate were fabricated via a machining process and with the following design parameters:

The width of the collection chamber defines a contained volume of 100 µL.

The ingredient channels enter the collection channel at a 45° angle.

The length of the microfluidic channel of the restrictor plate for the terpenes was increased 3×.

The locations of the solenoid valves were immediately adjacent to the cartridge reservoirs.

Dispense Command Strategy

As discussed above, dispensing methods of the present disclosure, using microfluidic dispensers as described herein, can be referred to as time-pressure dosing, in which a known pressure drives the flow of an ingredient/fluid through a microfluidic channel of a restrictor plate at a known flowrate. The mass of the ingredient dispensed is determined by the open duration of the solenoid valve that controls flow through the microfluidic channels of the restrictor plate.

For each combination of an ingredient with its microfluidic channel of the restrictor plate, an associated equation is of the form:

$$\text{Mass Dispensed[mg]}=Q_0*(\text{Seconds})+\text{Min} \quad \text{EQN 1}$$

where:
- $Q_0$=flowrate [mg/sec] for a specific ingredient through a specific microfluidic channel of a restrictor plate
- (Seconds)=duration that the microfluidic channel remains open
- Min=minimum dispensed mass for a specific ingredient through a specific microfluidic channel.

Figure 9:
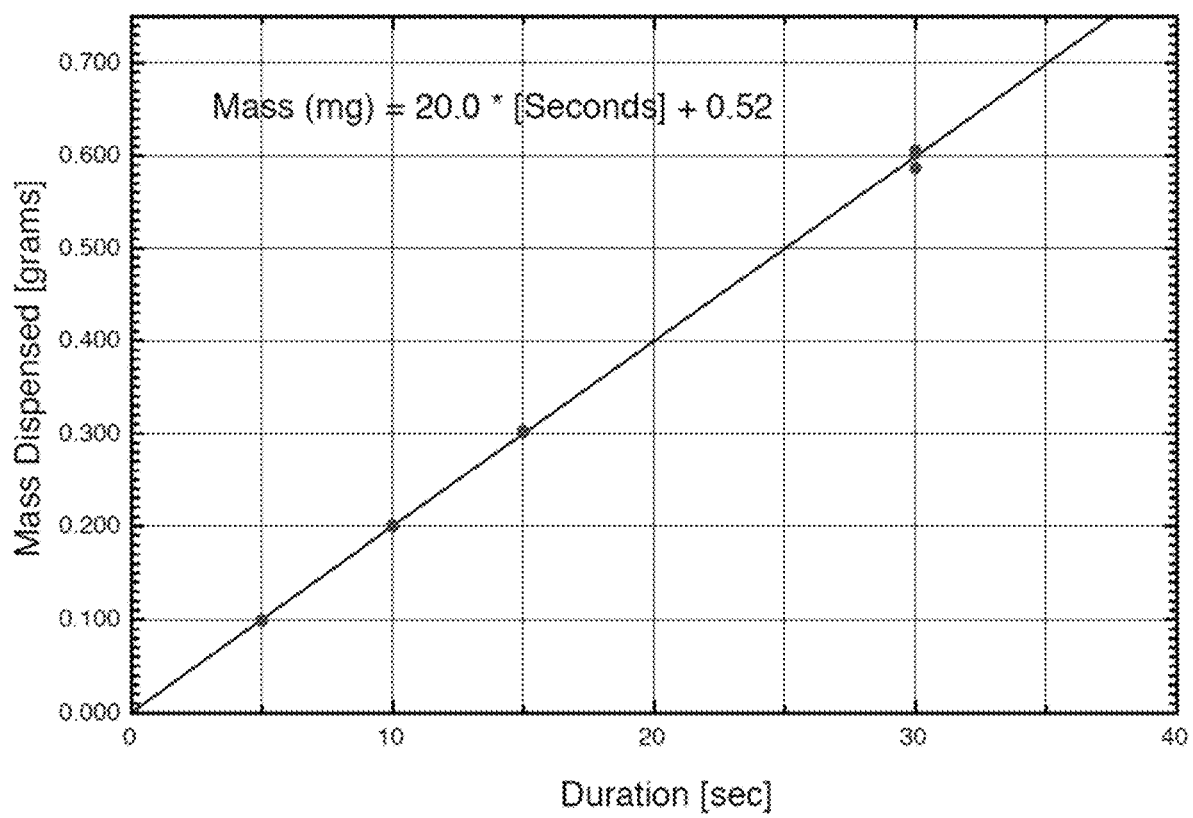
FIG. 9 is a plot of MCT mass dispensed versus dispense duration, according to an embodiment.

The numeric values for $Q_0$ and Min can be determined by empirical measurement. Such measurements for MCT, in a plot of dispensed mass of MCT versus the duration for which the solenoid valve is open, are presented in FIG. 9.

To obtain a precise dispensed mass of an ingredient, the flowrate, $Q_0$, should be correspondingly precise. The flowrate of an ingredient through its associated microfluidic channel within the restrictor plate can depend on the dimensions of the microfluidic channel, the pressure applied, and the viscosity of the ingredient. The dimensions of the microfluidic channel are physically fixed. Two assumptions built into Equation 1 (above) are that both the pressure applied to the ingredient and the viscosity of the ingredient do not vary. During actual operation of a microfluidic dispenser, however, pressure and viscosity may be subject to variation.

The control of pressure onboard the microfluidic dispenser was improved by using an analog precision low-pressure regulator. The observed control band for pressure in the microfluidic dispenser showed variation in the range of 3.00 psi±0.02 psi. The observed control band for temperature in the microfluidic dispenser showed variation in the range of 60.0° C.±1.0° C. Variations in temperature around 60° C. can be due to changes in ambient temperature, drafts, time lags in the thermostat control software, etc.

In some embodiments, an effective flowrate is determined by applying corrections to the theoretical flowrate, $Q_0$, based on variations in pressure and temperature, with respect to their nominal values, caused by the non-zero control bands. The effective flowrate equation can be as follows:

$$Q_{eff} = CORR_{press} * CORR_{temp} * Q_0 \quad \text{EQN 2}$$

where:
- $Q_{eff}$=Effective flowrate corrected for variations in pressure and temperature.
- $Q_0$=Flowrate when P=3.00 psi & T=60.0° C.
- $CORR_{press}$=Correction factor for deviations of pressure away from 3.00 psi.
- $CORR_{temp}$=Correction factor for deviations of temperature away from 60.0° C.

The dispensed mass then becomes:

$$\text{Mass Dispensed[mg]} = Q_{eff} * (\text{Seconds}) + \text{Min} \quad \text{EQN 3}$$

When a compute device requests or orders, via a software application, a formulation to be dispensed, the compute device sends a command, via the software application, to the microfluidic dispenser (or to a dispenser compute device operably coupled thereto), or otherwise triggers the microfluidic dispenser to keep a solenoid valve open for a predetermined duration. The numerical value of the duration required by the command can be obtained by algebraically inverting Equation 3 such that Seconds becomes the dependent variable:

$$(\text{Mass Dispensed[mg]} - \text{Min})/Q_{eff} = (\text{Seconds}) \quad \text{EQN 4}$$

When the required Mass Dispensed in Equation 4 is less than Min, the microfluidic dispenser (or compute device coupled thereto) determines that a dispense of the specified size on the specified microfluidic channel is not feasible.

The flowrate of an ingredient through a microfluidic channel of a restrictor plate can be directly proportional to the pressure driving the ingredient. For example, if the pressure increases 2×, the flowrate due to pressure increases 2×. A correction factor, $CORR_{press}$, can be used to convert a flowrate at an actual pressure of the microfluidic dispenser back to a nominal system pressure of 3.00 psi is given by Equation 5:

$$CORR_{press} = P_{actual}/3.00 \quad \text{EQN 5}$$

Since the observed control band for pressure has shown variations in the range of 3.00 psi±0.02 psi, correction factors for pressure can fall in the range of 0.994× to 1.006×.

Temperature manifests its influence in the way it changes viscosities. Taken alone, flowrate is a well-behaved function of viscosity. The flowrate of an ingredient through a microfluidic channel of a restrictor plate is inversely proportional to the viscosity of the ingredient. In other words, higher temperatures lead to lower viscosities, and lower viscosities lead to higher flowrates. For example, if the viscosity increases 2×, the flowrate due to viscosity decreases 2×. To calculate a correction factor for temperature, $CORR_{temp}$, a ratio of $Viscosity_{60}/Viscosity_T$ is performed:

$$CORR_{temp} = Viscosity_{60}/Viscosity_T \quad \text{EQN 6}$$

The term $CORR_{temp}$ can be applied to flowrates as a correction factor.

Viscosity is an exponential function of temperature. The mathematical form of this dependency is presented in Equation 7.

$$Visc_T = Visc_0 * e^{A/K} \quad \text{EQN 7}$$

where:
- $Visc_T$=Viscosity of an ingredient at temperature T
- $Visc_0$=Viscosity of an ingredient at a standard temperature.
- A=A empirical parameter characteristic of the ingredient
- K=Temperature in degrees Kelvin [° K=° C.+273.16]

The viscosities of MCT were measured at 55° C., 60° C., and 65° C. on a RheoSys rotating spindle viscometer. The results of these measurements are presented below, in Table 4. The goal of these measurements was to empirically measure the A empirical parameter for the calculation in Equation 7.

TABLE 4

Viscosity Versus Temperature for MCT

| Temperature [Centigrade] | Temperature [Kelvin] | 1/°K | Viscosity $\mu_T$ [Pa-sec] | Ln ($\mu_T$) |
|---|---|---|---|---|
| 55° C. | 328.16 K | 3.047294e−3 | 2.7160e−3 | −5.90860 |
| 60° C. | 333.16 K | 3.001561e−3 | 1.4320e−3 | −6.54868 |
| 65° C. | 338.16 K | 2.957180e−3 | 7.1300e−4 | −7.24603 |

Figure 10:
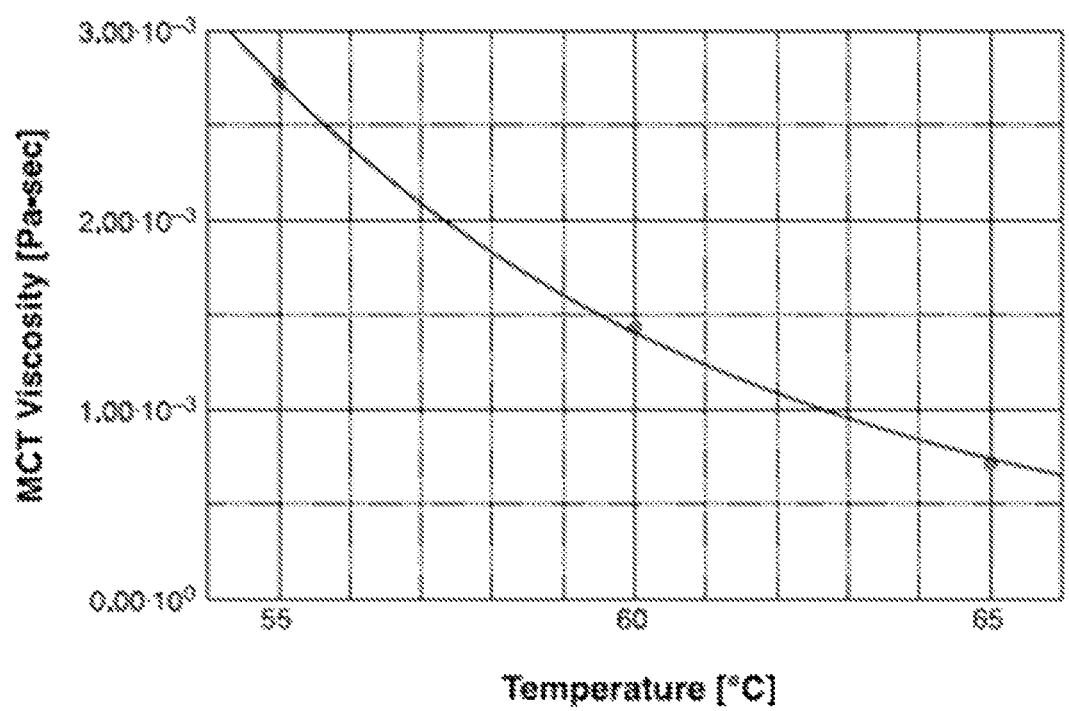
FIG. 10 is a plot of MCT viscosity versus temperature, according to an embodiment.

The plot in FIG. 10 presents viscosity of MCT as a function of temperature, in degrees Celcius. The viscosity of MCT was observed to be a sensitive function of temperature. Over the range 55° C. to 65° C., the viscosity of MCT decreases by 3.8×. The flowrate of MCT through its microfluidic channel of a restrictor plate would thus increase, correspondingly, by 3.8×. The extraction of the A parameter from the data in Table 1 can be simplified by taking natural logarithms and linearizing Equation 7, as follows:

$$Ln(Visc_T) = Ln(Visc_0) + A/K \quad \text{EQN 7}$$

Figure 11:
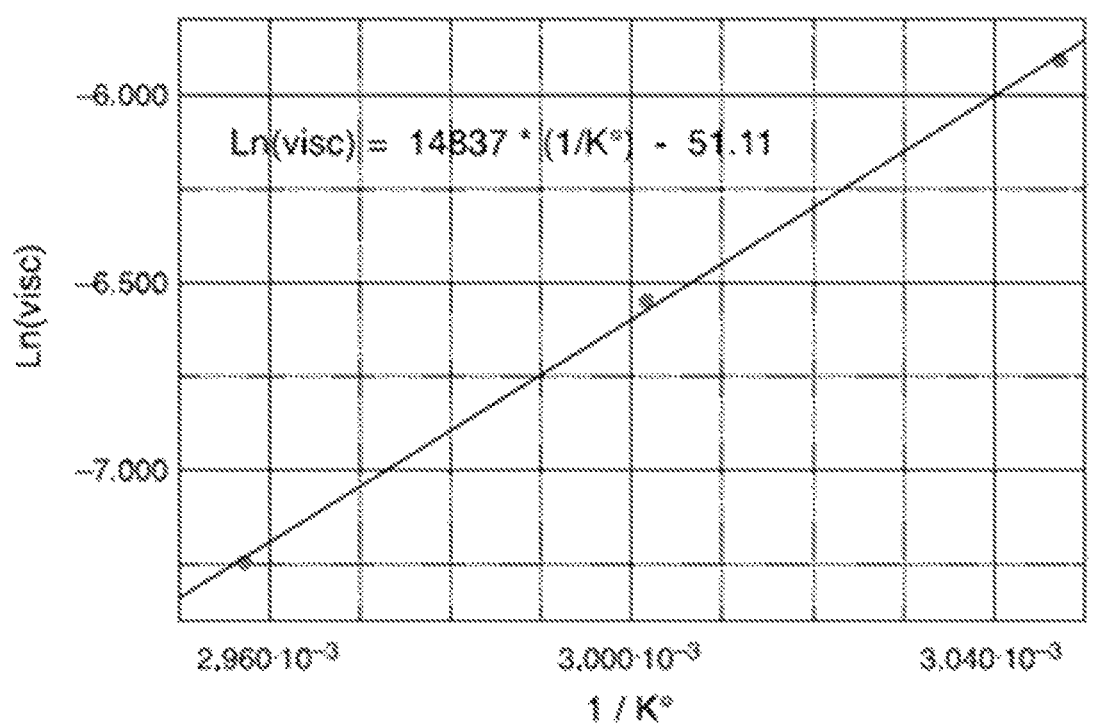
FIG. 11 is a plot of the natural logarithm of MCT viscosities versus reciprocal Kelvin temperatures, according to some embodiments.

When the natural logarithm of the viscosities in Table 1 are plotted against the reciprocal Kelvin temperatures, the linear relationship shown in FIG. 11 is obtained. Performing a least square regression fit to this linearized data in FIG. 11 gives the A parameter for MCT as 14,837. The A parameter is characteristic and predictive of the changes of MCT viscosities with temperature. With the A parameter for MCT available, it becomes possible to rewrite the correction factor of Equation 6 in a more concrete form.

$$C_{ORR_{temp}} = \frac{\text{Viscosity}_{60}}{\text{Viscosity}_T} = \frac{Visc_0 * e^{\frac{A}{333.16}}}{Visc_0 * e^{\frac{A}{K}}} = e^{14,837*\left(\frac{1}{333.16}-\frac{1}{K}\right)} \quad \text{EQN 9}$$

where:
A=14,837 (specifically for MCT)
K=° C.+273.16
60° C.=60+273.16=333.16 K

The observed control band for temperature shows variations in the range of 60.0° C.±1.0° C. For MCT, a temperature of 61.0° C. results in an increased flowrate of 1.143×. A temperature of 59.0° C. results in a decreased flowrate of 0.874×. Thus, a 2° C. change in temperature on the MCT channel causes a 27% change in flowrate. Other ingredients being dispensed via the microfluidic dispenser may have viscosities similarly sensitive to changes in temperature, and in such instances, one or more correction factors can be applied when calculating parameters for and/or generating instructions for dispense events.

Correction factors for changes in viscosities as function of temperature was applied to dispenses conducted for calibration measurements. The mathematical form of such correction factors was as presented in Equation 10:

$$CORR_{temp} = \frac{\text{Viscosity}_{60}}{\text{Viscosity}_T} = \frac{Visc_0 * e^{\frac{A}{333.16}}}{Visc_0 * e^{\frac{A}{K}}} = e^{A\left(\frac{1}{333.16}-\frac{1}{K}\right)} \quad \text{EQN 10}$$

where:
A=parameter characteristic of the fluid being dispensed
K=° C.+273.16
60° C.=(60+273.16) ° K=333.16° K The value of the A-parameter for a fluid was obtained from measurements of its viscosities at three temperatures. The temperatures selected were 55° C., 60° C., and 65° C., to encompass the operating point of the microfluidic dispenser. Viscosities and the A-parameters derived from the viscosity measurements are presented in Table 5, below.

TABLE 5

Viscosities of Dispensed CBDs and MCT

| Fluid[1] | Viscosity [Pa-sec] | | | A Parameter | Ratio Viscosity CBD:MCT @ 60° C. |
|---|---|---|---|---|---|
| MCT | 2.7160e−3 | 1.4320e−3 | 7.1300e−4 | −14,837 | — |
| PIL50 | 9.8907e−2 | 8.1722e−2 | 6.0655e−2 | −4,276 | 57:1 |
| ELX50 | 9.2815e−2 | 6.4717e−2 | 4.7560e−2 | −7,422 | 45:1 |
| ELX70 | 1.7370e−1 | 1.1932e−1 | 8.4011e−2 | −8,061 | 83:1 |

[1]MCT medium chain triglyceride;
PIL54 Pure IsoLabs cannabidiol 54 wt %;
ELX50 Elixinol cannabidiol 50 wt %;
ELX70 Elixinol 70 wt % cannabidiol.

Figure 12:
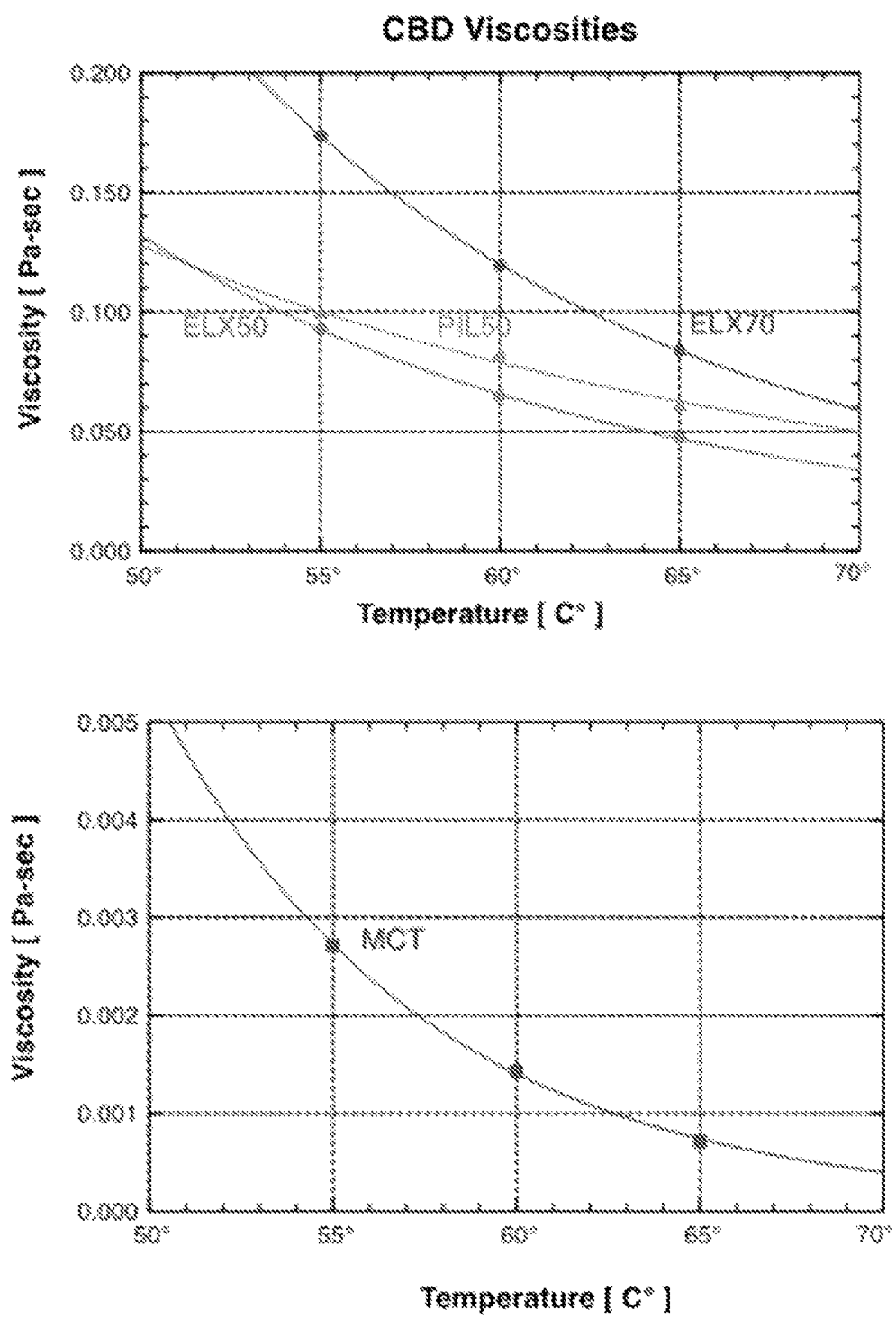
FIG. 12 shows plots of viscosity versus temperature for CBD isolates (upper plot) and for MCT (lower plot), according to some embodiments.

The viscosity data for the three cannabidiol isolates and MCT are presented in FIG. 12. The vertical scale for the MCT in FIG. 12 is magnified 40× compared to the CBDs. The two CBD isolates, ELX50 and ELX70, are 45 times more viscous and 83 times more viscous, respectively, than the MCT at 60° C.

Limonene Dispenses

Figure 13:
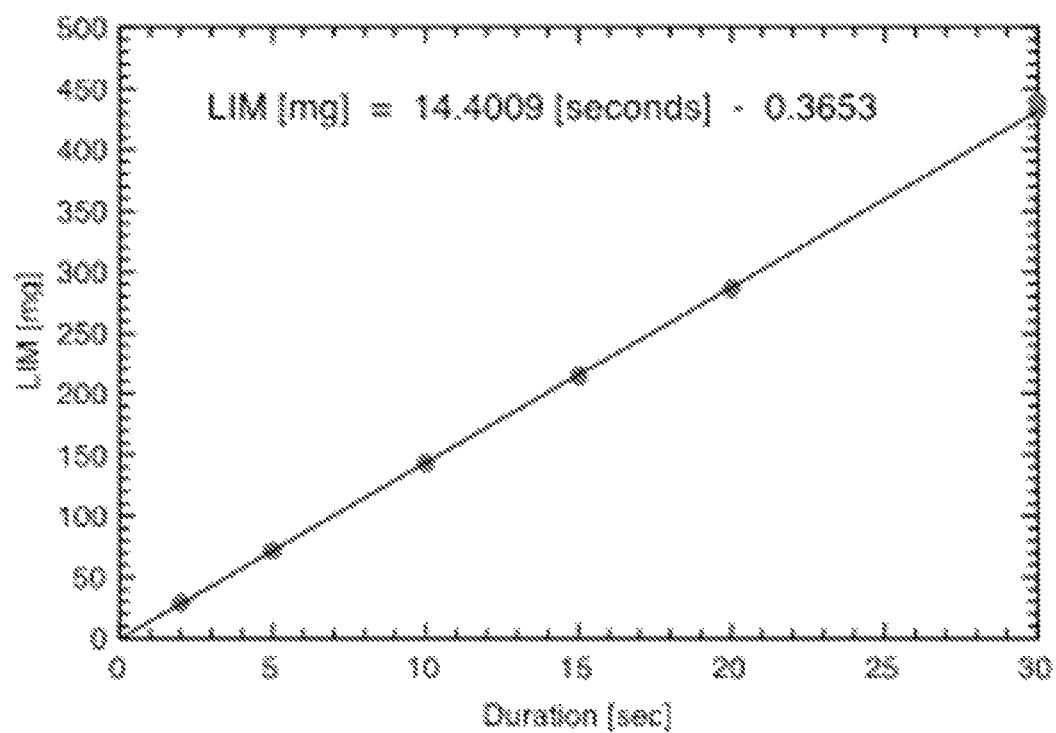
FIG. 13 is a plot of dispensed limonene versus dispense duration, for a dispense event using a lengthened microfluidic channel of a restrictor plate and 1.00 psi as the driving pressure, according to an embodiment.

A stainless steel restrictor plate was fabricated with its terpene channels extended to 3× the length used in the aluminum restrictor plate. Test dispenses of limonene were conducted with the stainless steel restrictor plate using 1.00 psi as the driving pressure. The results of these dispenses are presented in FIG. 13. Three restrictor plate/pressure configurations were used to test dispenses of Limonene, and the results are summarized in Table 6 below. The nominal flow rates and minimum dispense increments, as determined by the interaction of the solenoid response times with the flow rates, are presented in Table 7, below.

TABLE 6

Summary of Limonene Dispense Configurations

| Terpene | Restrictor Plate | Channel Length | Pressure [psi] |
|---|---|---|---|
| Limonene (100%) | Aluminum, Model A | 1X | 3.00 |
| Limonene:CBD (1:9 wt/wt) | Aluminum, Model A | 1X | 3.00 |
| Limonene (100%) | Stainless, Model B | 3X | 1.00 |

TABLE 7

Limonene Dispense Increments

| Parameter | Configurations | | | | | |
|---|---|---|---|---|---|---|
| | #1 | #2 | #3 | #4 | #5 | #6 |
| Restrictor Plate | Model A | Model A | Model B | Model B | Model B | Model B |
| Terpene Channel Length | 1X | 1X | 3X | 3X | 3X | 3X |
| Valve Location | Distal | Distal | Proximal | Proximal | Proximal | Proximal |
| Pressure | 3.00 psi | 3.00 psi | 3.00 psi | 3.00 psi | 1.00 psi | 1.00 psi |
| Solenoid Status Change Resolution | ±0.05 sec | ±0.05 sec | ±0.05 sec | ±0.05 sec | ±0.05 sec | ±0.05 sec |
| Terpene | Limonene 100% | Lim-CBD 1:9 (wt:wt) | Limonene 100% | Lim-CBD 1:1 (wt:wt) | Limonene 100% | Lim-CBD 1:1 (wt:wt) |
| Flow Rate | 30 mg/sec | 0.06 mg/sec | 52 mg/sec | 2.5 mg/sec | 14 mg/sec | 0.8 mg/sec |
| Minimum Dispense Mass | 16 mg | 0.05 mg | 0.5 mg | 0.5 mg | 0 mg | 0.5 mg |
| Dispense Increment | 3 mg | 0.006 mg | 2.6 mg | 0.25 mg | 0.7 mg | 0.08 mg |

CBD/MCT Calibration Dispenses

Figure 14:
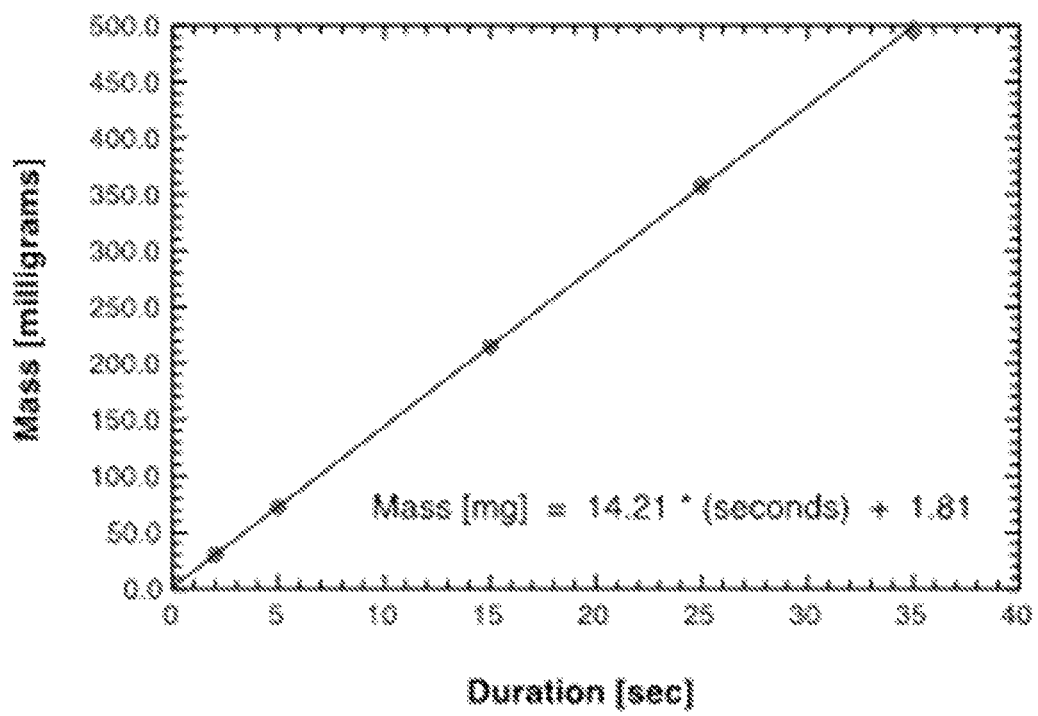
FIG. 14 shows a plot of dispensed mass of MCT versus dispense duration, including the associated derived equation, according to an embodiment.

Calibration dispenses using MCT and a CBD isolate (PIL50) obtained from PurIsoLabs, Boerne, TX, were performed. As a preliminary step, prior to the calibration dispenses, minimum dispense measurements were made on each ingredient using a stainless steel restrictor plate. The minimum dispensed mass of MCT and its derived equation for predicting delivered masses are presented in FIG. 14.

To deliver a pre-selected mass of MCT, the following equation was used to calculate the duration that the MCT solenoid valve should remain open:

$$[\text{Seconds}] = (\text{Mass} - 1.81)/14.21 \quad \text{EQN 2}$$

Figure 15:
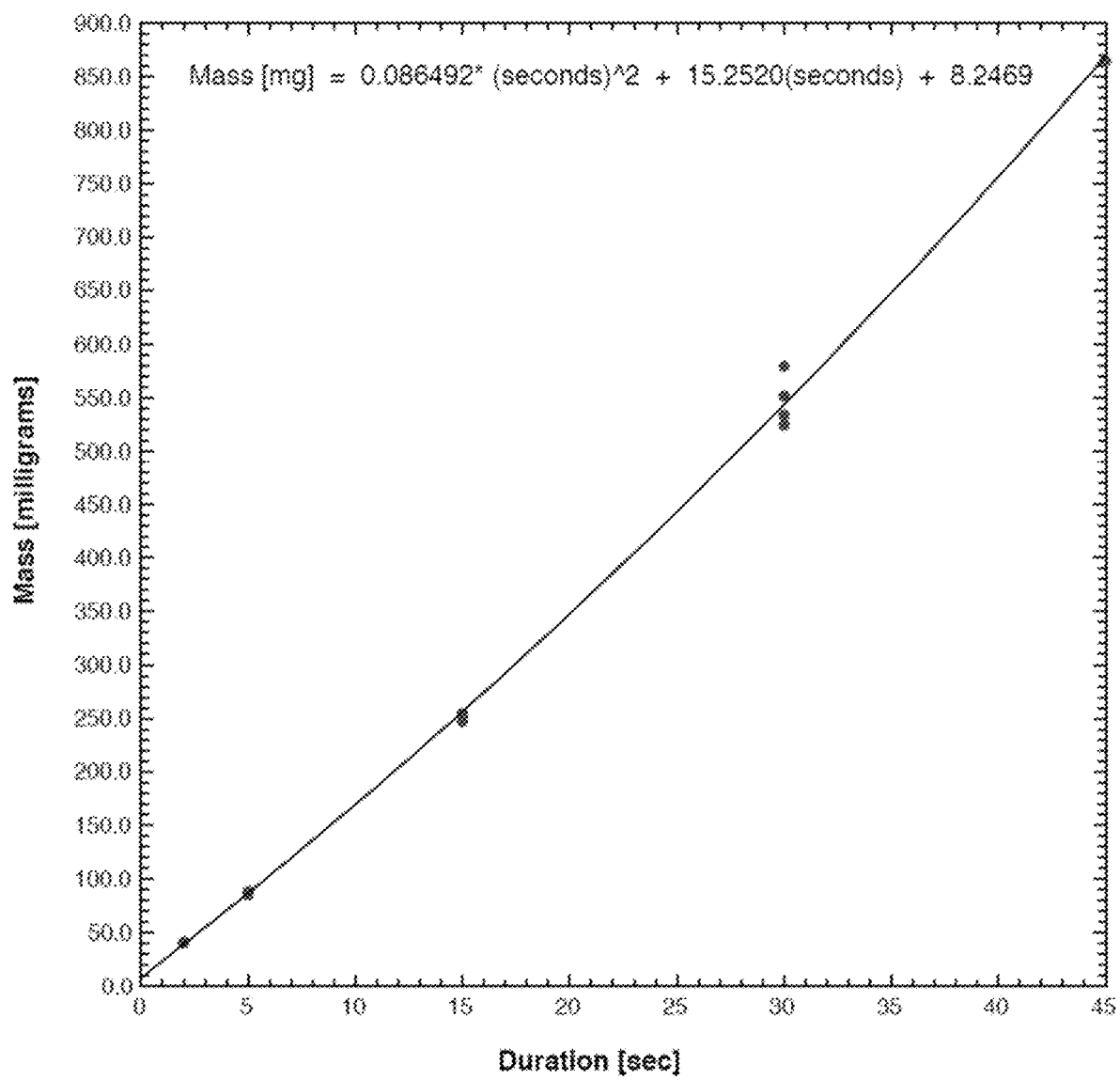
FIG. 15 shows a plot of dispensed mass of PIL50 versus dispense duration, including the associated derived equation, according to an embodiment.

The minimum dispensed mass of PIL50 and its derived equation for predicting delivered masses are presented in FIG. 15. The flowrate of PIL50 exhibited thixotropy, otherwise known as shear thinning.

To deliver a pre-selected mass of PIL50, the following equation was used to calculate the duration that the PIL50 solenoid valve should remain open:

$$[\text{Seconds}] = \frac{-15.252 + \sqrt{15.252^2 - 4*0.082469*(8.2469 - \text{Mass})}}{2*0.082469} \quad \text{EQN 3}$$

Equation 3 is the standard solution to the quadratic equation found in FIG. 15. Specifically, Equation 3 is the positive root of the quadratic equation.

Due to the conduct of the PIL50 and MCT calibration dispenses, preselected and variable masses of PIL50 were added to a single fixed mass of MCT. The equations from FIGS. 14 and 15 were used to back-calculate the duration each solenoid should remain open to deliver the desired masses of PIL50 and of MCT. These dispense durations were adjusted for deviations of temperature and pressure away from their nominal values of 60° C. and 3.00 psi, as described herein.

Figure 16:
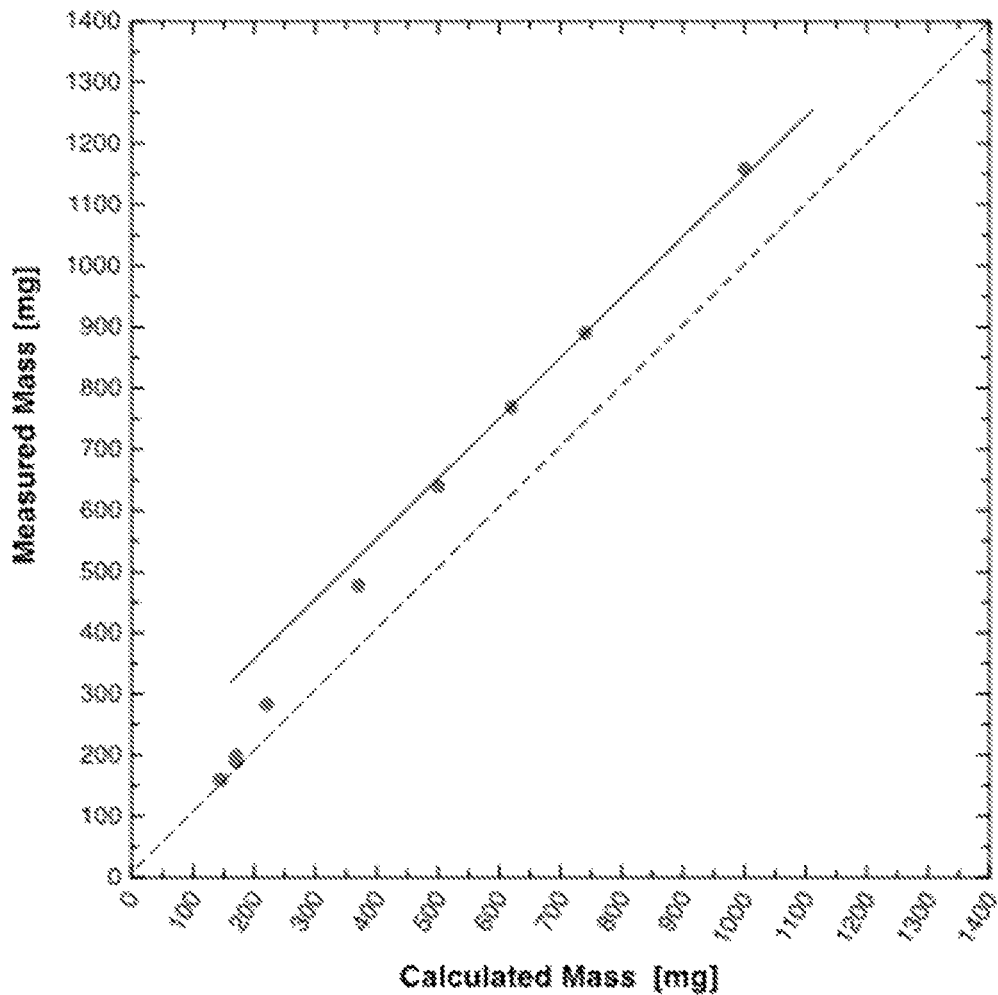
FIG. 16 is a plot showing a comparison of calculated masses and measured masses for the PIL50/MCT dispenses.

Analyses of the outcome of the PIL50-MCT dispenses were performed in two stages. The first stage considered the total mass of each dispense and compared the measured mass against the calculated mass. The second stage considered the content of PIL50 in each dispense. A comparison of the calculated and measured masses for the PIL50/MCT dispenses is presented in FIG. 16. If the measured mass of a dispense corresponded to the calculated mass for that dispense, the point would fall on the dashed line extending diagonally across the graph. It can be observed from FIG. 16 that all dispenses contain excess mass, since the points fall above the diagonal line. Since the mass of MCT is fixed in all of these dispenses, and there is a variable discrepancy, the discrepancy is believed to involve PIL50 and Equation 3. It can be observed from FIG. 16 that the deviations are not random. The deviations show a monotonic progression that eventually saturates. At high dispensed masses of PIL50, the measured masses are displaced from, but progress parallel to, the calculated masses.

Figure 18:
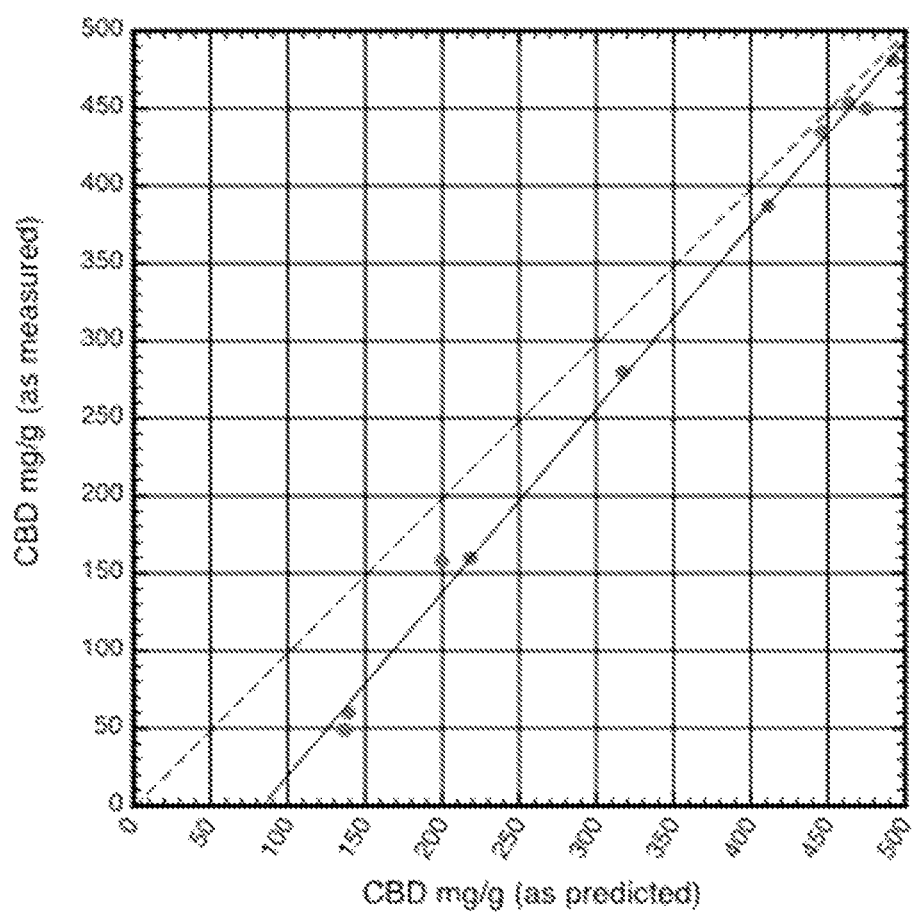
FIG. 18 is a plot showing a comparison of predicted CBD content and measured CBD content for the PIL50/MCT dispenses.

The content of CBD is each PIL50/MCT dispense was measured by high pressure liquid chromatography. A summary of these analytical results is presented in FIG. 17. Assuming that the dispense of the MCT ingredient in the above samples delivered the calculated amount of MCT, the amount of PIL50 in the dispense is calculated by difference, and the expected amount of CBD contained in the dispense can be predicted. A comparison of measured and predicted content of CBD in the PIL50/MCT dispenses is presented in FIG. 18. As shown in FIG. 18, there is a deviation between the predicted and measured amounts of CBD that appear in the dispensed sample. In all cases, the deviation is negative, and the amount of the deviation decreases as the amount of PIL50 in the dispense increases.

Elixinol CBD

Figure 19:
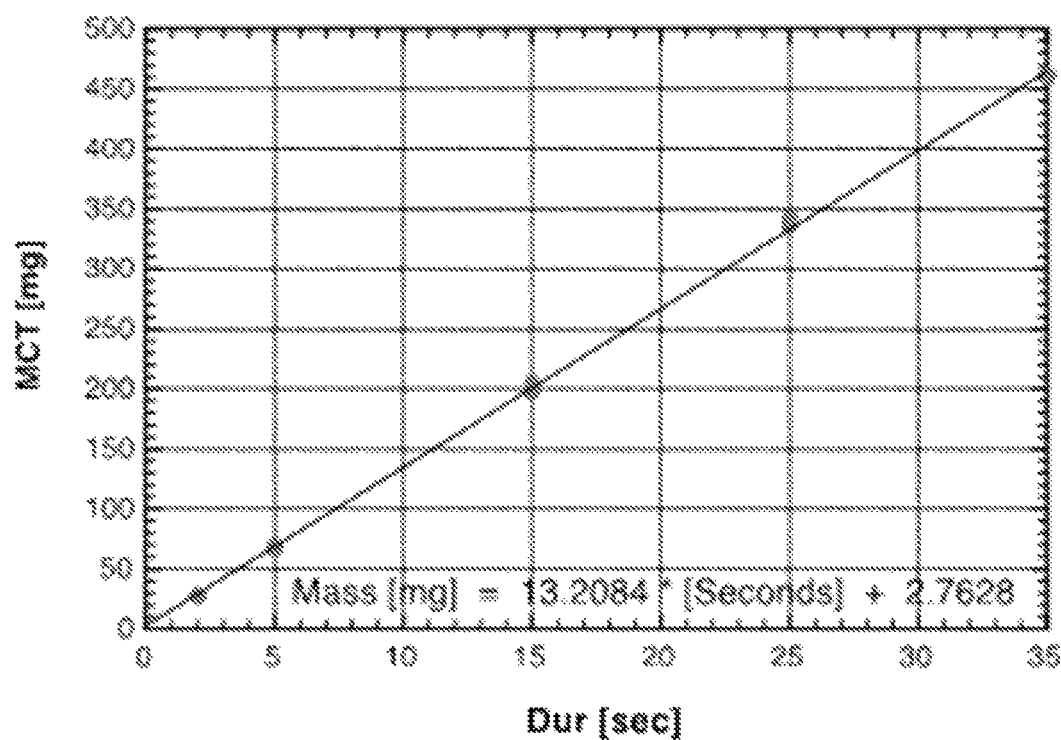
FIG. 19 shows a plot of dispensed mass of MCT versus dispense duration, including the associated derived equation, according to an embodiment.
Figure 20:
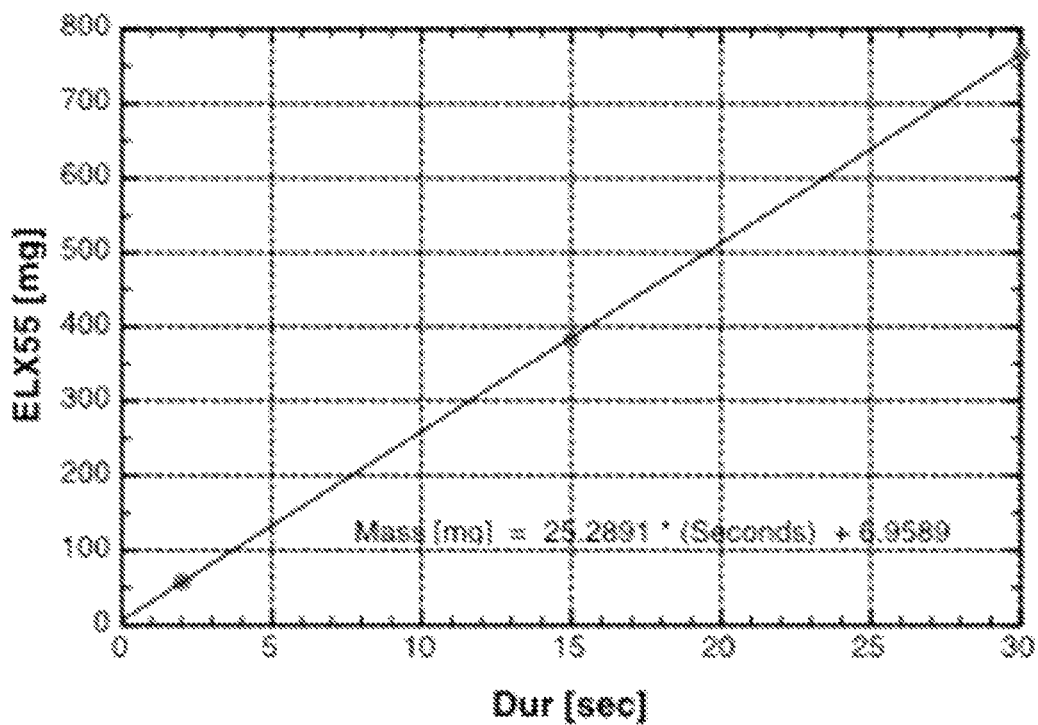
FIG. 20 shows a plot of dispensed mass of ELX55 versus dispense duration, including the associated derived equation, according to an embodiment.

Another round of calibration dispenses was conducted using Elixinol-55 (ELX55), obtained from Elixinol LLC, Westminster, CO This CBD isolate was found to be miscible with MCT in all proportions. Phase separations in the collection channel inside the restrictor plate did not occur during the calibration dispenses of ELX50/MCT. The ELX50/MCT calibration dispenses began with a measurement of the minimum dispensed volumes of the MCT and the ELX50. These measurements are presented in FIGS. 19 and 20, respectively.

To deliver a pre-selected mass of MCT, the following equation was used to calculate the duration that the MCT solenoid needed to remain open:

$$[\text{Seconds}] = (\text{Mass} - 2.7628)/13.2084 \quad \text{EQN 4}$$

To deliver a pre-selected mass of MCT, the following equation was used to calculate the duration that the MCT solenoid needed to remain open:

$$[\text{Seconds}] = (\text{Mass} - 6.9589)/25.2891 \quad \text{EQN 5}$$

These dispense durations were adjusted for deviations of temperature and pressure away from their nominal values of 60° C. and 3.00 psi, as described previously.

Figure 21:
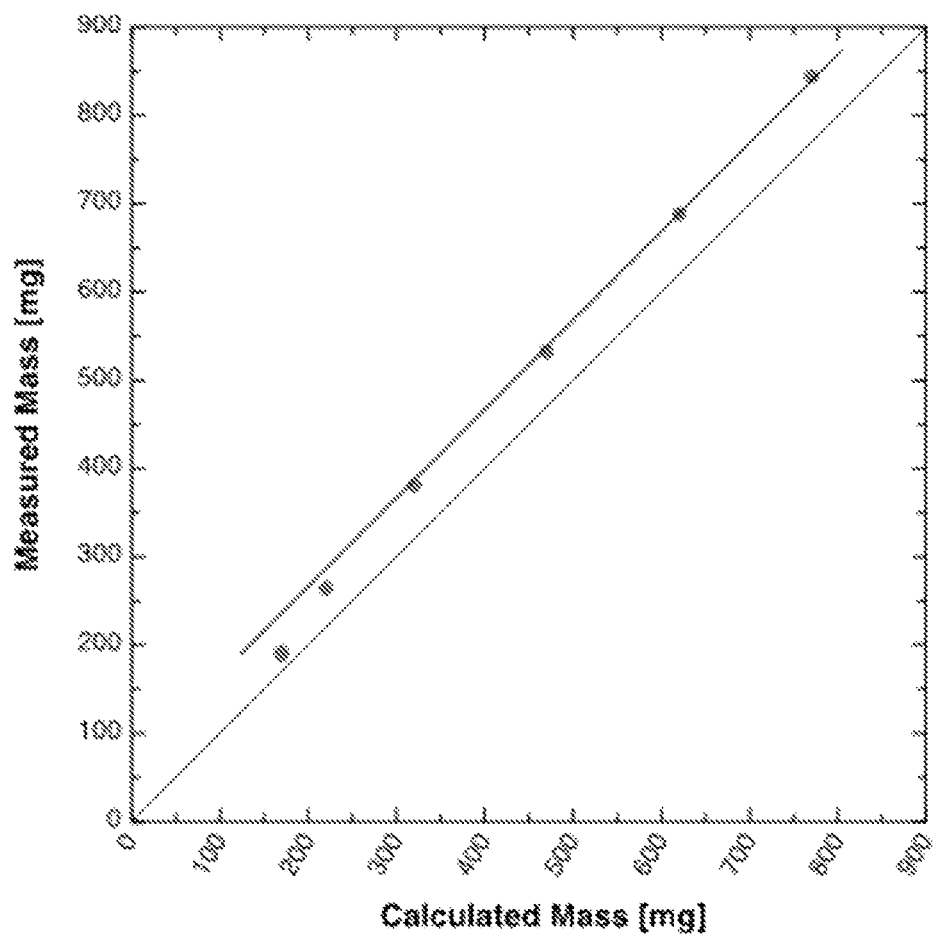
FIG. 21 is a plot showing a comparison of calculated masses and measured masses for the ELX55/MCT dispenses.

A comparison of the calculated and measured masses for the ELX55/MCT dispenses is presented in FIG. 21. If the measured mass of a dispense corresponded to the calculated mass for that dispense, the point would fall on the dashed line extending diagonally across the graph. It can be observed, in FIG. 21, that all dispenses contain excess mass, since the points fall above the diagonal line. The shape of the plot of measured mass versus calculated mass is the same for both ELX55/MCT in FIG. 21 and PIL50/MCT in FIG. 16. The deviations are common to both series of dispense measurements. As such, it is believed that phase separation is not responsible for the deviations in the calculated versus measured plots of masses.

It has been determined that both tested CBD isolates (PIL50 and ELX55) are more viscous than MCT—57 times more viscous and 45 times more viscous, respectively. Measurements of the minimum dispensed masses of PIL50 and ELX55 that are used to determine the timing equations for these ingredients can be conducted by making an incremental dispense of the CBD isolate into the collection channel in the restrictor plate of the microfluidic dispenser that is already filled with PIL50 or ELX55. In contrast, measurements of the dispensed masses of PIL50 and ELX55 during the calibration dispenses can be conducted with the collection channel in the restrictor plate that is already filled with low viscosity MCT, rather than the corresponding high viscosity CBD isolates.

When a dispense is attempted into the collection channel that already contains fluid, the dispense experiences a backpressure that depends on the viscosity of the contained fluid. As a dispense of PIL50 or ELX55 begins, the collection channel is full of MCT and produces a smaller backpressure. The initial flows of PIL50 or ELX55 can "surge," delivering more mass than originally calculated. At larger dispenses, the MCT in the collection channel is eventually displaced by the PIL50 or ELX55, and the flow of the CBD isolate returns to the value anticipated from the flow equations in FIG. 15 or FIG. 20.

Overview of Stages of Cartridge Designs

Stage 1

| Design Elements | Characteristics |
|---|---|
| Mechanical Connection to Docking Block | No mechanism provided. Depends on friction of O-rings used for liquid seal to restrictor plate. |
| Fluid Delivery to Restrictor Plate | No bottom check valve. Straight thru liquid communication to restrictor plate. |
| Air Supply | Hose barb tapped into top of cartridge. |
| Refill capability | No dedicated fitting provided. With cartridge docked, refilled thru hose barb, With cartridge demounted, refilled thru bottom port. |
| Cartridge Security Chip Reader | None. None. |
| Comments | Permits characterization of performance of restrictor plate. Can be used to make dispenses of test recipes. |

Stage 2

| Design Elements | Characteristics |
|---|---|
| Mechanical Connection to Docking Block | Clamping mechanism provided to secure cartridge to docking block |
| Fluid Delivery to Restrictor Plate | No bottom check valve. Straight thru liquid communication to restrictor plate. |
| Air Supply | Hose barb tapped into top of cartridge. |
| Refill capability | No dedicated fitting provided. With cartridge docked, refilled thru hose barb, With cartridge demounted, refilled thru bottom port. |
| Cartridge Security Chip Reader | None. None. |
| Comments | Permits characterization of performance of restrictor plate. Can be used to make dispenses of test recipes. |

Stage 3

| Design Elements | Characteristics |
|---|---|
| Mechanical Connection to Docking Block | Clamping mechanism provided to secure cartridge to docking block |
| Fluid Delivery to Restrictor Plate | No bottom check valve. Straight thru liquid communication to restrictor plate. |
| Air Supply | Hose barb tapped into top of cartridge. |
| Refill capability | Separate filling port provided in top of cartridge. Sealed with a screw. Perhaps a 6-32 pan head machine screw with a #0006 O-ring under the head. |
| Cartridge Security Chip Reader | None. None. |
| Comments | Cartridge is installed empty to the docking block. It is then filled in-place using a syringe. To demount, cartridge is first emptied using a syringe. |

Stage 4

| Design Elements | Characteristics |
|---|---|
| Mechanical Connection to Docking Block | Clamping mechanism provided to secure cartridge to docking block |
| Fluid Delivery to Restrictor Plate | Bottom check valve provided |
| Air Supply | Hose barb tapped into top of cartridge. |
| Refill capability | Separate filling port provided in top of cartridge. Sealed with a screw. Perhaps a 6-32 pan head machine screw with a #0006 O-ring under the head. |
| Cartridge Security Chip Reader | None. None. |
| Comments | Refill and cleaning performed remotely from the microfluidic dispenser. |

Stage 5

| Design Elements | Characteristics |
|---|---|
| Mechanical Connection to Docking Block | Clamping mechanism secures cartridge to docking block and delivers air supply to cartridge |
| Fluid Delivery to Restrictor Plate | Bottom check valve provided |
| Air Supply | Hose barb removed. Check valve provided at top of cartridge. Air supply integrated with clamping mechanism |
| Refill capability | Separate filling port provided in top of cartridge. Sealed with a screw. Perhaps a 6-32 pan head machine screw with a #0006 O-ring under the head. |
| Cartridge Security Chip Reader | None. None. |
| Comments | Refill and cleaning performed remotely from the microfluidic dispenser. |

Stage 6

| Design Elements | Characteristics |
|---|---|
| Mechanical Connection to Docking Block | Clamping mechanism secures cartridge to docking block and delivers air supply to cartridge |
| Fluid Delivery to Restrictor Plate | Bottom check valve provided |
| Air Supply | Hose barb removed. Check valve provided at top of cartridge. Air supply integrated with clamping mechanism |
| Refill capability | Separate filling port removed. Separate refill fixture designed to permit cleaning flush: in top port, drains out bottom port. Fixture also permits refill of cartridge thru bottom port with top port open as vent. |
| Cartridge Security Chip Reader | None. None. |
| Comments | Refill and cleaning performed remotely from the microfluidic dispenser. |

Stage 7

| Design Elements | Characteristics |
|---|---|
| Mechanical Connection to Docking Block | Clamping mechanism secures cartridge to docking block, delivers air supply to cartridge, and makes electrical connection to ID chip. Optional radial indexing. |
| Fluid Delivery to Restrictor Plate | Bottom check valve provided |
| Air Supply | Check valve provided at top of cartridge. Air supply integrated with clamping mechanism |
| Refill capability | Separate filling port removed. Separate refill fixture designed to permit cleaning flush: in top port, drains out bottom port. Fixture also permits refill of cartridge thru bottom port with top port open as vent. |
| Cartridge Security | None. |
| Chip Reader | ID chip onboard cartridge |
| Comments | Refill and cleaning performed remotely from the microfluidic dispenser. |

Stage 8

| Design Elements | Characteristics |
|---|---|
| Mechanical Connection to Docking Block | Clamping mechanism secures cartridge to docking block, delivers air supply to cartridge, and makes electrical connection to ID chip. Optional radial indexing. |
| Fluid Delivery to Restrictor Plate | Bottom check valve provided |
| Air Supply | Check valve provided at top of cartridge. Air supply integrated with clamping mechanism |
| Refill capability | Separate filling port removed. Separate refill fixture designed to permit cleaning flush: in top port, drains out bottom port. Fixture also permits refill of cartridge thru bottom port with top port open as vent. |
| Cartridge Security | Cartridge no longer refillable in the field. |
| Chip Reader | ID chip onboard cartridge |
| Comments | Cartridge handling very convenient. |

Cartridge Fabrication

Figure 22:
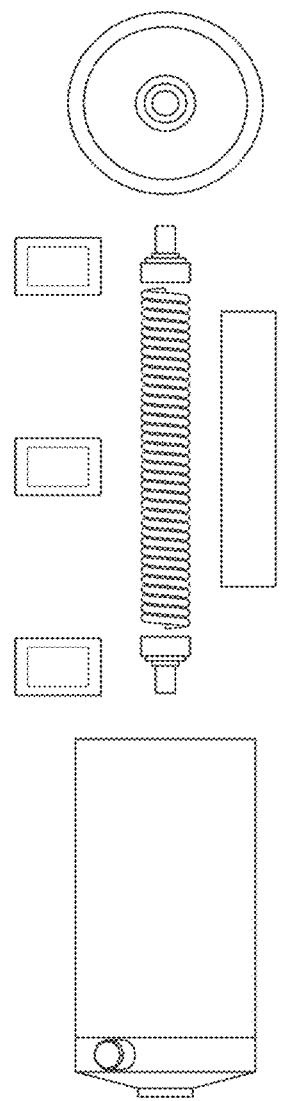
FIG. 22 is a photograph showing a disassembled cartridge and check valve mechanism, according to some embodiments.

Ingredient cartridge bodies were fabricated using thin wall aluminum tubing, rather than bar stock, to simplify machining. The top cap and/or bottom cap of the cartridge can include a recessed seat for installation of the EEPROM. The internal valving of the ingredient cartridges can include two spring loaded poppet valves sealed by O-rings. An image of an example disassembled cartridge is provided in FIG. 22. Alternatively, the internal valving of the ingredient cartridges can include two spring loaded check valves using Viton spheres as the sealing elements. At the left edge of the image of FIG. 22, a 1/8" key protrudes laterally from the base, e.g., for alignment with a keyway cut into the wall of the docking port. An L-channel at the bottom of the keyway in the docking port can mate with the cartridge to provide a locking function when the cartridge is rotated 30°. This leaves the cartridge in a fixed and reproducible orientation in the docking block such that the electrical connections to the EEPROM can be made.

A test docking block was fabricated from poly(methyl methacrylate). A keyway and L-channel were added to this docking block to provide a test fixture. The cartridge of FIG. 22 docked and reliably locked into the test docking block. In some implementations, the cap of a cartridge is configured to make a physical air/pneumatic connection, and the top of the cartridge can be configured to make an electrical connection with the EEPROM. Alternatively or in addition, the cartridge can include a filling port in the top of the cartridge to permit refill of the cartridge without removal from the docking block. The port can be a 4-40 or 6-32 tapped hole sealed with a Nylon set screw.

Figure 23:
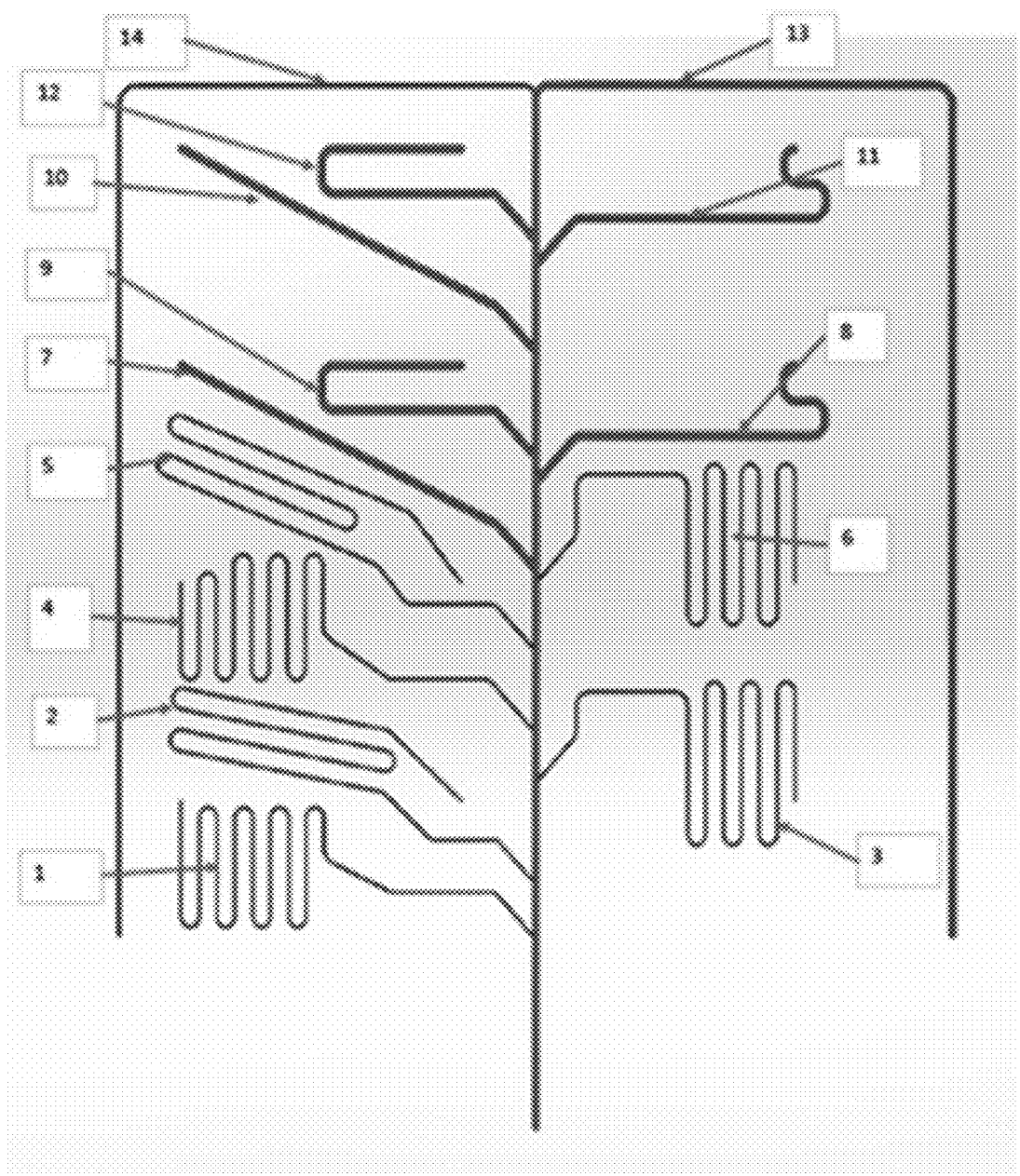
FIG. 23 shows a restrictor plate with example microfluidic channel entry locations, according to some embodiments.
Figure 24A:
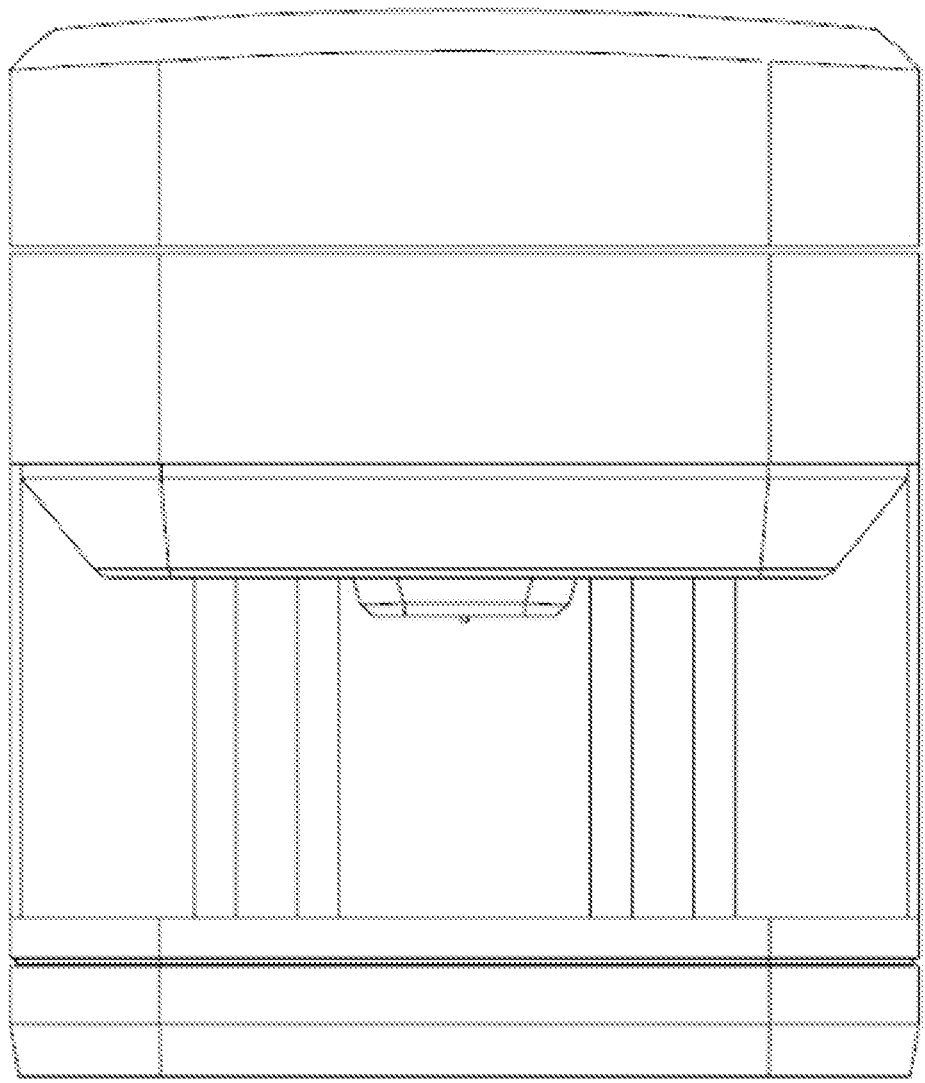
FIGS. 24A-24E show views of a microfluidic dispenser, according to some embodiments.
Figure 24C:
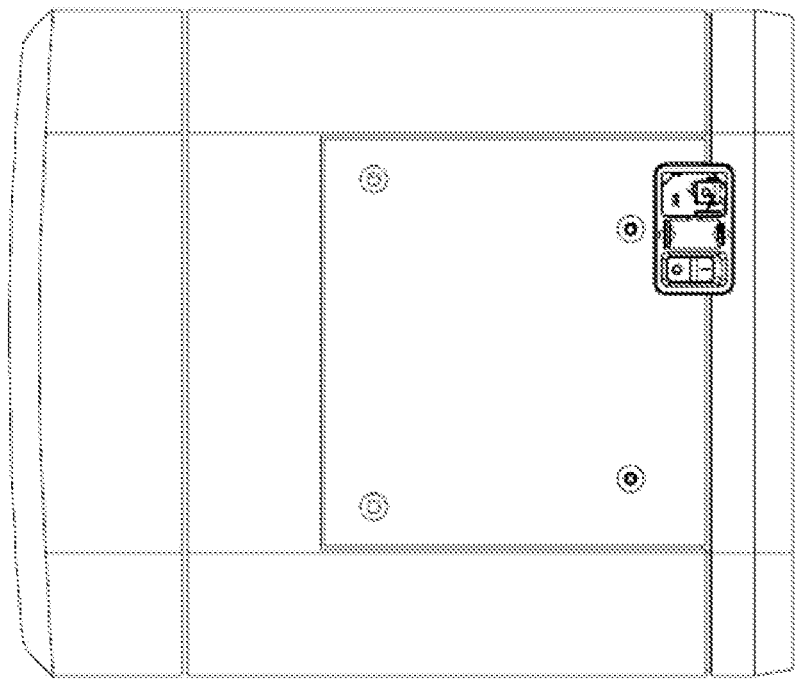
Figure 24B:
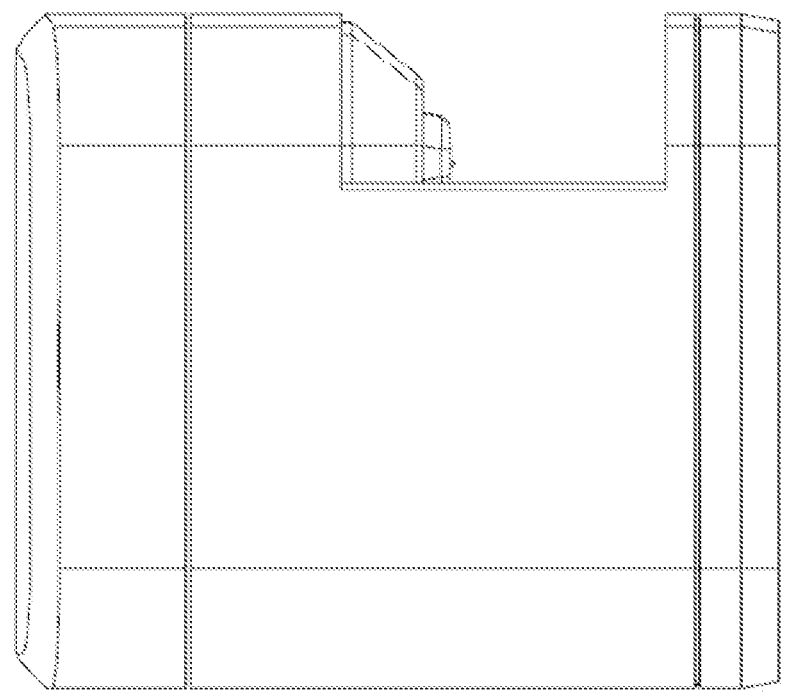
Figure 24E:
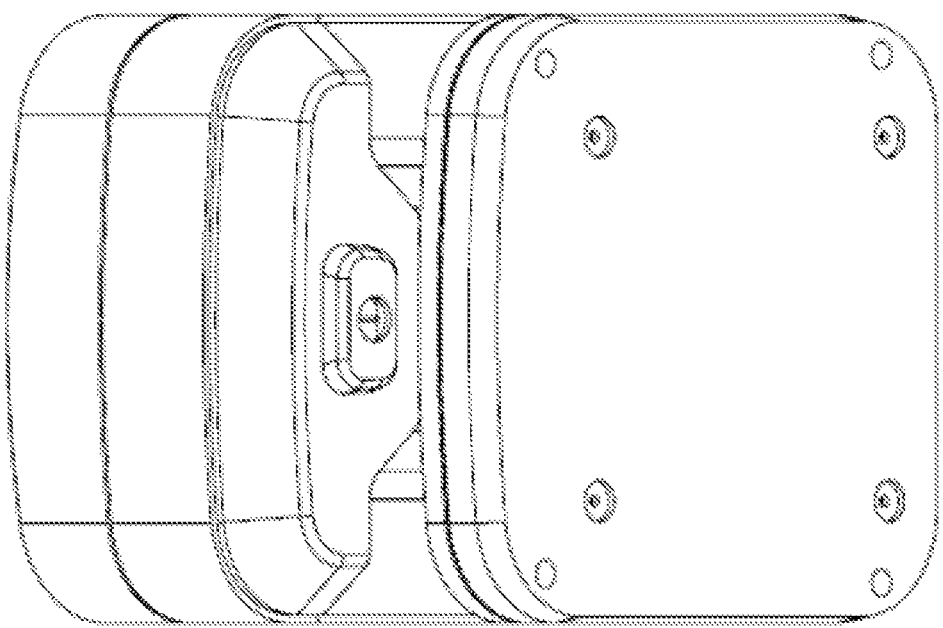
Figure 24D:
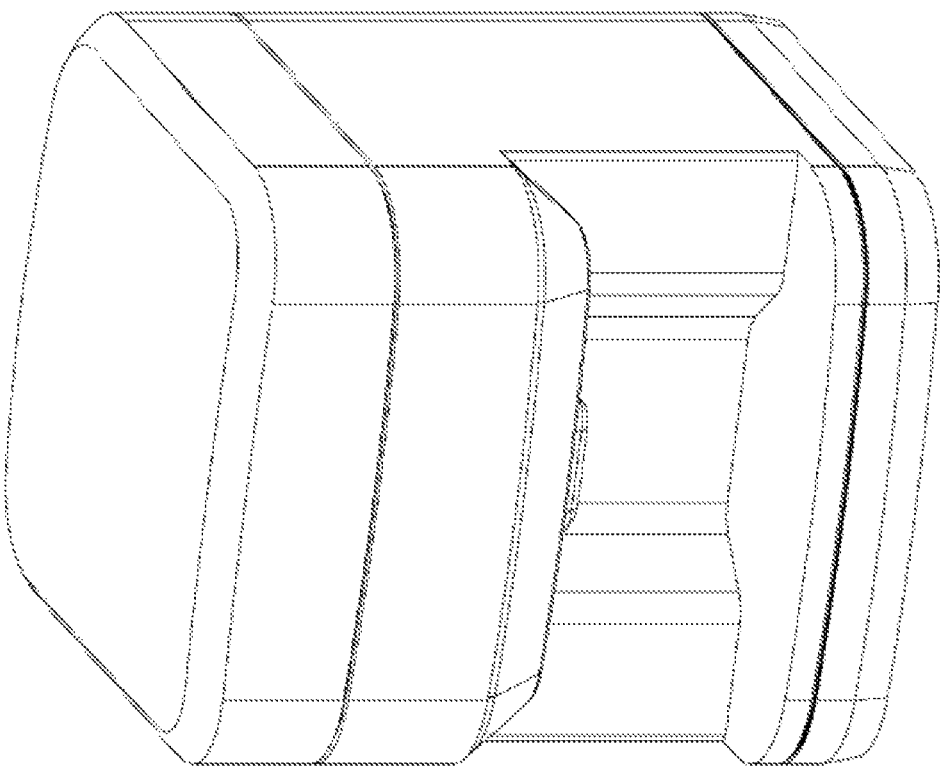

In some embodiments, increasing the accuracy of dispenses can be achieved by taking into account prior contents of the collection channel. The collection channel is represented by the vertical line down the center of the diagram in FIG. 23. The microfluidic channels of a restrictor plate for the various ingredients enter the collection channel at different locations along the length of the collection channel, as indicated in FIG. 23. The collection channel terminates at the bottom of FIG. 23, at an outlet port. A dispense tube, disposed within the chassis of the microfluidic dispenser, can connect to this outlet port. The "contained volume" for each ingredient is the volume from the point where the ingredient's microfluidic channel of a restrictor plate enters the collection channel to the end of the dispense tube. When a small volume of a terpene ingredient is delivered to the collection channel, the "contained volume" is the amount of MCT that is pushed down the collection channel to displace the terpene ingredient into the dispense receiver. These "contained volumes" can be taken into account when generating instruction sets for dispense events. Example contained volumes are presented in Table 10, below.

TABLE 10

Contained Volumes for Displacement of Ingredients from the Collection Channel

| Ingredient Channel Number | Volume Collection Channel to the Outlet Port [µL] | Volume of Dispense Tube [µL] | Contained Volume [µL] |
|---|---|---|---|
| 1 | 28.2 | 39.0 | 67.2 |
| 2 | 36.2 | 39.0 | 75.2 |
| 3 | 50.9 | 39.0 | 89.9 |
| 4 | 58.1 | 39.0 | 97.1 |
| 5 | 70.0 | 39.0 | 109.0 |
| 6 | 79.8 | 39.0 | 118.8 |
| 7 | 82.4 | 39.0 | 121.4 |
| 8 | 94.9 | 39.0 | 133.9 |
| 9 | 98.6 | 39.0 | 137.6 |
| 10 | 113.9 | 39.0 | 152.9 |
| 11 | 126.5 | 39.0 | 165.5 |
| 12 | 130.1 | 39.0 | 169.1 |
| 13 | 156.3 | 39.0 | 195.3 |
| 14 | 150.8 | 39.0 | 189.8 |

These contained volumes assume that there will be plug flow down the length of the collection channel. When the dispense sequence involves neat MCT displacing MCT:Terpene mixtures, an assumption of plug flow is valid. When the dispense sequence involves CBD displacing MCT:Terpene mixtures, an assumption of plug flow is likewise valid. MCT displacing CBD may not occur under conditions of plug flow, but rather very pronounced channeling and breakthrough can occur. Fortunately, dispense sequences can be designed to avoid the necessity of MCT displacing CBD. Table 11, below, shows example ingredient characterization data.

TABLE 11

Example Ingredient Characterization Data

| Abbreviation | Channel # | Date | A-parm | Flowrate Qo | Intercept (Minimum Dispense) milligrams |
|---|---|---|---|---|---|
| ANX1 | #1 | 191030 | 2253.02 | 13.7221 | 0.1172 |
| ANX2 | #1 | 191030 | 2073.81 | 19.5818 | −0.8473 |
| ANX3 | #1 | 190920 | 1502.76 | 23.5483 | 1.997 |
| aPIN | #4 | 191025 | 1665.84 | 26.6381 | −0.6619 |
| bPIN | #4 | 191029 | 1537.15 | 22.5594 | 0.6348 |
| CAR | #5 | 191030 | 2351.86 | 6.9342 | 1.7368 |
| CAR | #6 | 191030 | 2351.86 | 9.1915 | 0.5427 |
| HUM | #3 | 191025 | 2192.05 | 8.3206 | 1.1085 |
| LEVI | #6 | 191029 | 1142.08 | 24.9018 | 1.7068 |
| MCT | #13 | 191025 | 3002.74 | 22.8248 | 1.4404 |
| MYR | #2 | 191025 | 1067.26 | 41.8800 | −3.4600 |
| PAIN1 | #1 | 190920 | 1719.30 | 22.2262 | 1.6134 |
| PAIN2 | #1 | 191030 | 1997.08 | 16.6556 | 0.4611 |
| SLP2 | #5 | 190922 | 2736.36 | 12.1669 | 0.8929 |
| TPN | #2 | 191029 | 1302.52 | 27.8366 | 1.4693 |
| NRD | #3 | 191002 | 3524.83 | 3.1785 | 1.3675 |
| LOL | #4 | 191002 | 2808.11 | 15.2783 | −0.1255 |
| ELX55 | #11 | 190920 | 8627.70 | 20.4904 | 1.5107 |

Figure 25:
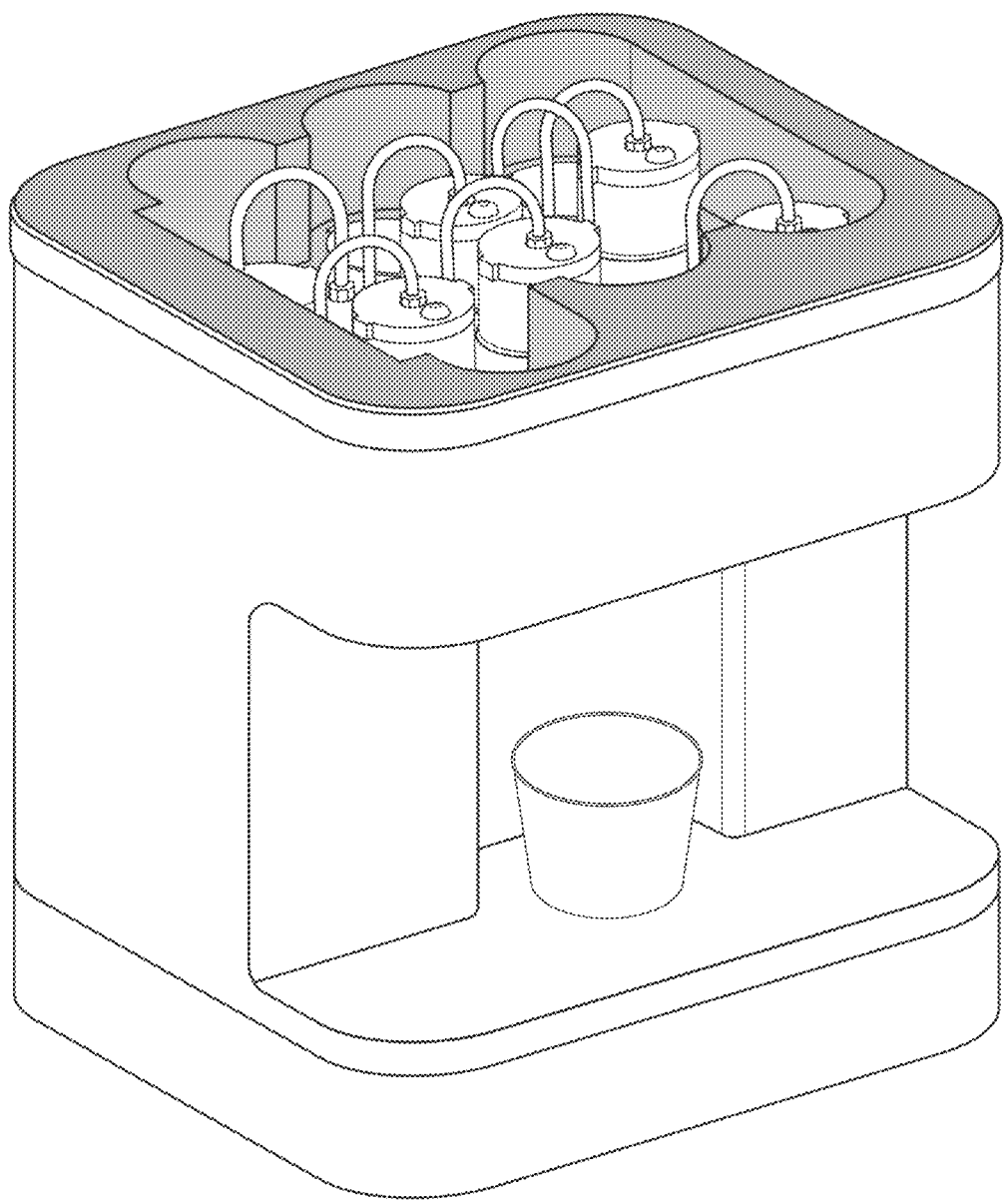
FIG. 25 is a photograph of a primed docking block, according to some embodiments.
Figure 26:
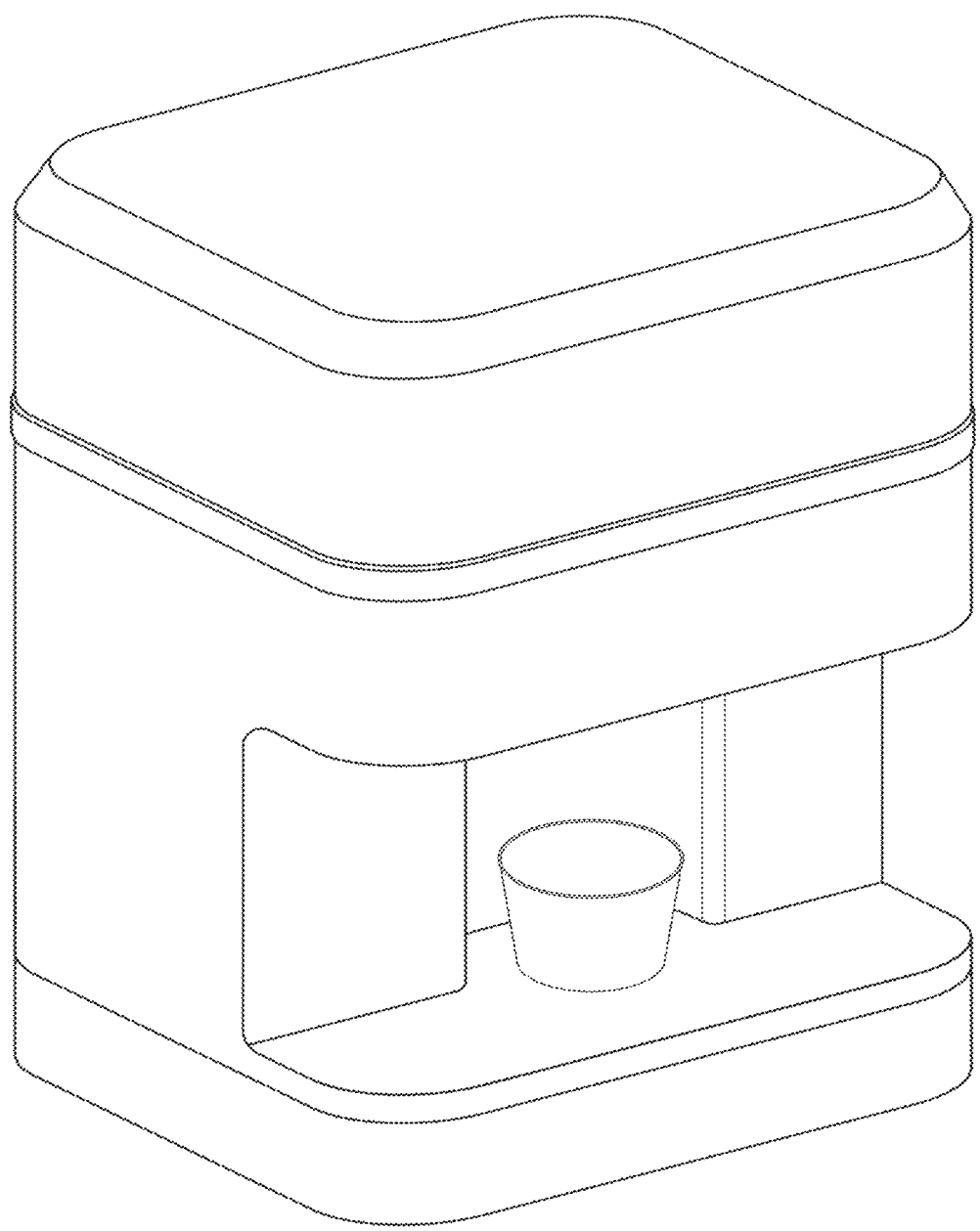
FIG. 26 is a photograph of a microfluidic dispenser after a dispense event, according to some embodiments.
Figure 27A:
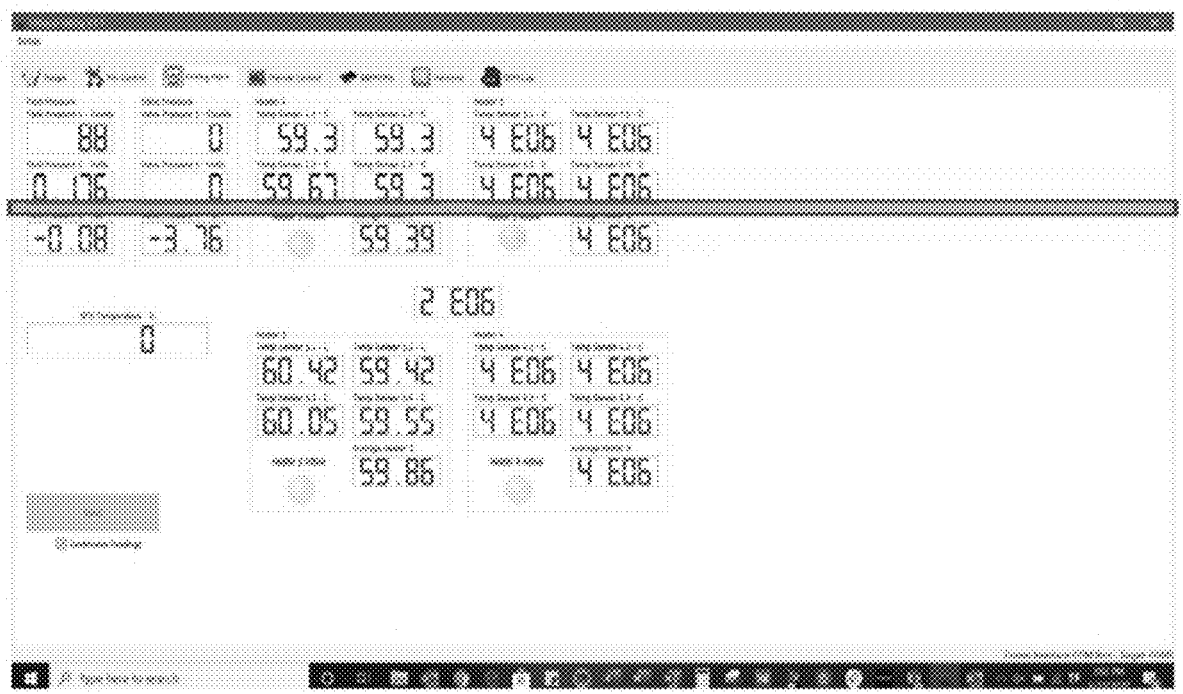
FIGS. 27A-27G are screenshots of a user interface of a control software application of a microfluidic dispenser system, according to some embodiments.
Figure 27B:
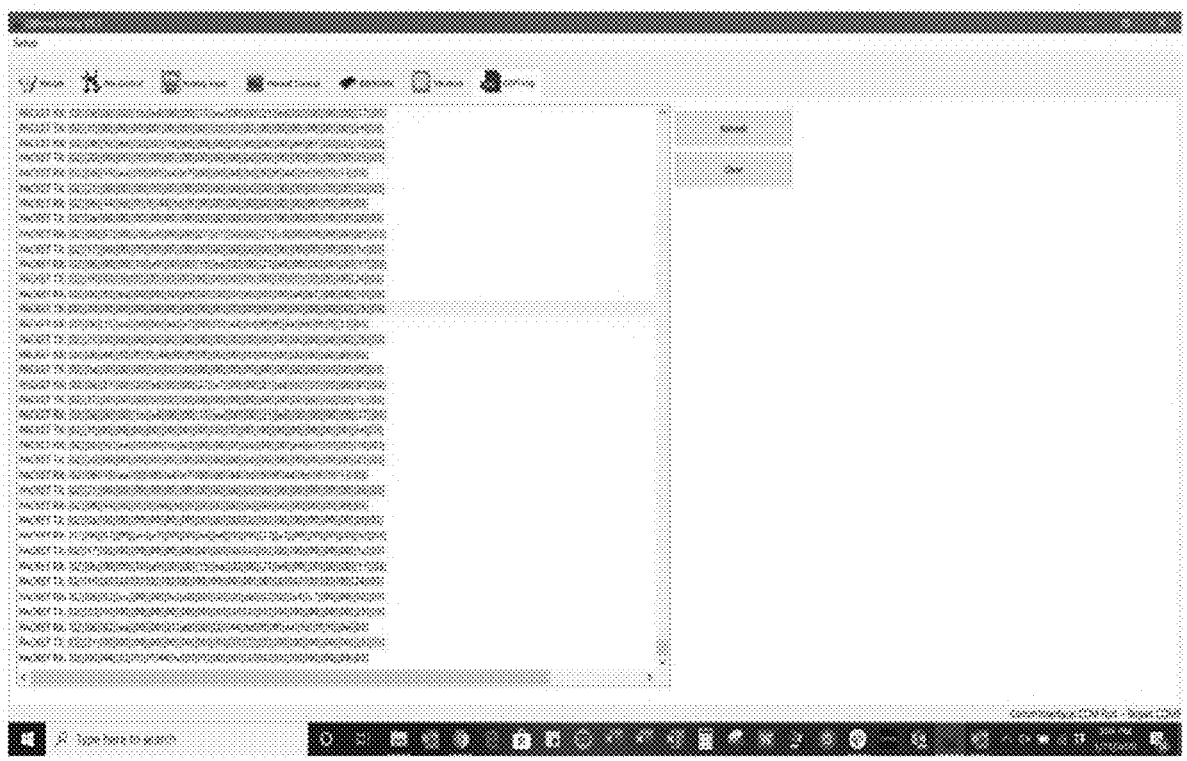
Figure 27C:
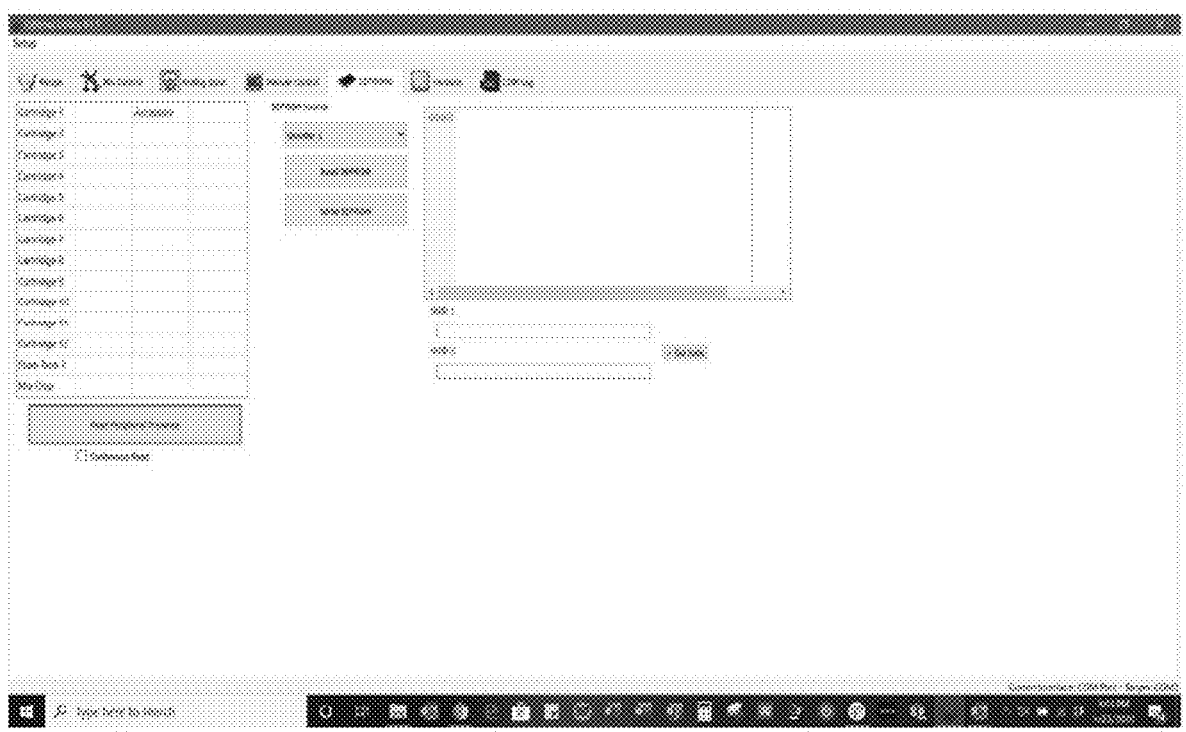
Figure 27D:
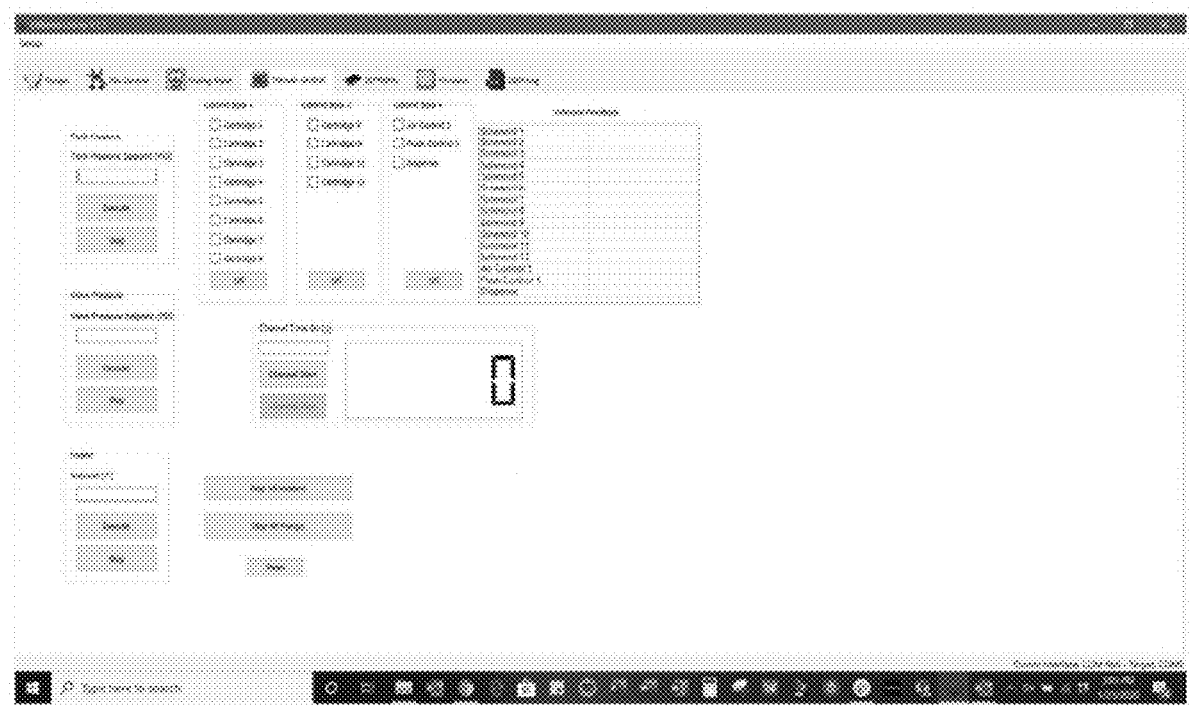
Figure 27E:
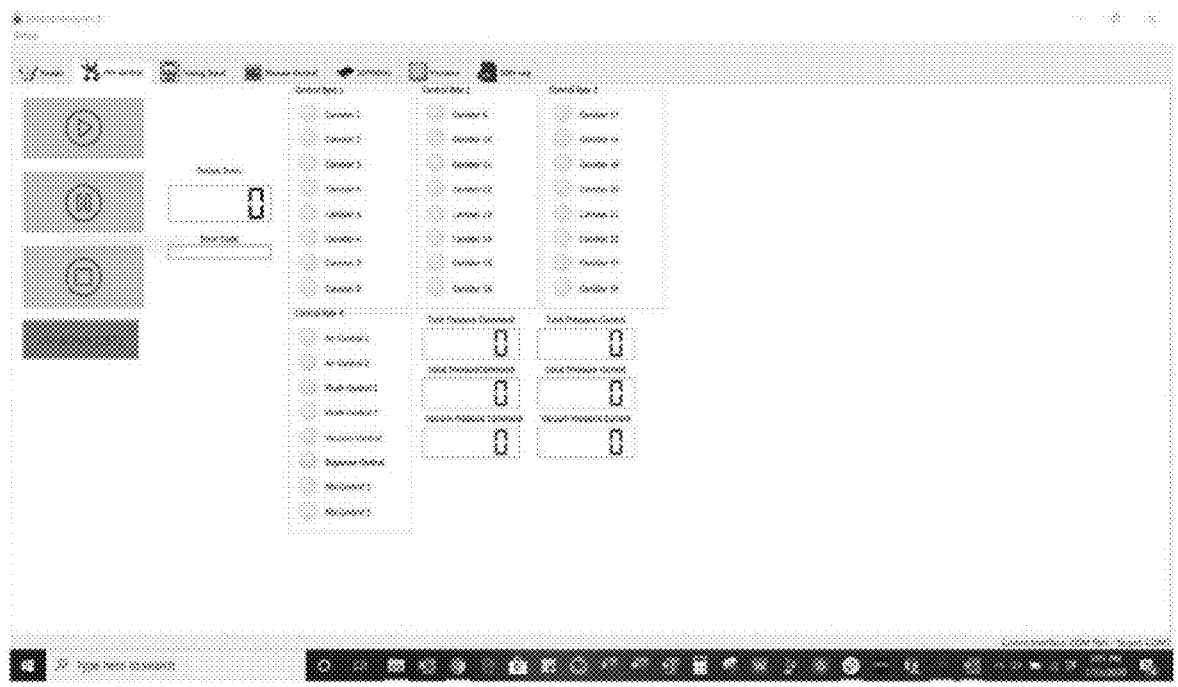
Figure 27F:
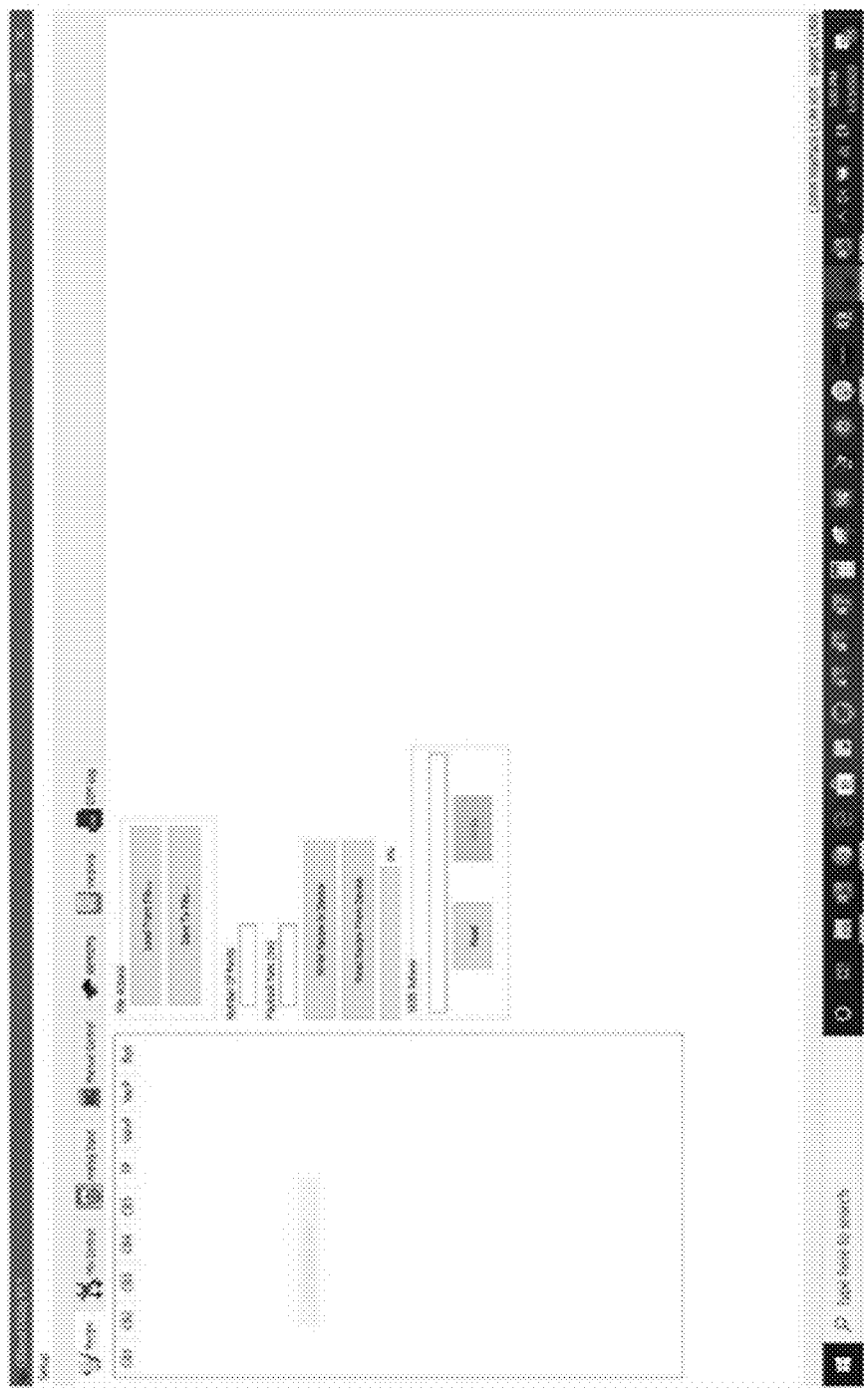
Figure 27G:
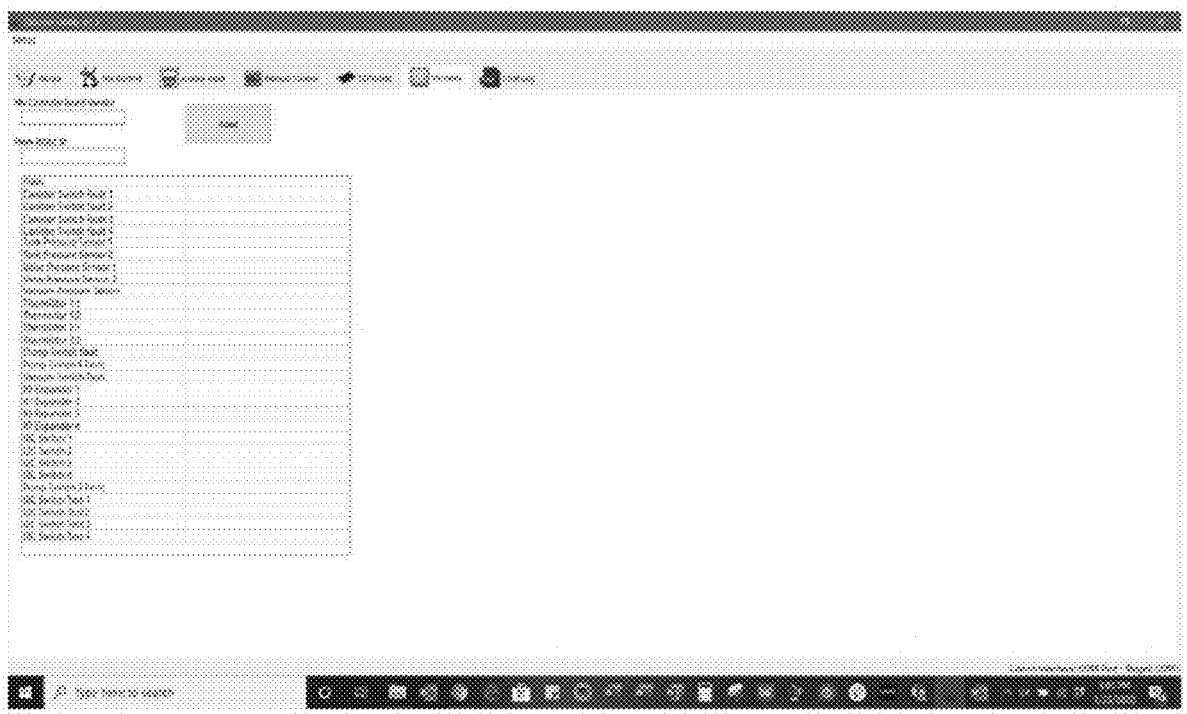

FIGS. 24A-24E show views of a microfluidic dispenser, according to some embodiments. FIG. 25 is a photograph of a primed docking block, according to some embodiments. FIG. 26 is a photograph of a microfluidic dispenser after a dispense event, according to some embodiments. FIGS. 27A-27G are screenshots of a user interface of a control software application of a microfluidic dispenser system, according to some embodiments.

Fluids that can be used as ingredients in the microfluidic include, by way of non-limiting example: oils, cannabinoids, nicotine, terpenes, terpenoids, flavonoids, cannaflavins, esters, botanical extracts, endocannabinoid agonists, aromatics, and/or the like. The list of cannabinoid oils, cannabinoids, terpenes (including primary terpenes found in *Cannabis*), flavonoids and cannaflavins compatible with the microfluidic dispenser is large, and a non-limiting example list is provided below, in Table 12.

TABLE 12

| Example Cannabinoids | |
|---|---|
| D9-THC Class | Complete name |
| D9-THC | D9-Tetrahydrocannabinol |
| D9-THCA-A | D9-Tetrahydrocannabinolic acid A |
| D9-THCA-B | D9-Tetrahydrocannabinolic acid B |
| D9-THCV | D9-Tetrahydrocannabivarin |
| D9-THCVA | D9-Tetrahydrocannabivarinic acid |
| D9-THC-C4 | D9-Tetrahydrocanabinol acid C4 |
| D9-THCA-C4 | D9-Tetrahydrocanabinolic acid C4 |
| D9-THCO | D9-tetrahydrocannabiorcol |
| D9-THCOA | D9-tetrahydrocannabiorcolic acid |
| b-Fenchyl-D9-THCA | b-fenchyl-D9-tetrahydrocannabinolate |
| a-Fenchyl-D9-THCA | a-fenchyl-D9-tetrahydrocannabinolate |
| epi-Bornyl-D9-THCA | epi-bornyl-D9-tetrahydrocannabinolate |
| Bornyl-D9-THCA | bornyl-D9-tetrahydrocannabinolate |
| a-Terpenyl-D9-THCA | a-terpenyl-D9-tetrahydrocannabinolate |
| 4-Terpenyl-D9-THCA | 4-terpenyl-D9-tetrahydrocannabinolate |
| a-Cadinyl-D9-THCA | a-cadinyl-D9-tetrahydrocannabinolate |
| g-Eudesmyl-D9-THCA | g-eudesmyl-D9-tetrahydrocannabinolate |
| Cannabisol | Cannabisol |
| cis-D9-THC | (−)-D9-cis(6aS, 10aR)-tetrahydrocannabinol |
| D8-THC Class | |
| D8-THC | D8-Tetrahydrocannabinol |
| D8-THCA | D8-Tetrahydrocannabinolic acid |
| CBG Class | |
| CBG-C5 | Cannabigerol |
| CBGA | Cannabigerolic acid |
| CBGM | Cannabigerol monomethyl ether |
| CBGAM | Cannabigerolic acid monomethyl ether |
| CBGV | Cannabigerovarin |
| CBGVA | Cannabigerovarinic acid |
| (Z)-CBG-C5 | Cannabinerolic acid |
| g-Eudesmyl-CBGA | y-Eudesmyl cannabigerolate |
| a-Cadinyl-CBGA | a-Cadinyl cannabigerolate |
| 5-Ac-4-OH-CBG | 5-acetyl-4-hydroxycannabigerol |
| 6,7-trans-CBGA | (±)-6,7-trans-epoxycannabigerolic acid |
| 6,7-cis-CBGA | (±)-6,7-cis-expoxycannabigerolic acid |
| 6,7-cis-CBG | (±)-6,7-cis-epoxycannabigerol |
| 6,7-trans-CBG | (±)-6,7-trans-expoxycannabigerol |
| 2,3-Di-OH-CBG | carmagerol |
| C15-CBG | sesquicannabigerol |
| CBC Class | |
| CBC-C5 | Cannabichromene |
| CBCA-C5 | Cannabichromenic acid |
| CBCV-C3 | Cannabichromevarin |
| CBCVA | Cannabichromevarinic acid |
| 4-Ac-CBC | (±)-4-acetoxycannabichromene |
| 3″-OH-D4″-CBC | (±)-3″-hydroxy-D4″-cannabichromene |
| 7-OH-CBC | (−)-7-hydroxycannabichromane |
| CBD Class | |
| CBD | Cannabidiol |
| CBDA | Cannabidiolic acid |
| CBDV | Cannabinodivarin |
| CBDVA | Cannabinodivarinic acid |

TABLE 12-continued

| Example Cannabinoids | |
|---|---|
| D9-THC Class | Complete name |
| CBDM | Canabidiol monomethyl ether |
| CBD-C1 | Cannabidiorcol |
| CBD-C4 | Cannabidiol-C4 |
| Cyclo5-CBD | Cannabimovone |
| CBND Class | |
| CBND-C5 | Cannabinodiol |
| CBND-C3 | Cannabinodivarin |
| CBE Class | |
| CBE-C5 | Cannabielsoin |
| CBEA-C5 A | Cannabielsoinic acid A |
| CBEA-C5 B | Cannabielsoinic acid B |
| CBE-C3 | Cannabielsoin |
| CBEA-C3 B | Cannabielsoinic acid B |
| CBL Class | |
| CBL | Cannabicyclol |
| CBLA | Cannabicyclolic acid |
| CBL-C3 | Cannabicyclovarin |
| CBN Class | |
| CBN | Cannabinol |
| CBNA | Cannabinolic acid A |
| CBN-C3 | Cannabivarin |
| CBN-C1 | Cannabiorcol |
| CBNM | Cannabinol methyl ether |
| CBN-C4 | Cannabinol-C4 |
| CBN-C2 | Cannabinol-C2 |
| 4-Terpenyl-CBNA | 4-Terpenyl Cannabinolate |
| 8-OH-CBN | 8-Hydroxycannabinol |
| 8-OH-CBNA | 8-Hydroxycannabinolic acid |
| CBT Class | |
| (−)-trans-CBT-C5 | (−)-trans-Cannabitriol |
| (+)-trans-CBT-C5 | (+)-trans-Cannabitriol |
| (±)-cis-CBT-C5 | (±)-cis-Cannabitriol |
| (±)-trans-CBT-C3 | (±)-trans-Cannabitriol-C3 |
| (−)-trans-CBT-OEt-C5 | (−)-trans-10-Ethoxycannabitriol |
| (−)-trans-CBT-OEt-C3 | (−)-trans-10-Ethoxycannabitriol-C3 |
| CBT-C3 homologue | Cannabitriol-C3 (unkown stereochemistry) |
| 8-OH-CBT-C5 | 8-Hydroxycannabitriol |
| CBDA-C5 9-O-CBT-C5 ester | Cannabidiolic acid tetrahydrocannabitriol ester |
| Miscellaneous | |
| DCBF-C5 | Dehydrocannabifuran |
| CBF-C5 | Cannabifuran |
| OH-Iso-HHCV-C3 | 8-Hydroxy-isohexahydrocannabivarin |
| CBCN-C5 | Cannabichromanone-C5 |
| CBCN-C3 | Cannabichromanone-C3 |
| CBCT-C5 | Cannabicitran |
| OTHC | 10-Oxo-D6a(10a)-tetrahydrocannabinol |
| CBR | Cannabiripsol |
| CBTT | Cannabitetrol |
| cis-D7-iso-THCV | (±)-D7-cis-isotetrahydrocannabivarin-C3 |
| trans-D7-iso-THCV | (−)-D7-trans-(1R, 3R, 6R)-isotetrahydrocannabivarin-C3 |
| trans-D7-iso-THC | (−)-D7-trans-(1R, 3R, 6R)-isotetrahydrocannabinol-C5 |
| CBCN-A | Cannabichromanone-A |
| CBCN-B | Cannabichromanone-B |
| CBCN-C | Cannabichromanone-C |
| CBCN-D | Cannabichromanone-D |
| CBCON-C5 | (−)-7R-cannabicoumarone |
| CBCONA-C5 | (−)-7R-cannabicoumaronic acid |
| Cannabioxepane | Cannabioxepane |
| 4-acetoxy-2-geranyl-5-hydroxy-3-n-pentylphenol | |
| 2-geranyl-5-hydroxy-3-n-pentyl-1,4-benzoquinone | |

TABLE 12-continued

Example Cannabinoids

| D9-THC Class | Complete name |
|---|---|
| 5-acetoxy-6-geranyl-3-n-pentylphenol-1,4-benzoquinone | |

Example Terpenes:

α Pinene
Linalool
Myrcene
Limonene
Ocimene
Terpinolene
Terpineol
Valencene
β Caryophyllene
α Humulene
Phellandrene
Carene
Terpinene
Fenchol
Borneol
Bisabolol
Phytol
Camphene
Sabinene
Camphor
Isoborneol
Menthol
Cedrene
Nerolidol
Guaiol
Isopulegol
Geranyl Acetate
Cymene
Eucalyptol
Pulegone

Example Flavonoids, Cannaflavins:

cannflavine A
cannflavine B
cannflavine C
vitexin
isovitexin
apigenin
kaempferol
quercetin
luteolin
orientin

Example Essential Oils:

cardmom
balsam fir
basil
bergamot
black pepper
angelica
blue cypress
carrot seed
cedarwood
celery seed
cinnamon
cinnamon bark
cistus
citronella
clary sage
clove
copaiba
coriander
curcumin
cypress
dandelion
dill
dorado azul
elemi
eucaluptus
fennel
frankincense
geranium
chamomile
ginger
goldenrod
grapefruit
helichrysum
hinoki
hong kuai
hyssop
spruce
lemon
juniper agar oil
oodh
ajwain
angelica root
anise
asafoetida
balsam of Peru
Basil
Bay oil
Bergamot
Buchu
birch Camphor
Cannabis flower
Calamodin
Calamansi
Caraway Cardamom seed
Calamus
Cinnamon
Cistus
Citron
Clary Sage
Coconut
Clove
Coffee
Coriander
Costmary
Costus root
Cranberry seed
Cubeb
Cumin
Black seed
Cypress oil
Cypriol
Curry leaf
Davana
Dill
Echinacea
Elecampane
Elemi
Eucalyptus
Fennel seed
Fenugreek
Fir
Frankincense
Galangal
Galbanum
Geranium
Geranol
Ginger
Grapefruit
Henna
Helichrysum
Hickory nut
Horseradish
Hyssop
Idaho-grown Tansy
Jasmine -continued Juniper berry
Laurus nobilis
Lavender
Ledum
Lemon
Lemongrass
Lime
Litsea cubeba
Linaloe
Mandarin
Marjoram
Melaleuca See Tea tree
Melissa
Mentha arvensis
Moringa
Mountain Savory
Mugwort
Mustard
Myrrh
Myrtle
Neem
Neem Tree
Neroli
Nutmeg
Orange
Oregano
Orris
Palo Santo
Parsley
Patchouli
Perilla
Peppermint
Petitgrain
Pine
Ravensara
Red Cedar
Roman Chamomile
Rose
Rosehip
Rosemary
Rosewood
Sage
Star anise
Sandalwood
Sassafras
Savory
Schisandra
Spearmint
Spikenard
Spruce
Tangerine
Tarragon
Tea
Thyme
Tsuga
Turmeric
Valerian
Warionia
Vetiver
Western red cedar
Wintergreen
Yarrow
Ylang-ylang
Zedoary A microfluidic dispenser or associated vendor can be accessible via web or smart-phone app for the users of the microfluidic dispenser to post and find favorite recipes; recipes with medical applications; recipes with veterinary applications; social sharing, articles/blogs and other information about cannabis, terpenes and more.

In some embodiments, the microfluidic dispenser can be configured to formulate a variety of blends and/or compositions. For example, the microfluidic dispenser can be configured to blend compositions comprising, consisting of, and/or consisting essentially of at least one first purified cannabinoid and at least one of a second purified cannabinoid, a purified terpene, a purified flavonoid, and/or a purified mineral. In some embodiments, the microfluidic dispenser is configured to blend one or more of 7,8-dihydroionone, Acetanisole, Acetic Acid, Acetyl Cedrene, Anethole, Anisole, Benzaldehyde, Bergamotene (α-cis-Bergamotene) (α-trans-Bergamotene), Bisabolol (β-Bisabolol), Borneol, Butanoic/Butyric Acid, Cadinene (α-Cadinene) (γ-Cadinene), Cafestol, Caffeic acid, Camphene, Camphor, Capsaicin, Carene (Δ-3-Carene), Carotene, Carvacrol, Carvone, Dextro-Carvone, Laevo-Carvone, Caryophyllene (β-Caryophyllene), Caryophyllene oxide, Castoreum Absolute, Cedrene (α-Cedrene) (β-Cedrene), Cedrene Epoxide (α-Cedrene Epoxide), Cedrol, Cembrene, Chlorogenic Acid, Cinnamaldehyde (α-amyl-Cinnamaldehyde) (α-hexyl-Cinnamaldehyde), Cinnamic Acid, Cinnamyl Alcohol, Citronellal, Citronellol, Cryptone, Curcumene (α-Curcumene) (γ-Curcumene), Decanal, Dehydrovomifoliol, Diallyl Disulfide, Dihydroactinidiolide, Dimethyl Disulfide, Eicosane/Icosane, Elemene (β-Elemene), Estragole, Ethyl acetate, Ethyl Cinnamate, Ethyl maltol, Eucalyptol/1,8-Cineole, Eudesmol (α-Eudesmol) (μ-Eudesmol) (γ-Eudesmol), Eugenol, Euphol, Farnesene, Farnesol, Fenchol (β-Fenchol), Fenchone, Geraniol, Geranyl acetate, Germacrenes, Germacrene B, Guaia-1(10), 11-diene, Guaiacol, Guaiene (α-Guaiene), Gurjunene (α-Gurjunene), Herniarin, Hexanaldehyde, Hexanoic Acid, Humulene (α-Humulene) (β-Humulene), Ionol β-oxo-α-ionol) (β-Ionol), Ionone (α-Ionone) (β-Ionone), Ipsdienol, Isoamyl acetate, Isoamyl Alcohol, Isoamyl Formate, Isoborneol, Isomyrcenol, Isopulegol, Isovaleric Acid, Isoprene, Kahweol, Lavandulol, Limonene, γ-Linolenic Acid, Linalool, Longifolene, α-Longipinene, Lycopene, Menthol, Methyl butyrate, 3-Mercapto-2-Methylpentanal, Mercaptan/Thiols, β-Mercaptoethanol, Mercaptoacetic Acid, Allyl Mercaptan, Benzyl Mercaptan, Butyl Mercaptan, Ethyl Mercaptan, Methyl Mercaptan, Furfuryl Mercaptan, Ethylene Mercaptan, Propyl Mercaptan, Thenyl Mercaptan, Methyl Salicylate, Methylbutenol, Methyl-2-Methylvalerate, Methyl Thiobutyrate, Myrcene (β-Myrcene), γ-Muurolene, Nepetalactone, Nerol, Nerolidol, Neryl acetate, Nonanaldehyde, Nonanoic Acid, Ocimene, Octanal, Octanoic Acid, P-cymene, Pentyl butyrate, Phellandrene, Phenylacetaldehyde, Phenylethanethiol, Phenylacetic Acid, Phytol, Pinene, β-Pinene, Propanethiol, Pristimerin, Pulegone, Retinol, Rutin, Sabinene, Sabinene Hydrate, cis-Sabinene Hydrate, trans-Sabinene Hydrate, Safranal, α-Selinene, α-Sinensal, β-Sinensal, β-Sitosterol, Squalene, Taxadiene, Terpin hydrate, Terpineol, Terpine-4-ol, α-Terpinene, γ-Terpinene, Terpinolene, Thiophenol, Thuj one, Thymol, α-Tocopherol, Tonka Undecanone, Undecanal, Valeraldehyde/Pentanal, Verdoxan, α-Ylangene, Umbelliferone, and/or Vanillin.

In some embodiments, the MICROFLUIDIC DISPENSER is configured to blend one or more of Cannabigerolic Acid (CBGA), Cannabigerolic Acid monomethylether (CBGAM), Cannabigerol (CBG), Cannabigerol monomethylether (CBGM), Cannabigerovarinic Acid (CBGVA), Cannabigerovarin (CBGV), Cannabichromenic Acid (CBCA), Cannabichromene (CBC), Cannabichromevarinic Acid (CBCVA), Cannabichromevarin (CBCV), Cannabidiolic Acid (CBDA), Cannabidiol (CBD), Cannabidiol monomethylether (CBDM), Cannabidiol-C4 (CBD-C4), Cannabidivarinic Acid (CBDVA), Cannabidivarin (CBDV), Cannabidiorcol (CBD-C1), Tetrahydrocannabinolic acid A (THCA-A), Tetrahydrocannabinolic acid B (THCA-B), Tetrahydrocannabinol (THC), Tetrahydrocannabinolic acid C4 (THCA-C4), Tetrahydrocannbinol C4 (THC-C4), Tetrahydrocannabivarinic acid (THCVA), Tetrahydrocannabivarin (THCV), Tetrahydrocannabiorcolic acid (THCA-C1), Tetrahydrocannabiorcol (THC-C1), Delta-7-cis-iso-tetrahydrocannabivarin, Δ8-tetrahydrocannabinolic acid (Δ8-THCA), Δ8-tetrahydrocannabinol (Δ8-THC), Cannabicyclolic acid (CBLA), Cannabicyclol (CBL), Cannabicyclovarin (CBLV), Cannabielsoic acid A (CBEA-A), Cannabielsoic acid B (CBEA-B), Cannabielsoin (CBE), Cannabinolic acid (CBNA), Cannabinol (CBN), Cannabinol methylether (CBNM), Cannabinol-C4 (CBN-C4), Cannabivarin (CBV), Cannabino-C2 (CBN-C2), Cannabiorcol (CBN-C1), Cannabinodiol (CBND), Cannabinodivarin (CBDV), Cannabitriol (CBT), 10-Ethoxy-9-hydroxy-Δ6a-tetrahydrocannabinol, 8,9-Dihydroxy-Δ6a(10a)-tetrahydrocannabinol (8,9-Di-OH-CBT-C5), Cannabitriolvarin (CBTV), Ethoxy-cannabitriolvarin (CBTVE), Dehydrocannabifuran (DCBF), Cannbifuran (CBF), Cannabichromanon (CBCN), Cannabicitran (CBT), 10-Oxo-Δ6a(10a)-tetrahydrocannabinol (OTHC), Δ9-cis-tetrahydrocannabinol (cis-THC), Cannabiripsol (CBR), 3,4,5,6-tetrahydro-7-hydroxy-alpha-alpha-2-trimethyl-9-n-propyl-2,6-methano-2H-1-benzoxocin-5-methanol (OH-iso-HHCV), Trihydroxy-delta-9-tetrahydrocannabinol (triOH-THC), Isocanabinoids, and/or Epigallocatechin gallate.

In some embodiments, the microfluidic dispenser is configured to blend one or more of Cannabigerolic Acid (CBGA), Cannabigerolic Acid monomethylether (CBGAM), Cannabigerol (CBG), Cannabigerol monomethylether (CBGM), Cannabigerovarinic Acid (CBGVA), Cannabigerovarin (CBGV), Cannabichromenic Acid (CBCA), Cannabichromene (CBC), Cannabichromevarinic Acid (CBCVA), Cannabichromevarin (CBCV), Cannabidiolic Acid (CBDA), Cannabidiol (CBD), Cannabidiol monomethylether (CBDM), Cannabidiol-C4 (CBD-C4), Cannabidivarinic Acid (CBDVA), Cannabidivarin (CBDV), Cannabidiorcol (CBD-C1), Tetrahydrocannabinolic acid A (THCA-A), Tetrahydrocannabinolic acid B (THCA-B), Tetrahydrocannabinol (THC), Tetrahydrocannabinolic acid C4 (THCA-C4), Tetrahydrocannbinol C4 (THC-C4), Tetrahydrocannabivarinic acid (THCVA), Tetrahydrocannabivarin (THCV), Tetrahydrocannabiorcolic acid (THCA-C1), Tetrahydrocannabiorcol (THC-C1), Delta-7-cis-iso-tetrahydrocannabivarin, Δ8-tetrahydrocannabinolic acid (Δ8-THCA), Δ8-tetrahydrocannabinol (Δ8-THC), Cannabicyclolic acid (CBLA), Cannabicyclol (CBL), Cannabicyclovarin (CBLV), Cannabielsoic acid A (CBEA-A), Cannabielsoic acid B (CBEA-B), Cannabielsoin (CBE), Cannabinolic acid (CBNA), Cannabinol (CBN), Cannabinol methylether (CBNM), Cannabinol-C4 (CBN-C4), Cannabivarin (CBV), Cannabino-C2 (CBN-C2), Cannabiorcol (CBN-C1), Cannabinodiol (CBND), Cannabinodivarin (CBDV), Cannabitriol (CBT), 10-Ethoxy-9-hydroxy-Δ6a-tetrahydrocannabinol, 8,9-Dihydroxy-Δ6a(10a)-tetrahydrocannabinol (8,9-Di-OH-CBT-C5), Cannabitriolvarin (CBTV), Ethoxy-cannabitriolvarin (CBTVE), Dehydrocannabifuran (DCBF), Cannbifuran (CBF), Cannabichromanon (CBCN), Cannabicitran (CBT), 10-Oxo-Δ6a(10a)-tetrahydrocannabinol (OTHC), Δ9-cis-tetrahydrocannabinol (cis-THC), Cannabiripsol (CBR), 3,4,5,6-tetrahydro-7-hydroxy-alpha-alpha-2-trimethyl-9-n-propyl-2,6-methano-2H-1-benzoxocin-5-methanol (OH-iso-HHCV), Trihydroxy-delta-9-tetrahydrocannabinol (triOH-THC), Yangonin, Isocanabinoids, Epigallocatechin gallate, Dodeca-2E,4E,8Z,10Z-tetraenoic acid isobutylamide, or Dodeca-2E,4E-dienoic acid isobutylamide; and a second purified cannabinoid chosen from Cannabigerolic Acid (CBGA), Cannabigerolic Acid monomethylether (CBGAM), Cannabigerol (CBG), Cannabigerol monomethylether (CBGM), Cannabigerovarinic Acid (CBGVA), Cannabigerovarin (CBGV), Cannabichromenic Acid (CBCA), Cannabichromene (CBC), Cannabichromevarinic Acid (CBCVA), Cannabichromevarin (CBCV), Cannabidiolic Acid (CBDA), Cannabidiol (CBD), Cannabidiol monomethylether (CBDM), Cannabidiol-C4 (CBD-C4), Cannabidivarinic Acid (CBDVA), Cannabidivarin (CBDV), Cannabidiorcol (CBD-C1), Tetrahydrocannabinolic acid A (THCA-A), Tetrahydrocannabinolic acid B (THCA-B), Tetrahydrocannabinol (THC), Tetrahydrocannabinolic acid C4 (THCA-C4), Tetrahydrocannbinol C4 (THC-C4), Tetrahydrocannabivarinic acid (THCVA), Tetrahydrocannabivarin (THCV), Tetrahydrocannabiorcolic acid (THCA-C1), Tetrahydrocannabiorcol (THC-C1), Delta-7-cis-iso-tetrahydrocannabivarin, Δ8-tetrahydrocannabinolic acid (Δ8-THCA), Δ8-tetrahydrocannabinol (Δ8-THC), Cannabicyclolic acid (CBLA), Cannabicyclol (CBL), Cannabicyclovarin (CBLV), Cannabielsoic acid A (CBEA-A), Cannabielsoic acid B (CBEA-B), Cannabielsoin (CBE), Cannabinolic acid (CBNA), Cannabinol (CBN), Cannabinol methylether (CBNM), Cannabinol-C4 (CBN-C4), Cannabivarin (CBV), Cannabino-C2 (CBN-C2), Cannabiorcol (CBN-C1), Cannabinodiol (CBND), Cannabinodivarin (CBDV), Cannabitriol (CBT), 10-Ethoxy-9-hydroxy-Δ6a-tetrahydrocannabinol, 8,9-Dihydroxy-Δ6a(10a)-tetrahydrocannabinol (8,9-Di-OH-CBT-C5), Cannabitriolvarin (CBTV), Ethoxy-cannabitriolvarin (CBTVE), Dehydrocannabifuran (DCBF), Cannbifuran (CBF), Cannabichromanon (CBCN), Cannabicitran (CBT), 10-Oxo-Δ6a(10a)-tetrahydrocannabinol (OTHC), Δ9-cis-tetrahydrocannabinol (cis-THC), Cannabiripsol (CBR), 3,4,5,6-tetrahydro-7-hydroxy-alpha-alpha-2-trimethyl-9-n-propyl-2,6-methano-2H-1-benzoxocin-5-methanol (OH-iso-HHCV), Trihydroxy-delta-9-tetrahydrocannabinol (triOH-THC), Yangonin, Isocanabinoids, Epigallocatechin gallate, Dodeca-2E,4E,8Z,10Z-tetraenoic acid isobutylamide, and/or Dodeca-2E,4E-dienoic acid isobutylamide.

In some embodiments, the microfluidic dispenser is configured to blend one or more of phenolic acids, stilbenoids, dihydroflavonols, anthocyanins, anthocyanidins, polyphenols, tannins, flavones, flavan-3-ols, Flavan-4-ol, Flavan-3,4-diol flavonols, stilbenoids, phytochemical s, antioxidants, homoisoflavonoids, phenylpropanoids, Phloroglucinols coumarins, Phenolic acids, Naphthodianthrones, Steroid glycosides, bioflavonoids, isoflavonoids, and neoflavonoids. In some embodiments, the microfluidic dispenser is configured to blend one or more of Adenosine, Adhyperforin, amentoflavone, Anandamide, Apigenin, Cannaflavin B, Catechin (C), Catechin 3-gallate (Cg), Chlorogenic acid, cichoric acid, caftaric acid, Daidzein, Delphinidin, Eleutherosides, Epicatechin 3-gallate (ECg), Epicatechins, Epicatechin, epigallocatechin, myricetin, Oxalic acid, Pelargonidin, Tannin, Theaflavin-3-gallate, Theanine, Theobromine, Theophylline, Tryptophan, Tyramine, Xanthine, Caffeine, Cannaflavin A, Cannaflavin B, Catechin (C), Catechin 3-gallate (Cg), Epicatechin 3-gallate (ECg), Epicatechins (Epicatechin (EC)), epigallocatechin, Epigallocatechin (EGC), Epigallocatechin 3-gallate (EGCg), Gallocatechin (GC), Gallocatechin 3-gallate (GCg)), Gamma amino butyric acid, Genistein, *Ginkgo biloba*, Ginsenosides, Quercetin, Quercitrin, and/or Rutin. In some embodiments, the microfluidic dispenser can be configured to blend a variety of compounds, such as those discussed in U.S. Pat. App. Pub. No. 2016/0250270, the entirety of which is herein expressly incorporated by reference for all purposes. In some embodiments, the microfluidic dispenser is configured to blend one or more of Caffeine, Cannaflavin A, Cannaflavin B, Catechin (C), Catechin 3-gallate (Cg), Epicatechin 3-gallate (ECg), Epicatechins (Epicatechin (EC)), epigallocatechin, Epigallocatechin (EGC), Epigallocatechin 3-gallate (EGCg), Gallocatechin (GC), Gallocatechin 3-gallate (GCg)), Gamma amino butyric acid, Genistein, *Ginkgo biloba*, Ginsenosides, Quercetin, Quercitrin, and/or Rutin.

Cannabinoids are reported to have certain desirable and/or therapeutic effects on those who ingest them.

Some reports indicate that users of the cannabinoid Tetrahydrocannabinol (THC) can experience one of more of the following benefits: pain relief, relaxation, reduced pain from nerve damage, reduced risk of nerve damage, controlled anxiety, suppression of muscle spasms and convulsions, control of certain cancers, reduced nausea, slowed inflammation, combatting of free radicals in the blood stream, stimulated appetite, stimulated new growth in nerve tissue, relief of chronic eye pressure and pain caused by glaucoma and other eye disorders.

Some reports indicate that users of the cannabinoid Cannabidiol (CBD) can experience one of more of the following benefits: control of certain cancers, pain relief, stimulation of bone growth, slowed or stopped growth of bacteria, suppression of muscle spasms and convulsions, slowed inflammation, reduced blood sugar levels, reduced risk of artery obstructions, decreased pressure in blood vessel walls, improved control over epileptic seizures, reduced risk of nerve damage, decreased feelings of social isolation caused by THC, and eased nausea.

Some reports indicate that users of the cannabinoid Cannabichromene (CBC) can experience one of more of the following benefits: pain relief, reduced or stopped growth of fungi, slowed inflammation, stimulated bone growth, encouraged cell growth, reduced or stopped growth of bacteria, and assistance in the contraction of blood cells.

Some reports indicate that users of the cannabinoid Tetrahydrocannabivarin (THCV) can experience one of more of the following benefits: appetite suppression, control of obesity, and potentially control of Type II diabetes, as well as reduce tremors and have additional medicinal benefits for Parkinsons.

Some reports indicate that users of the cannabinoid Cannabinol (CBN) can experience one of more of the following benefits: sleep aid, combatting of free radicals in the blood stream, pain relief, suppression of muscle spasms and convulsions, and slowed inflammation.

Some reports indicate that users of the cannabinoid Cannabigerol (CBG) can experience one of more of the following benefits: reduced or stopped growth of bacteria, stimulation of bone growth, and encouraged cell growth.

Terpenoids are reported to have certain desirable and/or therapeutic effects on those who ingest them. Terpenes commonly found in cannabis include Myrcene, Limonene, Caryophyllene, Linalool, α-Pinene and β-Pinene. Some terpenes have immunomodulatory and anti-inflammatory effects in users.

Some reports indicate that users of the terpenoid α-Pinene can experience one of more of the following benefits: sleep aid, memory aid, anti-anxiety effects, sedative effects, bronchodilation, pine aroma, stress relief, energy increase, alertness, gastroprotective effects, anticonvulsion effects, anti-epileptic effects, asthma relief, and anti-inflammatory effects. α-Pinene is also found in pine needles, orange peel and parsley. α-Pinene can have an aroma of pine, wood, and/or mountain air.

Some reports indicate that users of the terpenoid Linalool can experience one of more of the following benefits: sleep aid, anti-anxiety effects, sedative effects, anxiolytic effects, anti-bacterial effects, pain relief, floral aroma, anticonvulsant effects, stress relief, anti-neoplastic effects, anti-psychotic effects, anti-epileptic effects, anti-convulsant effect, and analgesic effects. Linalool is also found in lavender, laurel and mint. Linalool can have a sweet, floral, citrus aroma, and can help with anxiety, provide sedation, and act as an anti-depressant.

Some reports indicate that users of the terpenoid Myrcene can experience one of more of the following benefits: sleep aid, relaxation, anti-tumor effects, anti-fungal effects, anti-cancer effects, anti-spasm effects, sedative effects, relief from aids insomnia, anti-inflammatory effects, anti-bacterial effects, muscle relaxation, accelerated onset of THC effects, reduce drug cravings or withdrawal from heavy alcohol use, benzodiazepines, meth, and opiates, and a "couch lock effect" at levels >0.5%. Myrcene is also found in hops, fresh mango and lemongrass. Myrcene can have a musky, earthy, clove-like, herbal aroma.

Some reports indicate that users of the terpenoid β-Caryophyllene can experience one of more of the following benefits: anti-tumor effects, anti-fungal effects, anti-septic effects, anti-inflammatory effects, anti-bacterial effects, arthritis relief, relief from gastrointestinal disorder, and muscle relaxation. Caryophyllene can have a rich, peppery, spicy aroma.

Some reports indicate that users of the terpenoid Carophyllene Oxide can experience one of more of the following benefits: anti-fungal effects, pain relief, a spicy aroma, anti-ischemic effects, and anti-inflammatory effects. Carophyllene can provide anti-inflammatory, analgesic, digestion-protective, anti-depressant and antiseptic effects in users, and can help to preserve tract cell lining. Caryophyllene is also found in black pepper, Thai basil, and cloves. Caryophyllene can have a spicy wood or pepper aroma.

Some reports indicate that users of the terpenoid α-Humulene can experience one of more of the following benefits: anti-tumor effects, anti-bacterial effects, a hoppy aroma, anti-inflammatory effects, and appetite suppression.

Some reports indicate that users of the terpenoid Limonene can experience one of more of the following benefits: anti-anxiety effects, anti-depression effects, anti-tumor effects, anti-fungal effects, anti-spasmodic effects, anxiolytic effects, gastroprotective effects, immunostimulant effects, antiseptic effects, stress relief, immunostimulation, apoptosis of breast cancer cells, anti-microbial effects, dissolution of gallstones in a clinical setting, relief of heartburn and/or gastrointestinal reflux, and increased blood flow from the heart. Limonene is also found in citrus fruit rinds, juniper, and peppermint. Limonene can have a citrus (e.g., lemon, orange) aroma.

Some reports indicate that users of the terpenoid Terpinolene can experience one of more of the following benefits: anti-bacterial effects, anti-fungal effects, a smoky woody aroma, anti-insomnia effects, and antiseptic effects.

Methods of Administration of cannabis products include inhalation methods, oral/sublingual methods, nasal, rectal, vaginal, transdermal, and topical.

Inhalation methods include the smoking or vaporization of flower and/or concentrates, leading to CBR1 and CBR2 activation. Cannabinoids are absorbed into the user's bloodstream through the respiratory system.

Oral/sublingual methods include ingestion of edible food products, fresh juice (e.g., non-psychoactive), oral sprays, lozenges, tinctures, and capsules, leading to CBR1 and CBR2 activation. Cannabinoids are absorbed into the user's bloodstream through the oral mucosa and the digestive system. Liver metabolism of THC produces metabolites including 11-Hydroxy-THC.

Transdermal administration methods include transdermal patches, transdermal gels, rectal suppositories, and vaginal suppositories, leading to CBR1 and CBR2 activation. Cannabinoids are absorbed into the user's bloodstream through the user's skin or integumentary system, and bypass the first pass through the liver, thereby reducing the production of 11-Hydroxy-THC metabolites.

Topical administration includes application of cannabis products topically to skin, in the form of lotions, salves, balms, ointments, and bath salts or soaks, leading to CBR2 activation (but not CBR1 activation). Cannabinoids in topically administered products do not penetrate the skin sufficiently for the cannabinoids to enter the bloodstream. Topical formulations can be non-psychoactive, for example used for localized relief of pain, spasms, neuropathy or various skin condition.

Some reports indicate that Cannabinoids can act as therapeutic agents for cancer and neuroimmune diseases.

Cancers for which Cannabinoids may have a therapeutic effect include prostate cancer, breast cancer, multiple myeloma, non-Hodgkin's lymphoma, chronic lymphocytic leukemia, mantle cell lymphoma, hairy cell leukemia, bladder cancer, colorectal cancer, kidney cancer, and ovarian cancer.

Autoimmune diseases for which Cannabinoids may have a therapeutic effect include lupus, Crohn's disease, Hashimoto's thyroiditis, polymyositis, Sjogren's syndrome, Behcet's disease, primary biliary cirrhosis, irritable bowel syndrome (IBS), psoriasis and dermatitis.

Indications for which Cannabinoids may have a therapeutic effect include myalgic encephalopathy ("ME"), chronic fatigue syndrome ("CFS"), Gulf War Syndrome, autism, autism spectrum disorder ("ASD"), multiple sclerosis ("MS"), Parkinson's disease, amyotrophic lateral sclerosis ("ALS"), fibromyalgia, chronic lyme disease, ("OCD"), ("ADHD"), and Post-Traumatic Stress Disorder ("PTSD").

Applications of the devices and systems set forth herein can include the treatment of post-traumatic stress disorder (PTSD). In such applications, outcome measures can include primary measures such as a Clinician-Administered PTSD Scale ("CAPS") score, for example after 3 weeks of self-administration. Outcome measures can also include secondary measures such as Posttraumatic Symptom Checklists based on the Diagnostic and Statistical Manual of Mental Disorders, Fifth Edition ("DSM-5"), actigraphy (an objective sleep measure), Inventory of Depression and Anxiety Symptoms ("IDAS"), Timeline Follow Back ("TFB"), and/or Inventory of Psychological Functioning ("IPF").

Endocannabinoid receptor locations for CBR1 include the central nervous system ("CNS"), brain and spinal cord, nerves, organs and peripheral tissues. Endocannabinoid receptor locations for CBR2 include organs and peripheral tissues, skin and the immune system.

All combinations of the foregoing concepts and additional concepts discussed herewithin (provided such concepts are not mutually inconsistent) are contemplated as being part of the inventive subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

In order to address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the disclosed innovations may be practiced. The advantages and features of the application are of a representative sample of embodiments only, and are not exhaustive and/or exclusive. They are presented to assist in understanding and teach the disclosed principles. It should be understood that they are not representative of all innovations within the scope of the disclosure. As such, certain aspects of the disclosure have not been discussed herein. Those alternative embodiments may not have been presented for a specific portion of the innovations or that further undescribed alternate embodiments may be available for a portion is not to be considered a limitation of those alternative embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various inventive concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, "terpene" can refer to a number of naturally occurring hydrocarbons based on combinations of the isoprene unit, and include by way of non-limiting example, the listed terpenes and terpenoids, Hemiterpenes, Monoterpenes, Sesquiterpenes, Diterpenes, Sesterterpenes, Triterpenes, Sesquiterpenes, Tetraterpenes, other Polyterpenes, citral, menthol, camphor, salvinorin A, ginkgolide, bilobalide, curcuminoids, Hemiterpenoids, Monoterpenoids, Sesquiterpenoids, Diterpenoids, Sesterterpenoids, Triterpenoids, Tetraterpenoids, Polyterpenoids, Norisoprenoids, Meroterpenes, as well as isomers and stereoisomers of any of the aforementioned, along with synthetic versions thereof.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein, the terms "about" and "approximately" generally mean plus or minus 10% of the value stated. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure. Where a list of values is provided, it is understood that ranges between any two values in the list are also contemplated as additional embodiments encompassed within the scope of the disclosure, and it is understood that each intervening value to the tenth of the unit of the lower limit unless the context clearly dictates otherwise, between the upper and lower limit of said range and any other listed or intervening value in said range is encompassed within the disclosure; that the upper and lower limits of said sub-ranges can independently be included in the sub-ranges is also encompassed within the disclosure, subject to any specifically excluded limit.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for precision control and characterization of dispensed substances, comprising:
    measuring characterization data for a plurality of components;
    receiving, at a processor, a signal representing an instruction to dispense a recipe, the recipe being comprised of instructions to dispense amounts of components;
    in response to receiving the signal representing the instruction to dispense the recipe:
        generating an instruction set based on the recipe and the characterization data of the components of the recipe, and
        executing a delivery event for each of the components to deliver each of the components from a respective reservoir of a dispenser to a central collection channel of the dispenser;

detecting, prior to the execution of the delivery event for each of the components, a deviation in a temperature and/or a pressure from predetermined setpoints; and wherein instantaneous measurements of the temperature and instantaneous pressure of the dispenser are performed and subject to one filtering technique selected from digital numerical smoothing algorithms or multi-point Savitzky-Golay convolution integers to determine the deviation in temperature and/or pressure from the predetermined setpoints, in response to detecting the deviation in the temperature and/or the pressure, automatically adjusting, via the processor, one or more instructions from the instruction set based on the detected deviation in the temperature and/or the pressure such that the amount of each of the components delivered to the central collection channel more closely conforms to an amount specified in the recipe, wherein the instruction set includes an instruction to control a solenoid valve disposed within the dispenser, and wherein the method includes a screening step during which gravimetric dissection is performed, wherein generating the instruction set is further based on a measured flow rate and a measured minimum dispensed mass, at a predetermined temperature, of at least one component of the components that causes the solenoid valve to open for a specified duration.

2. The method of claim 1, wherein the signal representing the instruction to dispense the recipe is received via an application programming interface (API).

3. The method of claim 1, further comprising:
providing a microfluidic circuit that contains the solenoid valve and is configured to have the following parts arranged in the following order: the reservoirs, the solenoid valve, a restrictor channel, the central collection channel, and a dispense port wherein the solenoid valve is located directly adjacent to the component reservoir.

4. The method of claim 1, wherein the instruction set includes an instruction to control a temperature of a heating block of the dispenser.

* * * * *